United States Patent [19]
Ishida et al.

[11] Patent Number: 5,548,699
[45] Date of Patent: Aug. 20, 1996

[54] APPARATUS FOR PRESENTING INFORMATION ACCORDING TO EVALUATIONS OF UNITS OF THE INFORMATION

[75] Inventors: Eiji Ishida; Yoshifumi Matsunaga, both of Kanagawa, Japan

[73] Assignee: Fuji Xerox Co., Ltd., Tokyo, Japan

[21] Appl. No.: 325,936

[22] Filed: Oct. 19, 1994

[30]        Foreign Application Priority Data

Oct. 26, 1993  [JP]  Japan .................................. 5-288834
Oct. 26, 1993  [JP]  Japan .................................. 5-288835
Oct. 26, 1993  [JP]  Japan .................................. 5-289973
Oct. 27, 1993  [JP]  Japan .................................. 5-289762

[51] Int. Cl.$^6$ ......................................... G06F 17/00
[52] U.S. Cl. .................... 395/140; 395/155; 395/161; 395/700; 395/600
[58] Field of Search .................... 395/140, 700, 395/117, 118, 127, 141, 155–161, 600; 364/513

[56]                References Cited

U.S. PATENT DOCUMENTS 4,905,163  2/1990  Garber et al. .......................... 364/513
5,386,571  1/1995  Kurz ...................................... 395/700

OTHER PUBLICATIONS

"SemNet: Three–Dimensional Graphic Representations of Large Knowledge Bases", Kim M. Fairchild et al., Cognitive Science and Its Application for Human–Computer Interaction, pp. 201–233, 1988.
"Reflections on Notecards: Seven Issues for the Next Generation of Hypermedia Systems", Frank G. Halasz, Communications of the ACM, vol. 31, No. 7, pp. 836–852, 1988.
"Spatial Management of Data", Christopher F. Herot, ACM Transactions on Database Systems, vol. 5, No. 4, 1980.

*Primary Examiner*—Almis R. Jankus
*Attorney, Agent, or Firm*—Finnegan, Henderson, Farabow, Garrett & Dunner, L.L.P.

[57]                ABSTRACT

An information evaluating calculator reads stored information units and calculates evaluation values for the information units while, if necessary, referring to externally stored conditions. A position calculator receives the evaluation values and converts the evaluation values to position data. An image generator generates an image for display, in which image elements represent respective information units. The image elements are arranged at positions indicated by the position data. Information units are presented in correspondence to displayed image elements by user selections.

6 Claims, 54 Drawing Sheets

FIG. 6

| AXIS | MAXIMUM VALUE | MINIMUM VALUE |
|---|---|---|
| X | 1993.07.31 | 1993.01.01 |
| Y | 1000 | 0 |

FIG. 7

| POSITION (X,Y) | ID |
|---|---|
| (11, 13) | 01029 |
| (56, 110) | 12543 |
| (234, 24) | 00001 |
| .... | .... |
| (320, 326) | 98665 |
| (12, 42) | 00024 |

| NUMBER | RANDOM NUMBER |
|---|---|
| 1 | 194 |
| 2 | 32 |
| 3 | 213 |
| ⋮ | ⋮ |
| 999 | 114 |
| 1000 | 163 |

| YEAR | VALUE |
|---|---|
| 1980 | 0 |
| 1981 | 1 |
| 1982 | 2 |
| ⋮ | ⋮ |
| 1992 | 12 |
| 1993 | 13 |

FIG. 12

| MONTH | VALUE |
|---|---|
| JANUARY | 1 |
| FEBRUARY | 2 |
| MARCH | 3 |
| ⋮ | ⋮ |
| NOVEMBER | 11 |
| DECEMBER | 12 |

FIG. 13

| DAY OF THE MONTH | VALUE |
|---|---|
| 1st | 1 |
| 2nd | 2 |
| 3rd | 3 |
| ⋮ | ⋮ |
| 30th | 30 |
| 31st | 31 |

FIG. 14

| DAY OF THE WEEK | VALUE |
|---|---|
| SUNDAY | 1 |
| MONDAY | 2 |
| TUESDAY | 3 |
| WEDNESDAY | 4 |
| THURSDAY | 5 |
| FRIDAY | 6 |
| SATURDAY | 7 |

FIG. 21

| EVALUATION VALUES | | ID |
|---|---|---|
| X | Y | |
| 234 | 1993. 01. 12 | 81319 |
| 12 | 1993. 07. 31 | 00001 |
| 550 | 1993. 04. 16 | 86234 |
| ... | ... | ... |
| 40 | 1993. 07. 20 | 36587 |
| 800 | 1993. 03. 03 | 22001 |

FIG. 22

| POSITION | | ID |
|---|---|---|
| X | Y | |
| 59 | 12 | 81319 |
| 3 | 250 | 00001 |
| 138 | 161 | 86234 |
| ... | ... | ... |
| 10 | 238 | 36587 |
| 200 | 107 | 22001 |

FIG. 25

| POSITION | | TIME | ID |
|---|---|---|---|
| X | Y | | |
| 59 | 12 | 234 | 81319 |
| 3 | 250 | 22 | 00001 |
| 138 | 161 | 876 | 86234 |
| .... | .... | .... | .... |
| 10 | 238 | 3 | 36587 |
| 200 | 107 | 456 | 22001 |

| CONDITION | SHAPE | COLOR |
|---|---|---|
| JAPANESE DOCUMENT | □ | GRAY |
| ENGLISH DOCUMENT | △ | RED |
| GERMAN DOCUMENT | ○ | BLUE |

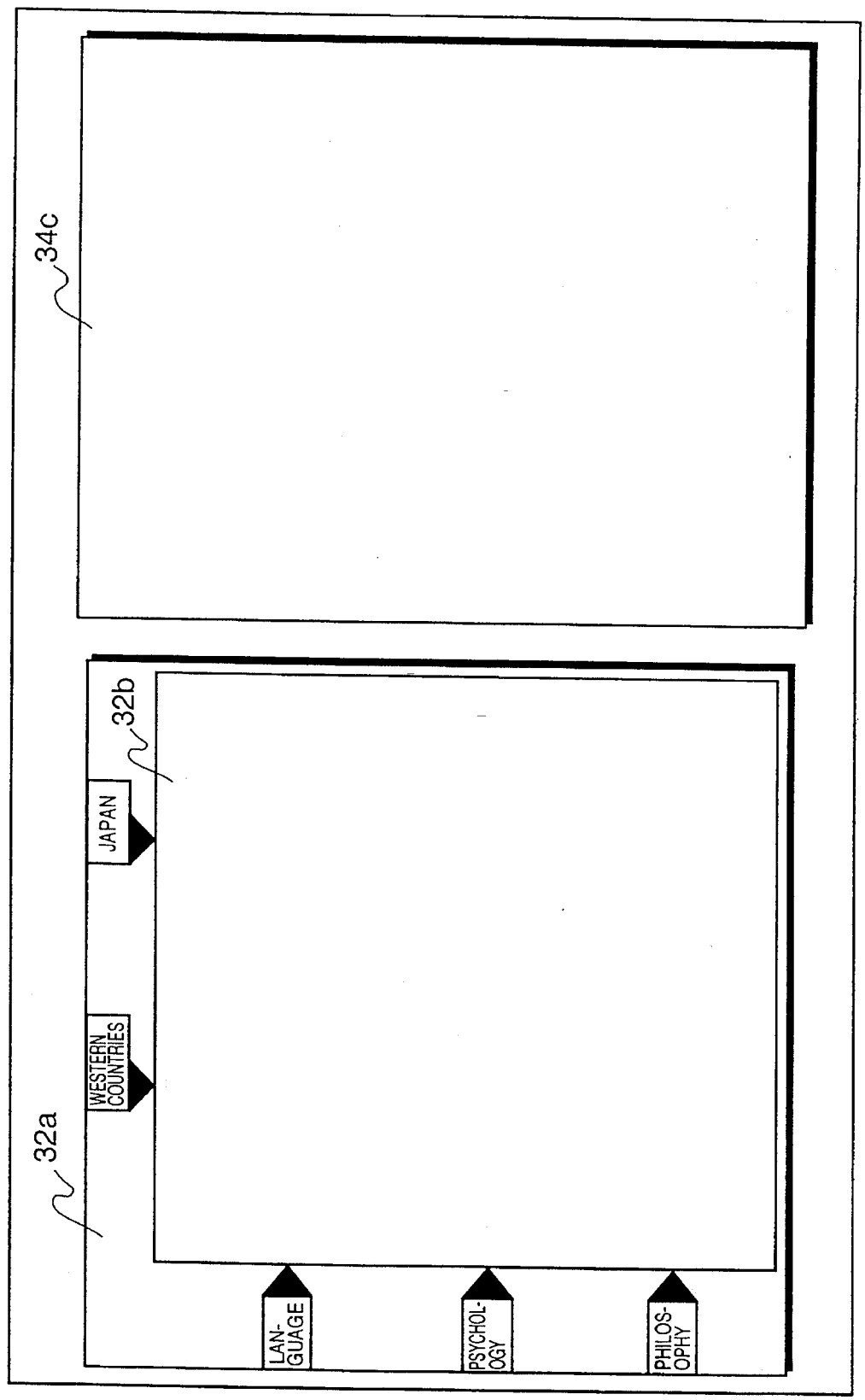

FIG. 51

| CONDITION BEFORE DEVELOPMENT | CONDITION AFTER DEVELOPMENT |
|---|---|
| LINGUISTICS | KeyWords = "LANGUAGE" or "LINGUISTICS" or "SPEECH" or "RHETORIC" |
| PSYCHOLOGY | KeyWords = "PSYCHOLOGY" or "EXPERIMENTAL PSYCHOLOGY" or "COGNITIVE PSYCHOLOGY" or "GESTALT" |
| PHILOSOPHY | KeyWords = "PHILOSOPHY" or "PHILOSOPHER" |
| . . . . | . . . . |
| WESTERN DOCUMENT | Nationality = "BRITAIN" or "FRANCE" or "GERMANY" or "ITALY" or "SPAIN" or "PORTUGAL" or "SWITZERLAND" |
| JAPANESE DOCUMENT | Nationality = "JAPAN"<br>KeyWords = "JAPAN" or "JAPANESE" or "JAPANESE LITERATURE" |

FIG. 52

| ITEM NAME | CONDITION (BEFORE DEVELOPMENT) | CONDITION (AFTER DEVELOPMENT) | POSITION |
|---|---|---|---|
| LANGUAGE | LINGUISTICS | KeyWords = "LANGUAGE" or "LINGUISTICS" or "SPEECH" or "RHETORIC" | 62 |
| PSYCHOLOGY | PSYCHOLOGY | KeyWords = "PSYCHOLOGY" or "EXPERIMENTAL PSYCHOLOGY" or "COGNITIVE PSYCHOLOGY" or "GESTALT" | 124 |
| PHILOSOPHY | PHILOSOPHY | KeyWords = "PHILOSOPHY" or "PHILOSOPHER" | 186 |

| ITEM NAME | CONDITION (BEFORE DEVELOPMENT) | CONDITION (AFTER DEVELOPMENT) | POSITION |
|---|---|---|---|
| WESTERN COUNTRIES | WESTERN DOCUMENT | Nationality = "BRITAIN" or "FRANCE" or "GERMANY" or "SPAIN" or "PORTUGAL" or "SWITZERLAND" | 83 |
| JAPAN | JAPANESE DOCUMENT | Nationality = "JAPAN" KeyWords = "JAPAN" or "JAPANESE" or "JAPANESE LITERATURE" | 166 |

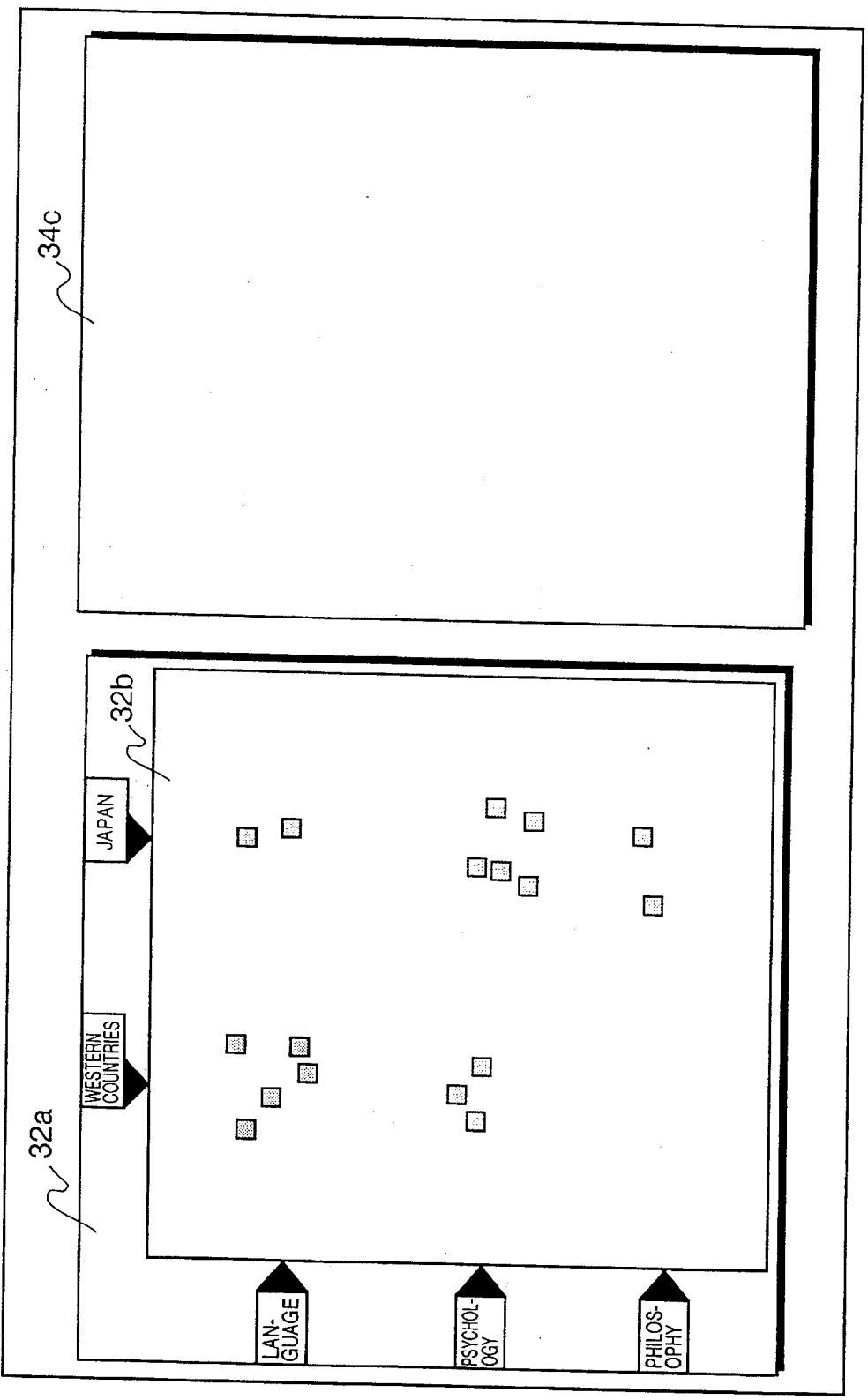

FIG. 61

| AXIS | KIND OF VALUE | MAXIMUM VALUE | MINIMUM VALUE |
|---|---|---|---|
| X | NUMBER OF CITED DOCUMENTS | 50 | 0 |
| Y | EFFECT | 1000 | 0 |

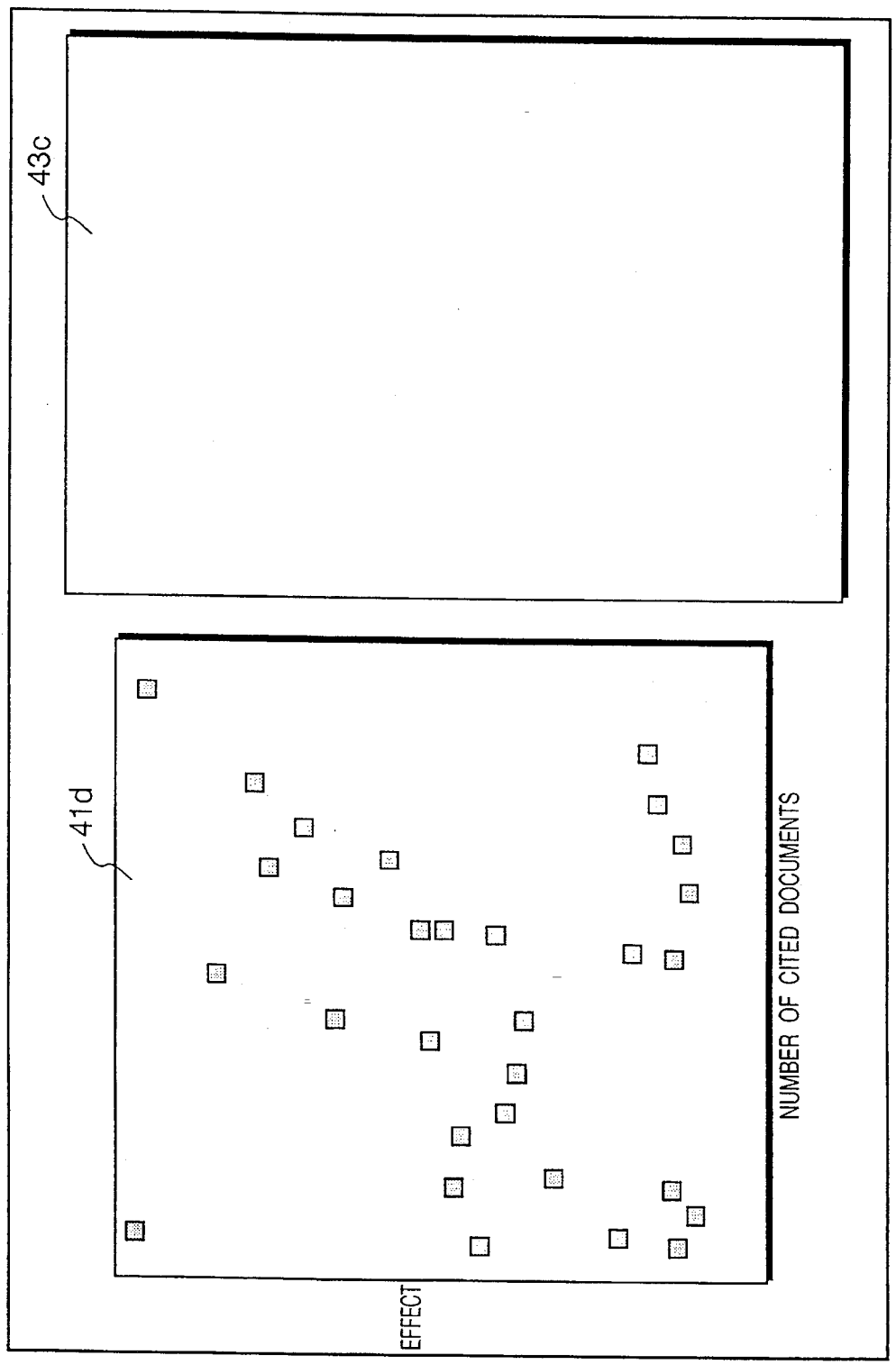

APPARATUS FOR PRESENTING INFORMATION ACCORDING TO EVALUATIONS OF UNITS OF THE INFORMATION

BACKGROUND OF THE INVENTION

The present invention relates to an apparatus for presenting information for its analysis and evaluation.

Among the conventional technologies closely relating to the above type of apparatus are the numerical data visualizing technology, the knowledge expressing technology in the artificial intelligence, the hypertext browser technology, and the multiple variable data visualizing technology.

A graph generating function of table calculation software etc. is most typical of the numerical data visualizing technology. For example, in Microsoft Excel (trademark) of Microsoft Corp., numerical data that are input as a table can be expressed as a graph such as a scatter diagram (Reference (1)). The numerical data visualizing technology is also used to visualize scientific data. For example, Japanese Unexamined Patent Publication No. Hei. 4-229380 (Reference (2)) discloses conversion of numerical data to an image expressed as a hierarchical data structure. This image can be expressed at high speed as a three-dimensional or two-dimensional figure.

SemNet (Reference (3)) is known as the knowledge expressing technology in the artificial intelligence. To present to a user the status of a knowledge-base having a large amount of knowledge, knowledge is arranged in a three-dimensional space for presentation to a user. There are three methods of arranging knowledge in a three-dimensional space: arrangement according to attributes of respective pieces of knowledge, arrangement according to a relationship among pieces of knowledge, and arrangement according to a user's specification. In particular, in the arrangement according to attributes of respective pieces of knowledge, sequenced data received from a knowledge-base can be mapped to a three-dimensional space to enable display of nodes.

The hypertext browser technology includes Notecards (Reference (4)). NoteCards has a browser function of arranging, in a two-dimensional plane, icons that express information described on a card-by-card basis. Inclusion relationships, referencing relationships, etc. between cards are automatically expressed by lines. When an icon is indicated, the corresponding card is displayed to allow a user to recognize an information content of the card.

The multiple variable data visualizing technology includes S-MAP (Reference (5)), which enables display of multiple variable data on a single screen. For example, a relationship among customer data each consisting of the number of employees, sales, the number of business locations, the number of business people employed, etc. can be displayed on a single screen.

In each of the numerical data visualizing technology and the multiple data visualizing technology, numerical data are given in advance and visualization is performed based on those data. Therefore, these technologies cannot read and visually express data that cannot be dealt with as numerical data in their original form, for instance, language-information-based data. Even when indicating an image forming element representing each data, a user cannot know its content directly. A numerical data needs to be read from the position of a point or the like, or the corresponding location of the original data needs to be referred to. Further, in these technologies, the form of image forming elements cannot be changed in accordance with characteristics etc. of the information received.

In the knowledge expressing technology of SemNet, data that are expressed in a language are arranged in a space. However, to automatically arrange data in the space, it is necessary that a mechanism for sequencing the data be prepared and another data to be used for sequencing respective data be input in advance in a knowledge-base system other than SemNet. Therefore, SemNet itself cannot read and express three-dimensionally data that cannot be dealt with as numerical values. Further, even when indicating an image forming element representing each data, a user cannot know its content directly.

In the hypertext browser technology such as NoteCards, a relationship among pieces of information is determined automatically, and a user can know the content of an image called a node icon by mouse clicking. However, the method of arranging icons is limited to, for instance, using the relationship among pieces of information and specification by a user. Further, icons are not arranged in accordance with characteristics of respective pieces of information. Therefore, icons cannot be arranged in a space based on characteristics of respective data to allow a user to recognize the meaning of the whole icons.

List of References (1) A. Kaji and Y. Shimazu, "Introduction to Excel 2.2" (in Japanese), B.N.N. Co., Ltd., pp. 278–280, 1981.

(2) Japanese Unexamined Patent Publication No. Hei. 4-229380, "Numerical Data Visualizing Method and Apparatus," IBM Corp.

(3) Kim M. Fairchild, Steven E. Poltrock and George W. Furnas, "SemNet: Three-Dimensional Graphic Representation of Large Knowledge Bases," In Cognitive Science and Its Application for Human-Computer Interaction, Lawrence Erlbaum Associates, Inc., Hills Dale, N.J., pp. 201–233, 1988.

(4) Frank G. Halasz, "Reflections on NoteCards: Seven Issues for the Next Generation of Hypermedia Systems," Communications of the ACM, Vol. 31, No. 7, pp. 836–852, July 1988.

(5) T. Abe, "Front Line Reports, Person without Creativity should Leave, Imagination Supporting System for Stimulating 'Active Brain'" (in Japanese), Nikkei Information Strategy, pp. 60–67, August 1993.

SUMMARY OF THE INVENTION

A first object of the present invention is to read information units which, as they are, cannot be processed as numerical data, and present an image in which image constituting elements that represent the respective information units are arranged in accordance with characteristics of the respective information units and external conditions.

A second object of the invention is to enable access to an information unit by directly designating the corresponding image constituting element.

By attaining the above two objects, a user is allowed to recognize information units with a feeling of directly arranging the information units themselves in an image. Further, by changing the arrangement method and the external conditions in various manners, a user may find a new point of view or conceive a new idea.

A third object of the invention is to arrange image constituting elements in the form of a table. This allows a user to analyze information units from different points of view by making respective axes represent various items.

A fourth object of the invention is to arrange, in accordance with characteristics etc. of information units, image constituting elements whose forms are changed in accordance with the characteristics etc. of the information units.

A fifth object of the invention is to change the method of presenting an information unit by designating a portion of the corresponding image constituting element.

A sixth object of the invention is to enable access to an information unit by directly designating one of image constituting elements that have been arranged automatically.

According to the invention, an information presenting apparatus comprises:

information unit retaining means for retaining a plurality of information units;

at least one evaluation value calculating means for reading the information units from the information unit retaining means, and for calculating evaluation values of characteristics of the respective information units;

position determining means for determining positions of image constituting elements representing the respective information units based on the evaluation values;

image generating means for generating an image in which the image constituting elements are arranged at the determined positions; and display means for displaying the generated image.

According to another aspect of the invention, an information presenting apparatus comprises:

information unit retaining means for retaining a plurality of information units;

item data retaining means for retaining item data relating to items that constitute rows, columns and other portions of a table;

tabulation value calculating means for reading the information units from the information unit retaining means, and for calculating values to be used for arranging image constituting elements representing the respective information units to form a table based on the item data retained by the item data retaining means;

position calculating means for determining positions of the respective image constituting elements based on the values calculated by the tabulation value calculating means;

image generating means for generating a table image in which the image constituting elements are arranged at the determined positions; and display means for displaying the generated table image.

According to another aspect of the invention, an information presenting apparatus comprises:

information unit retaining means for retaining a plurality of information units;

position calculating means for determining positions of image constituting elements representing the respective information units;

image generating means for generating an image in which the image constituting elements are arranged at the determined positions;

display means for displaying the generated image;

corresponding relationship retaining means for retaining a corresponding relationship between the information units and the positions of the image constituting elements corresponding to the respective information units;

constituting element designation means for receiving designation of one of the image constituting elements being displayed on the display means;

corresponding information retrieving means for retrieving an information unit corresponding to the designated image constituting element; and content presenting means for presenting a content of the retrieved information unit.

DESCRIPTION OF THE DRAWINGS

FIG. 6 shows an example of information stored in a display region retaining means;

FIG. 7 shows an example of information stored in a corresponding relationship retaining means;

FIG. 12 shows an example of information (months) stored in the external condition retaining means;

FIG. 13 shows an example of information (days of the month) stored in the external condition retaining means;

FIG. 14 shows an example of information (days of the week) stored in the external condition retaining means;

FIG. 21 shows an example of information stored in an evaluation result retaining means;

FIG. 22 shows an example of information (two-dimensional) stored in a position retaining means;

FIG. 25 shows an example of information (two-dimensional and time-designated) stored in the position retaining means;

FIG. 50 shows an example of a display of item names;

FIG. 51 shows an example of information stored in a development rule retaining means;

FIG. 52 shows an example of information stored in the item data retaining means (after development of the conditions);

FIG. 53 shows an example of an intermediate display of image constituting elements;

FIG. 61 shows an example of information stored in a display region retaining means; and FIG. 62 shows an example of a displayed image.

DESCRIPTION OF THE PREFERRED EMBODIMENTS

The present invention will be hereinafter described in detail by way of illustrated embodiments.

First Embodiment

Whole configuration

Figure 1:
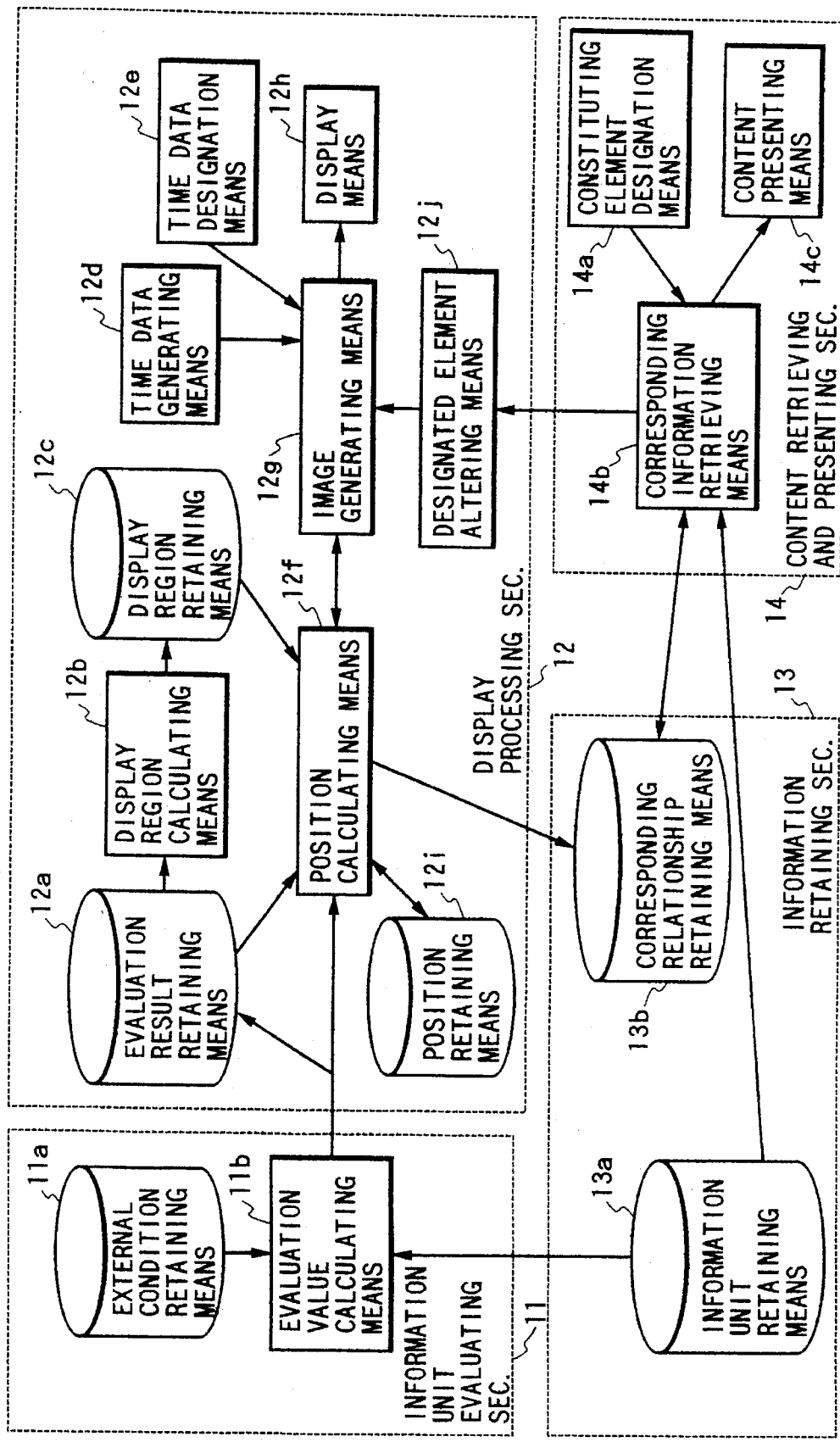
FIG. 1 is a block diagram showing a configuration of an information presenting apparatus according to a first embodiment of the invention.

FIG. 1 is a block diagram showing the whole configuration of an information presenting apparatus according to a first embodiment of the invention. This apparatus generally consists of an information unit evaluating section 11, a display processing section 12, an information retaining section 13 and a content retrieving and presenting section 14.

In the information unit evaluating section 11, external conditions to be used for calculating an evaluation value of an information unit are stored in an external condition retaining means 11a. At least one evaluation value calculating means 11b reads information units from an information unit retaining means 13a (described below), and calculates an evaluation value of each of the thus-read information units based on characteristics of the information unit itself, external conditions, or combinations thereof.

In the information retaining section 13, the information unit retaining means 13a retains a plurality of information units. A corresponding relationship retaining means 13b retains a corresponding relationship between image constituting elements to be displayed on a display means 12h (described below) and the information units stored in the information unit retaining means 13a.

In the display processing section 12, information relating to a display region of the constituting elements is stored in a display region retaining means 12c. A position calculating means 12f determines layout of image constituting elements based on the evaluation value. An image generating means 12g generates an image in which the image constituting elements are arranged at the determined positions, and the display means 12h displays the generated image. A position retaining means 12i retains the positions calculated by the position calculating means 12f. The evaluation result calculated by the evaluation value calculating means 11b is stored in an evaluation result retaining means 12a. A display region calculating means 12b calculates, based on the evaluation result, the display region to be stored in the display region retaining means 12c. A time data designation means 12e receives time designation, and a time data generating means 12d generates time data. A designated element altering means 12j alters a designated image constituting element.

In the content retrieving and presenting section 14, a constituting element designation means 14a receives designation of a constituting element of an image to be displayed on the display means 12h. A corresponding information retrieving means 14b retrieves an information unit corresponding to the designated image constituting element. A content presenting means 14c presents a content of the retrieved information unit.

Figure 2:
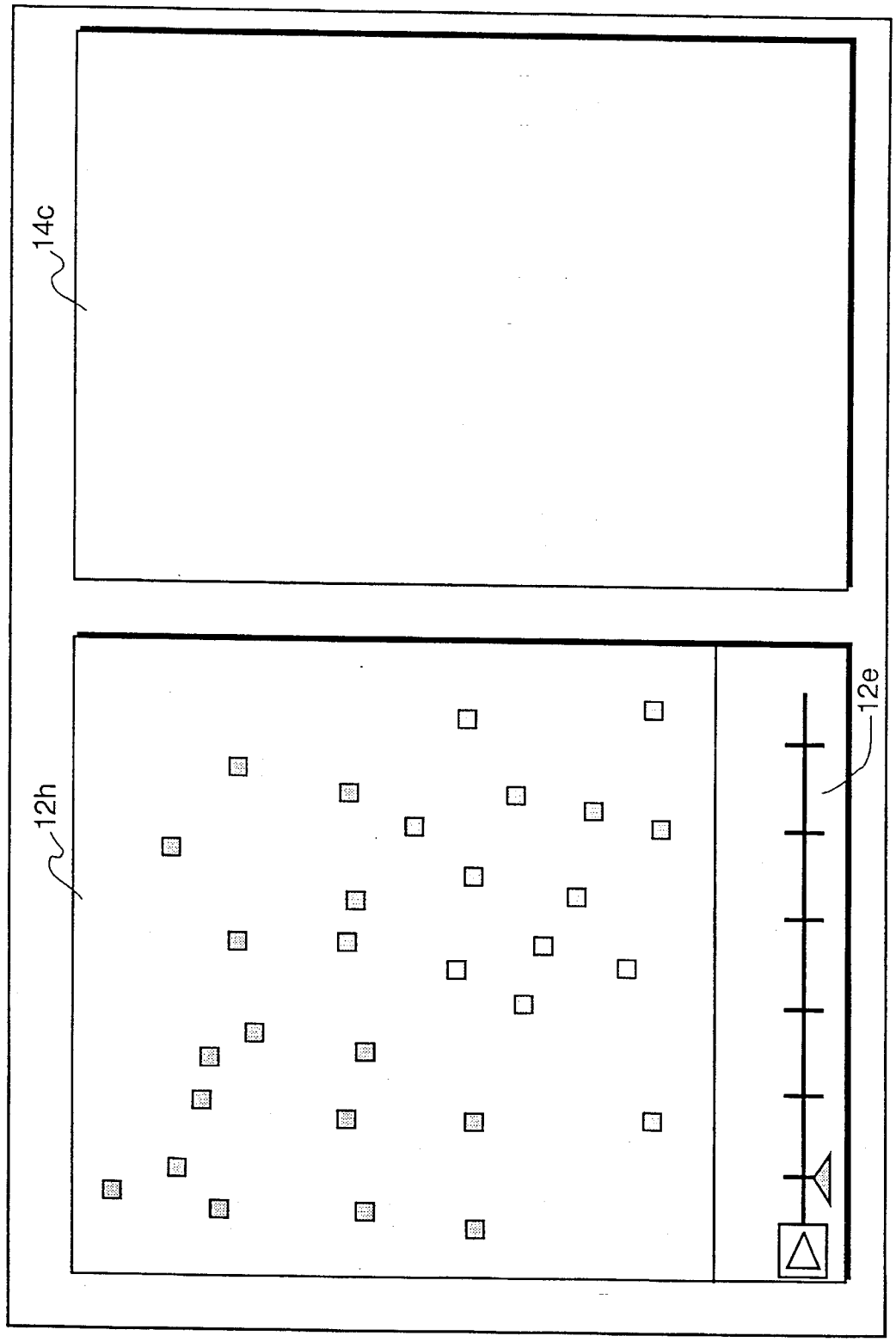
FIG. 2 illustrates an example of a display and operation portion of the apparatus of the first embodiment.

FIG. 2 is an example in which a display and operation portion of the information presenting apparatus of the first embodiment is realized. This example includes the display means 12h, content presenting means 14c and time data designation means 12e.

Display on two-dimensional surface; Sequential reading

Figure 3:
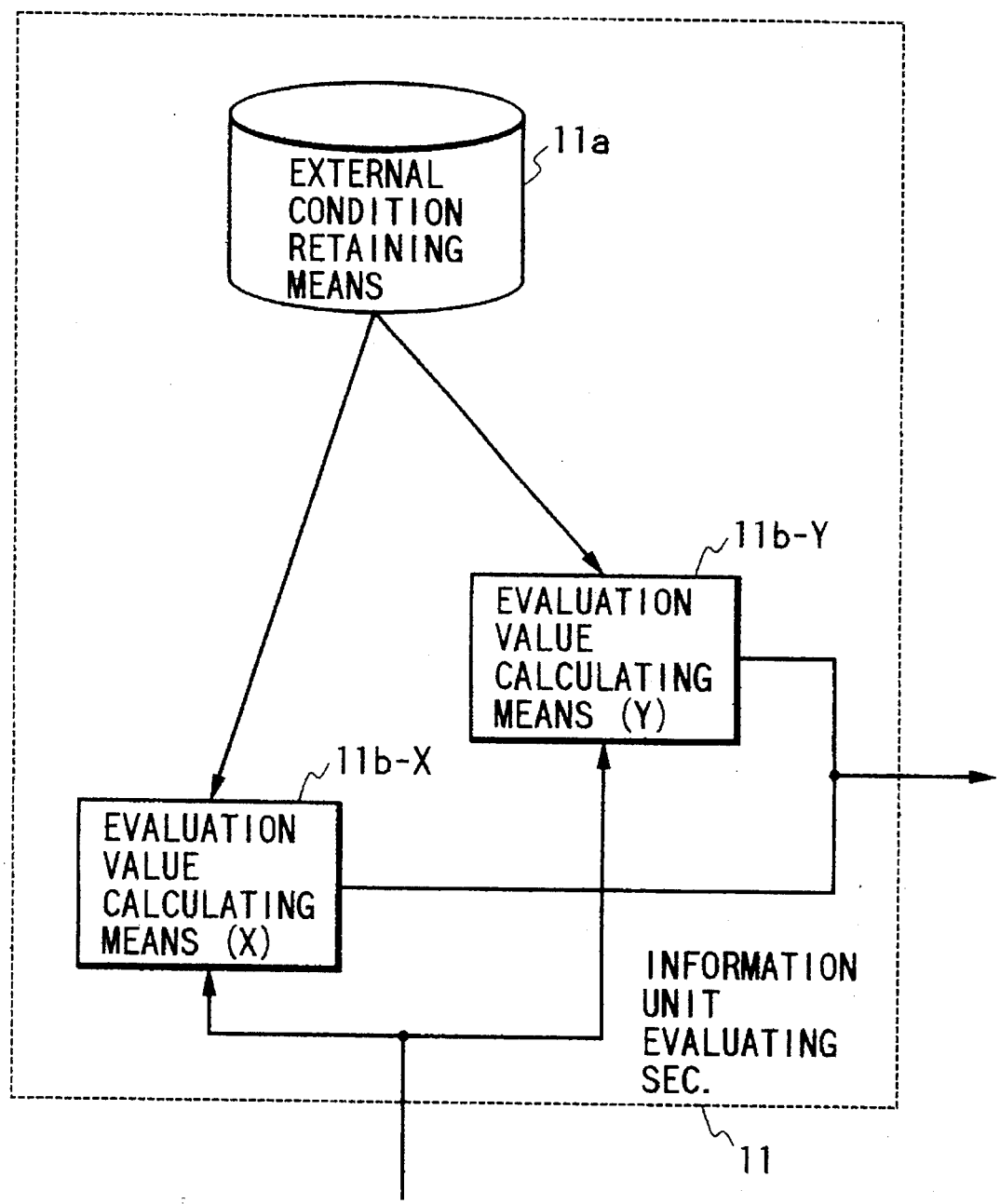
FIG. 3 is a block diagram showing a configuration of an information unit evaluating section for generating a two-dimensional image.
Figure 4:
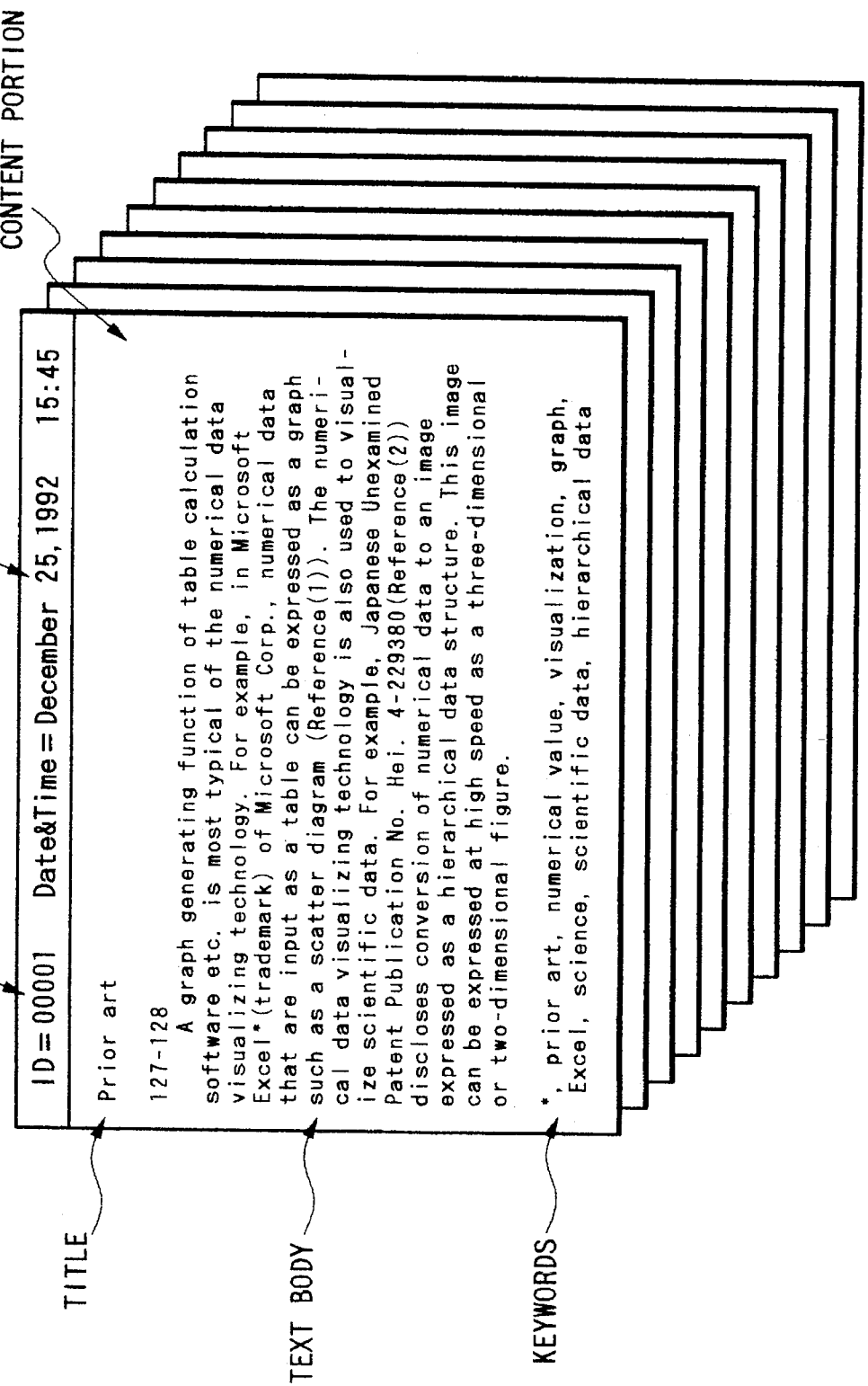
FIG. 4 shows an example of information stored in an information unit retaining means.
Figure 5:
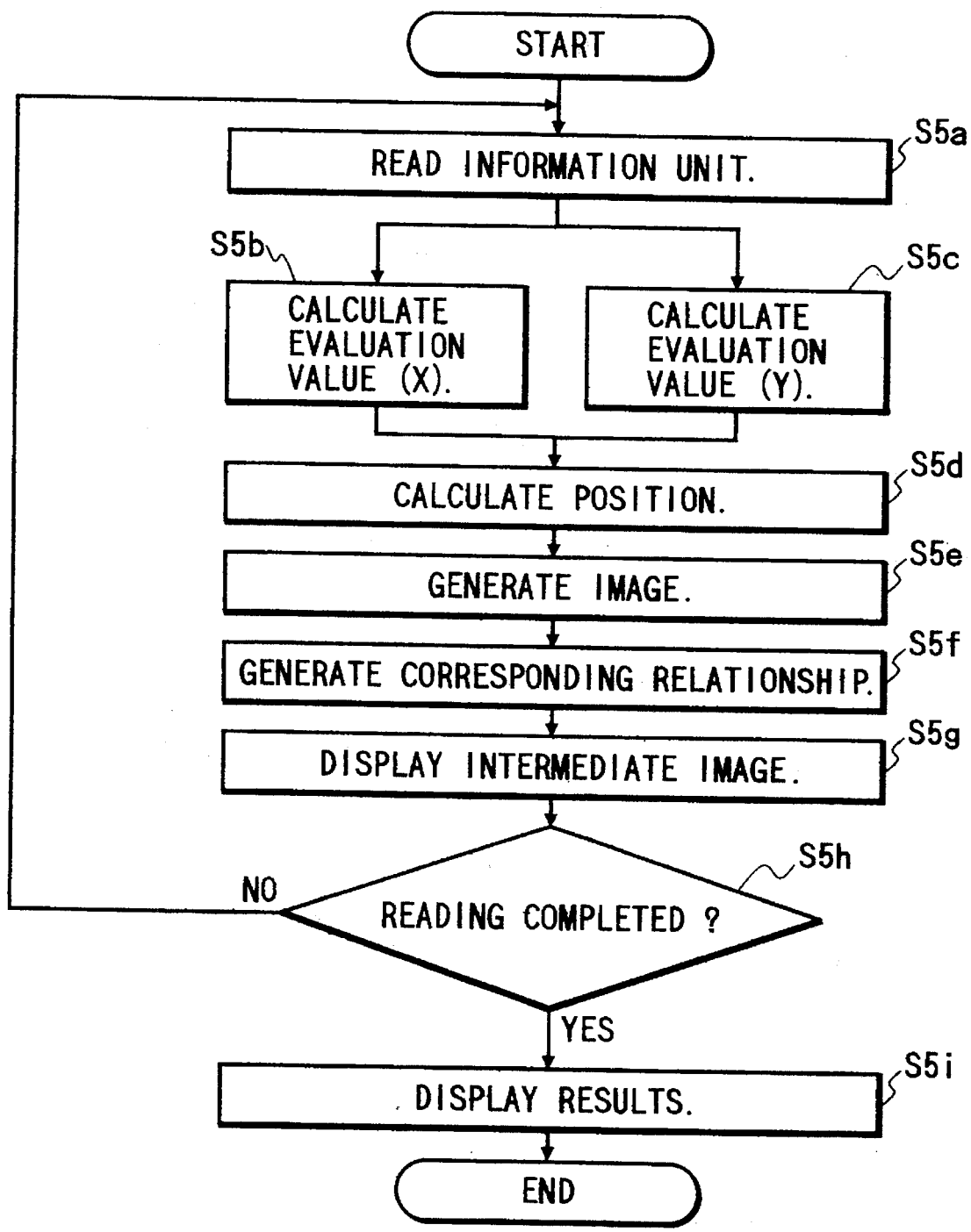
FIG. 5 is a flowchart showing a process of sequentially reading information units and forming a two-dimensional image.

First, a description will be made of a case in which information units are sequentially read and an image is displayed on a two-dimensional surface. To this end, as shown in FIG. 3, the information unit evaluating section 11 has an evaluation value calculating means (X) 11b-X for calculating an evaluation value on the X-axis, an evaluation value calculating means (Y) 11b-Y for calculating an evaluation value on the Y-axis, and the external condition retaining means 11a. Now assume that an axis from Jan. 1, 1993 to Jul. 31, 1993 is set for the X-axis and an axis from 0 byte to 1,000 bytes (data size) is set for the Y-axis. Also assume that a plurality of information units are stored in the information unit retaining means 13a in the manner as shown in FIG. 4, for instance. In this example, an ID, time and date data and a content portion are retained for each information unit. The content portion includes a title, a text body and keywords. With the above assumptions, a description will be made of a process for reading information units and expressing those as a two-dimensional image. FIG. 5 is a flowchart showing this process.

First, an information unit is read from the information unit retaining means 13a (step S5a). The evaluation value calculating means (X) 11b-X extracts time and date data from the information unit thus read (step S5b), and the evaluation value calculating means (Y) 11b-Y evaluates the data size and calculates a value (step S5c). Receiving the calculated value, the position calculating means 12f calculates a position on a display surface based on the maximum and minimum values on each axis of a display region which values are stored in the display region retaining means 12c in the manner as shown in FIG. 6 (step S5d). Then, the image generating means 12g generates an image in which an image constituting element representing the information unit is placed at the calculated position (step S5e). A corresponding relationship between the information unit and the position of the image constituting element is stored into the corresponding relationship retaining means 13b in the manner (a table correlating IDs of information units and coordinates of positions) as shown in FIG. 7 (step S5f). At this stage, an intermediate image in which the new image constituting element is added to the previous image is displayed on the display means 12h (step S5g). The above operation is repeated until all the necessary information units are read (step S5h). When the reading of the information units has been completed, the final image is displayed on the display means 12h (step S5i), and the process is finished.

Figures 8, 9:
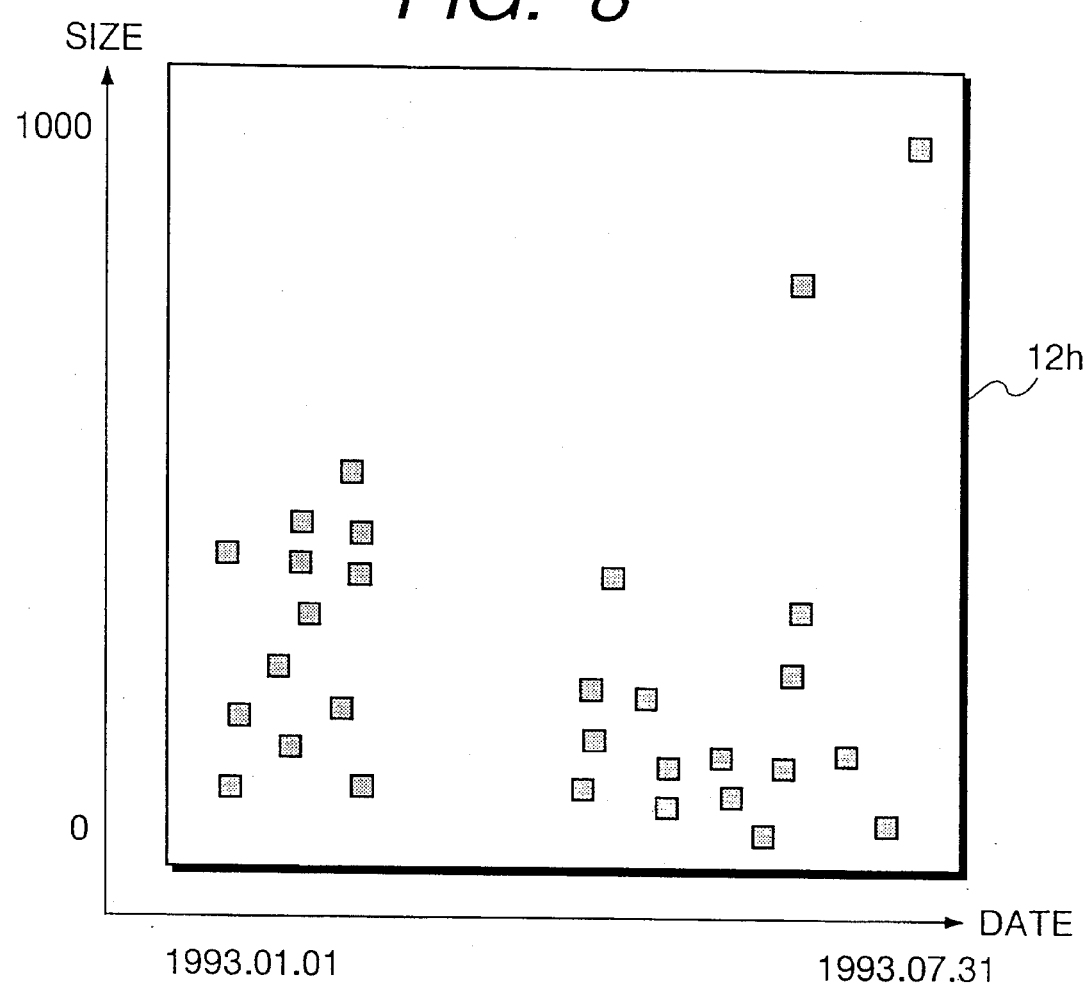
FIG. 8 shows an example of an image displayed on a two-dimensional surface in the form of date vs. size.
FIG. 9 shows an example of information (a table of random numbers) stored in an external condition retaining means.

FIG. 8 shows an example of an image displayed on the display means 12h as a result of execution of the above process. The respective information units are represented as image constituting elements (points in this case), and arranged on a two-dimensional surface based on the evaluation values. From a distribution of the points, a user can recognizes features such as "There are many data in January and June" and "The maximum size data exists in the end of July." While the information unit is represented by a point in this example, it may be represented by any form of image constituting element as long as it can indicate that the information unit exists at its location.

Figures 10, 11:
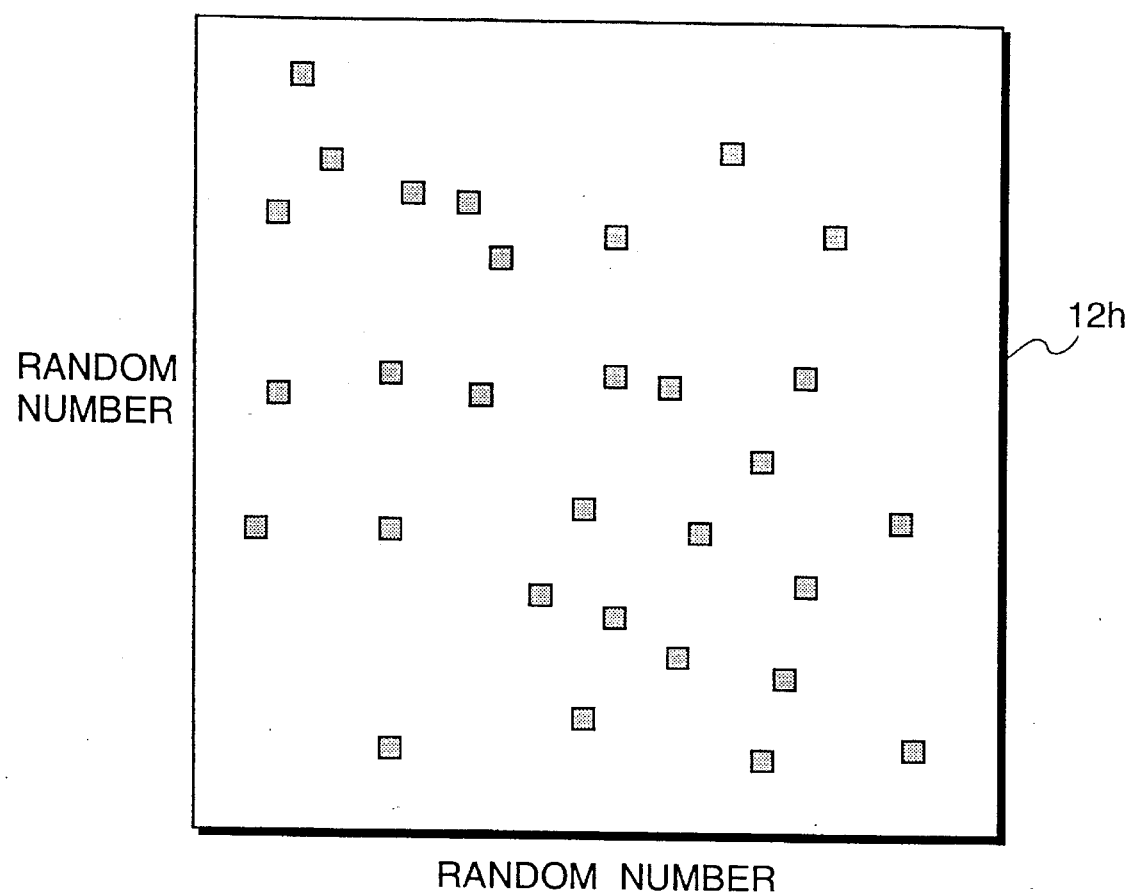
FIG. 10 shows an example of an image displayed on a two-dimensional surface randomly.
FIG. 11 shows an example of information (years) stored in the external condition retaining means.
Figure 15:
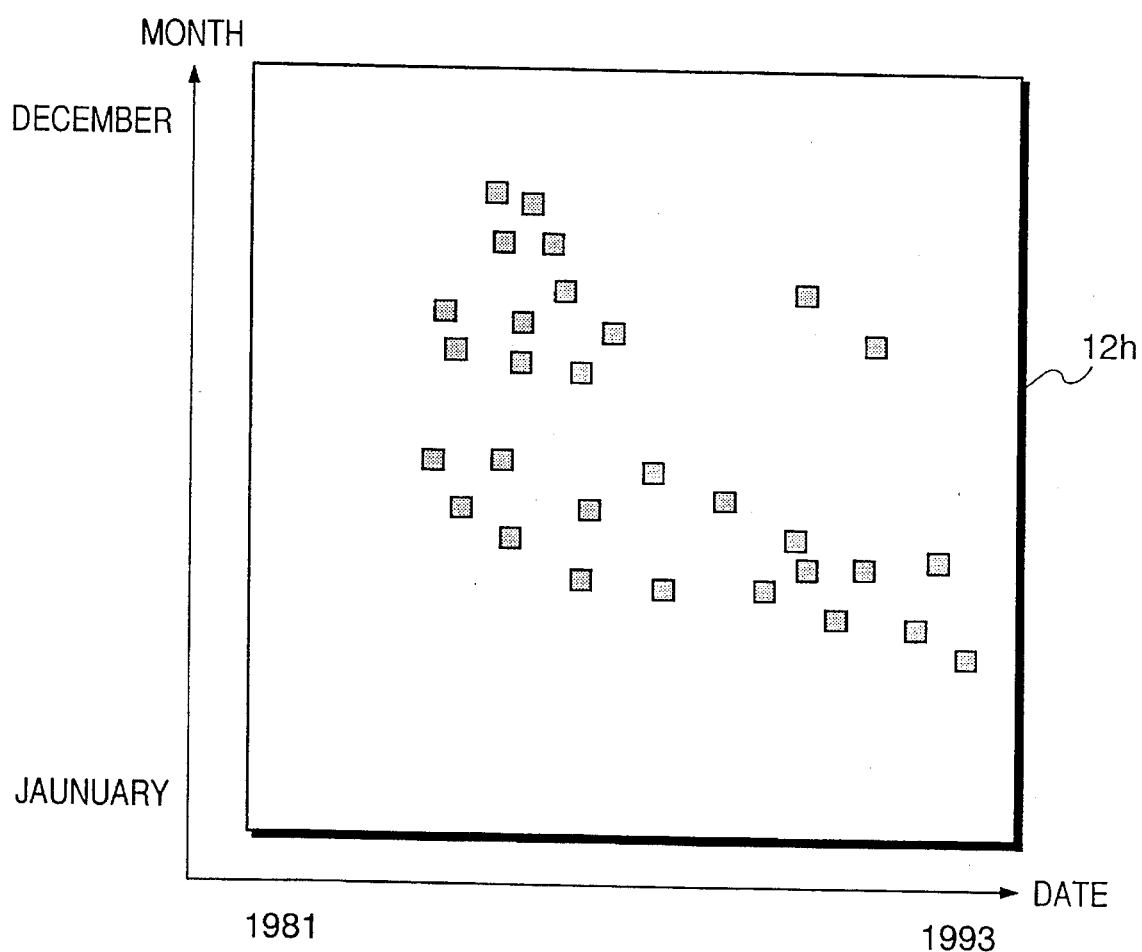
FIG. 15 shows an example of an image displayed on a two-dimensional surface in the form of year vs. month.
Figure 16:
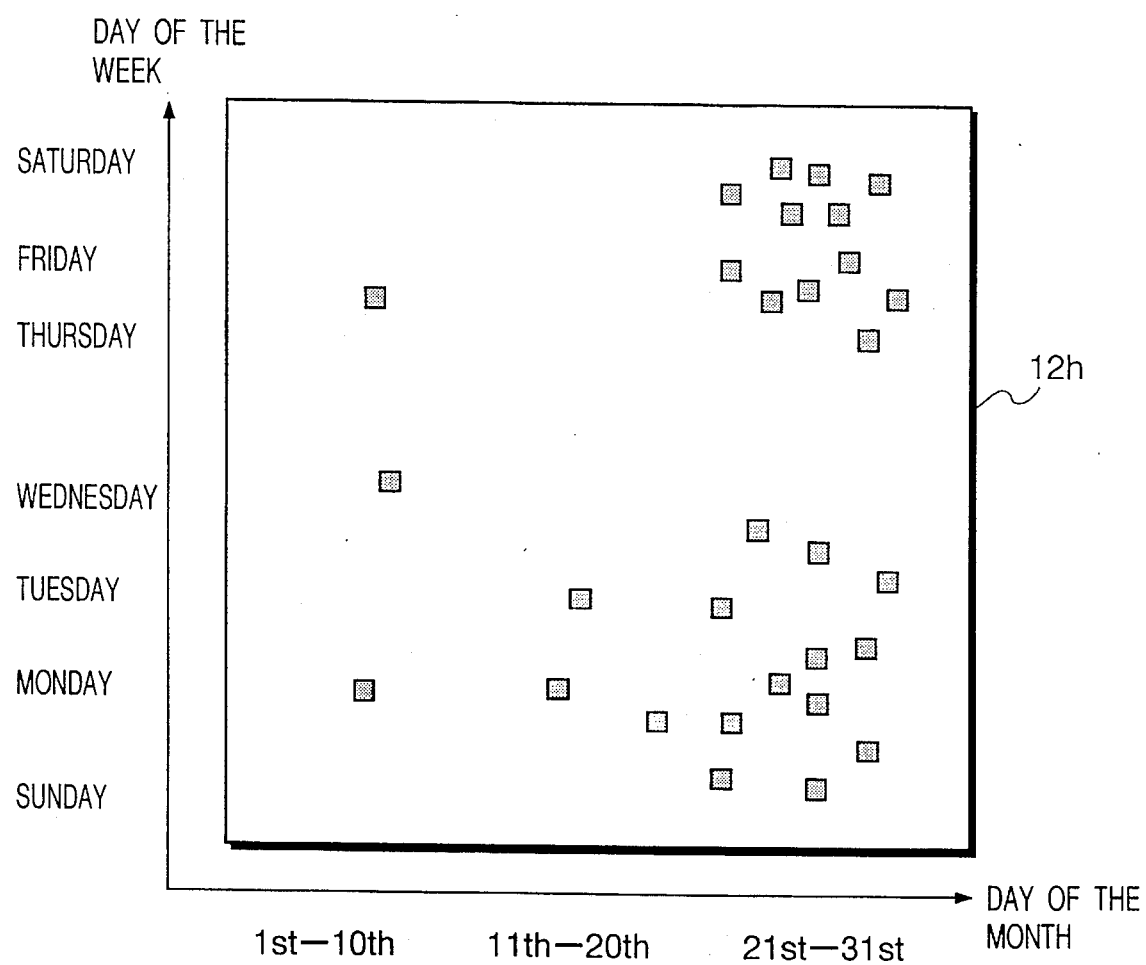
FIG. 16 shows an example of an image displayed on a two-dimensional surface in the form of day of the month vs. day of the week.
Figure 17:
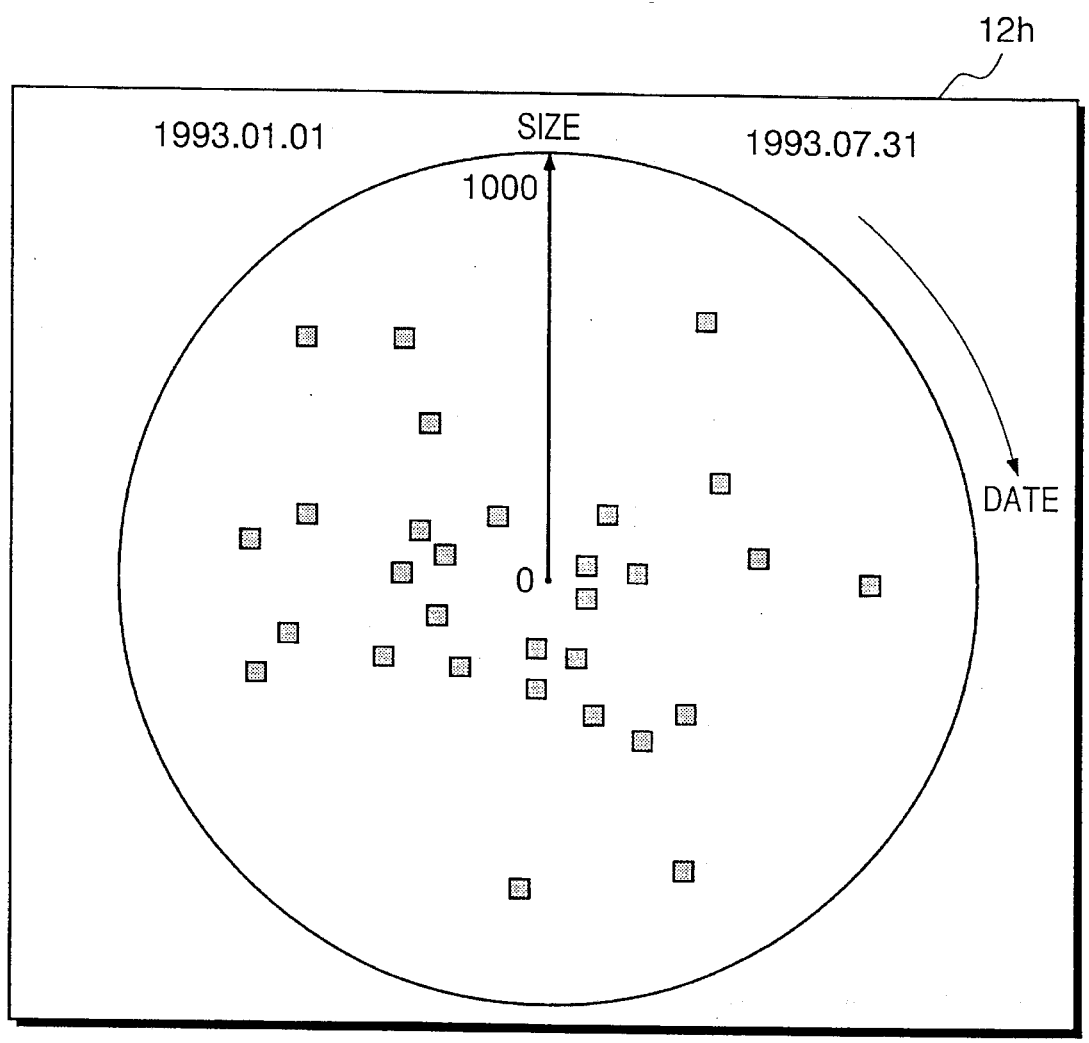
FIG. 17 shows an example of an image on a polar coordinate system displayed on a two-dimensional surface.

While no external condition is employed in the above example of calculating an evaluation value, it is possible to calculate an evaluation result under various conditions by using external conditions stored in the external condition retaining means 11a. For example, if a table of random numbers as shown in FIG. 9 is held as an external condition and applied to steps S5b and S5c, a display of random numbers vs. random numbers can be made as shown in FIG. 10. If conditions on the year, month, day of the month, and day of the week as shown in FIGS. 11–14 are stored in the external condition retaining means 11a and evaluation values are calculated in steps S5b and S5c by combining the time and date data of an information unit with the external condition, an image display of year vs. month or day of the month vs. day of the week can be made as shown in FIGS. 15 and 16. Further, while an orthogonal coordinate system is used in the above examples, the image generating means 12g may be such that image constituting elements are arranged on a polar coordinate system. FIG. 17 shows an image display on a polar coordinate system.

To simplify the description, relatively simple methods of calculating a evaluation value, such as extraction and conversion, have been described above. However, there are many methods in which the evaluation value calculating means 11b evaluates an information unit, as exemplified below:

Extracting a value, character, word, phrase, sentence, or the like from a content portion.

Calculating the number and a distribution of characters of each of character types such as English characters, hiragana, katakana and kanji.

Extracting a content of a title, and a word, phrase, or the like from the title.

Performing morphological analysis on a text body, and extracting a word or the like or inferring a tendency of particles or some other part of speech used.

Extracting or determining the number, kinds, lengths, tendency, etc. of keywords applied.

Determining a style and a tendency of expression of sentences included and an average length of sentences.

Calculating a ratio in composition among respective constituent parts such as a title, a text body, keywords, etc.

Extracting an abstract, inferring a field of a content of a written material, or determining the importance of a content when it is analyzed from a certain view point, by using a language processing technique.

Figure 18:
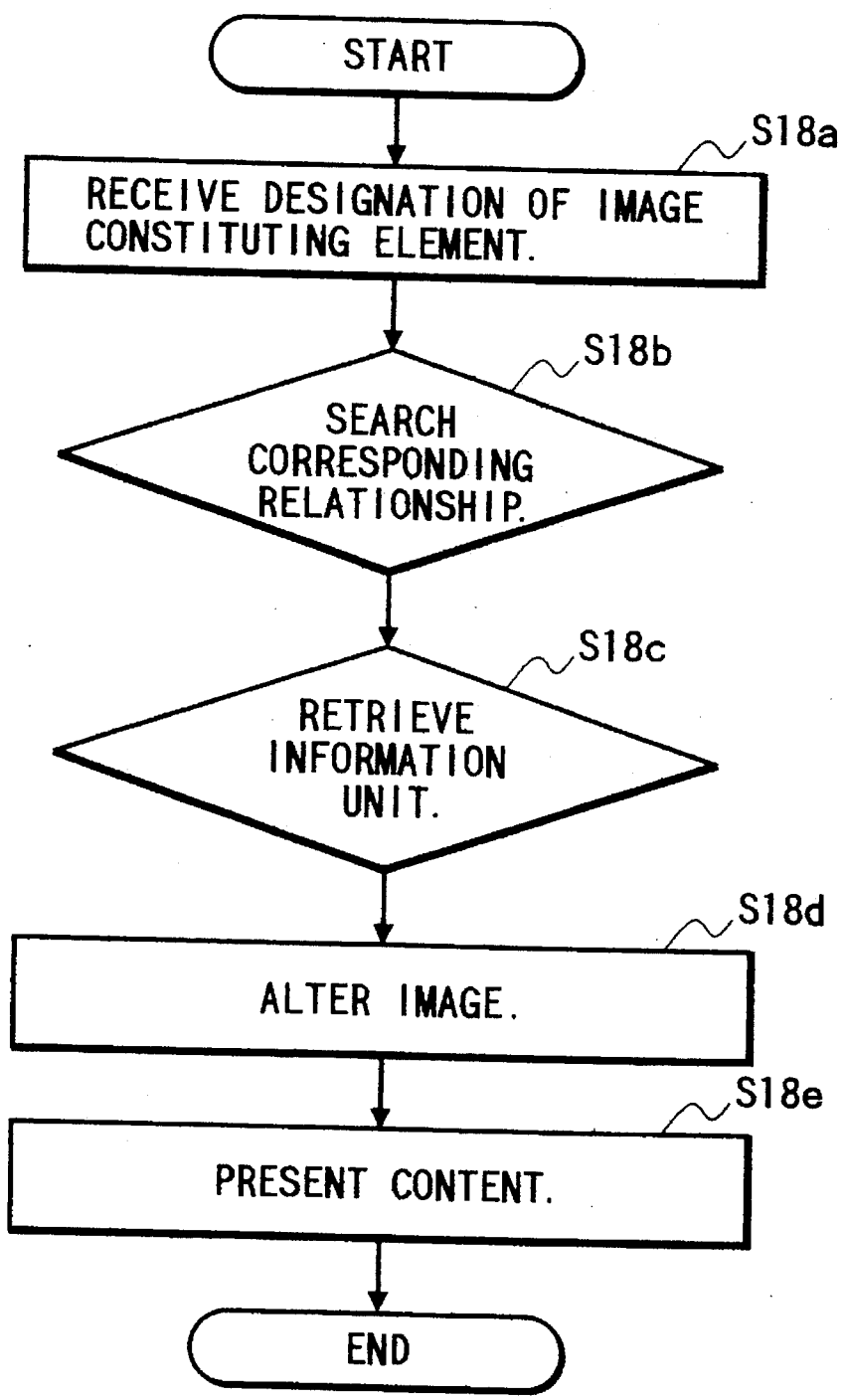
FIG. 18 is a flowchart showing a process of presenting an information unit corresponding to an image constituting element.
Figure 19:
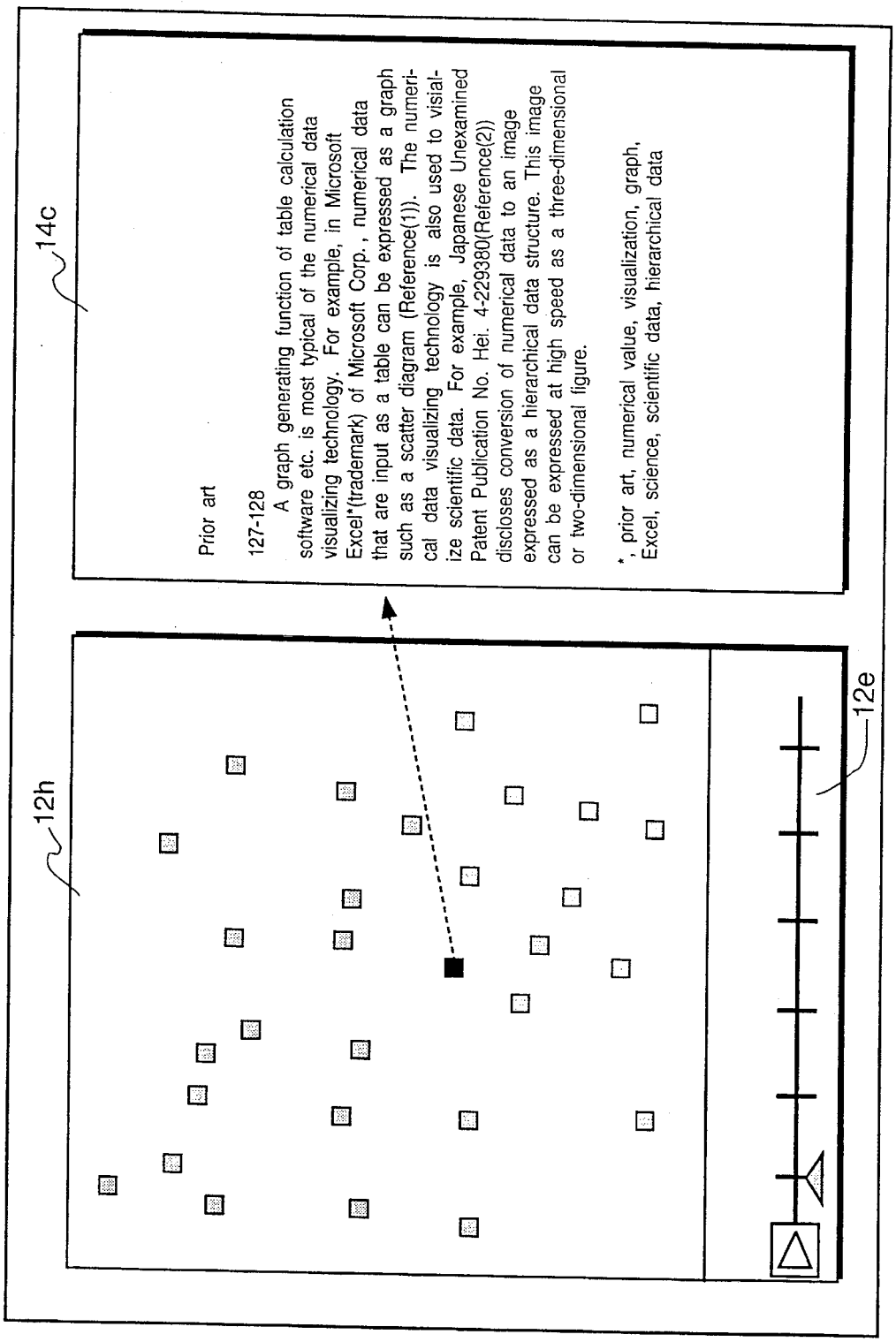
FIG. 19 shows an example in which a content of an information unit is presented.

Next, a description will be made of a process of presenting a content of an information unit by designating an image constituting element thereof. FIG. 18 is a flowchart showing this process. The constituting element designation means 14a receives a user's designation of an image constituting element, and sends it to the corresponding relationship retrieving means 14b (step S18a). Based on the user's designation, the corresponding relationship retrieving means 14b searches the information stored in the corresponding relationship retaining means 13b in the manner as shown in FIG. 7, for instance, judges what information unit the user has designated, and obtains its ID (step S18b). Based on the ID, the corresponding relationship retrieving means 14b searches the information unit retaining means 13a, fetches the corresponding information unit (step S18c), and supplies it to the designated element altering means 12j. The image generating means 12g generates an image in which the color or shape of the designated image constituting element has been altered (step S18d), and displays a content of the information unit on the display means 14c (step S18e). FIG. 19 shows a display of the information unit corresponding to the image constituting element designated by the user on the content presenting means 14c. Although in this example the information content is displayed in the form of characters, it may be presented in any form, for instance, in the form of a picture, sound or a moving picture.

Display on two-dimensional surface; En bloc reading

Figure 20:
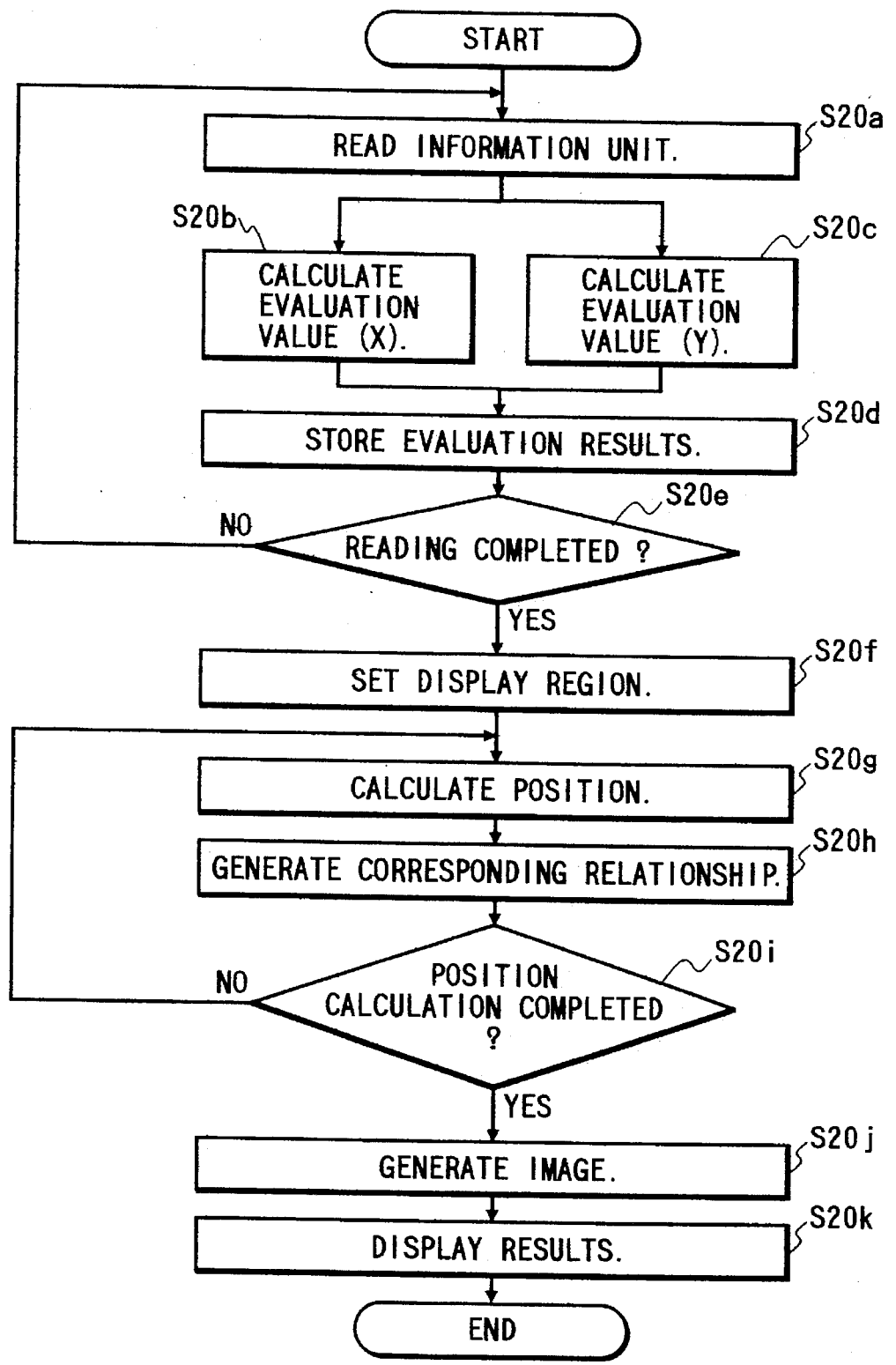
FIG. 20 is a flowchart showing a process of reading information en block, automatically calculating a display region, and forming a two-dimensional image.

Next, a description will be made of a process of reading all the necessary information units en bloc, automatically calculating a display region based on the information thus read, and presenting an image based on the calculated regions. FIG. 20 is a flowchart showing this process.

First, an information unit is read from the information unit retaining means 13a (step S20a). The evaluation value calculating means 11b-X and 11b-Y calculate evaluation values of the information unit thus read (steps S20b and S20c). The calculated values are stored in the evaluation result retaining means 12a in the manner as shown in FIG. 21 (sequentially as the process proceeds) (step S20d). The above operation is repeated until all the necessary information units are read (step S20e). The display region calculating means 12b searches the evaluation values of the respective information units stored in the evaluation result retaining means 12a, and determines the maximum and minimum values for display (step S20f). Although the simplest way of determining those values is to use the maximum and minimum values themselves of the evaluation values, any methods may be employed as long as they can determine the maximum and minimum values. For example, the maximum and minimum values may be set from particular data, by specifying a certain range with respect to an average value, or by utilizing a standard deviation. Then, based on the maximum and minimum values on each axis of the display region, position data on a display surface is calculated and retained by the position retaining means 12i in the manner as shown in FIG. 22 (step S20g). Further, a corresponding relationship between the information unit and the position of the image constituting element is stored into the corresponding relationship retaining means 13b in the manner as shown in FIG. 7 (step S20h). The above operation is repeated until all the position data are calculated (step S20i). Finally, an image is generated based on the position data (step S20j), and a final image is displayed on the display means 12h (step S20k), to complete the process. The final image thus generated is the same as the previous one.

Two-dimensional, time-designated display

Figure 23:
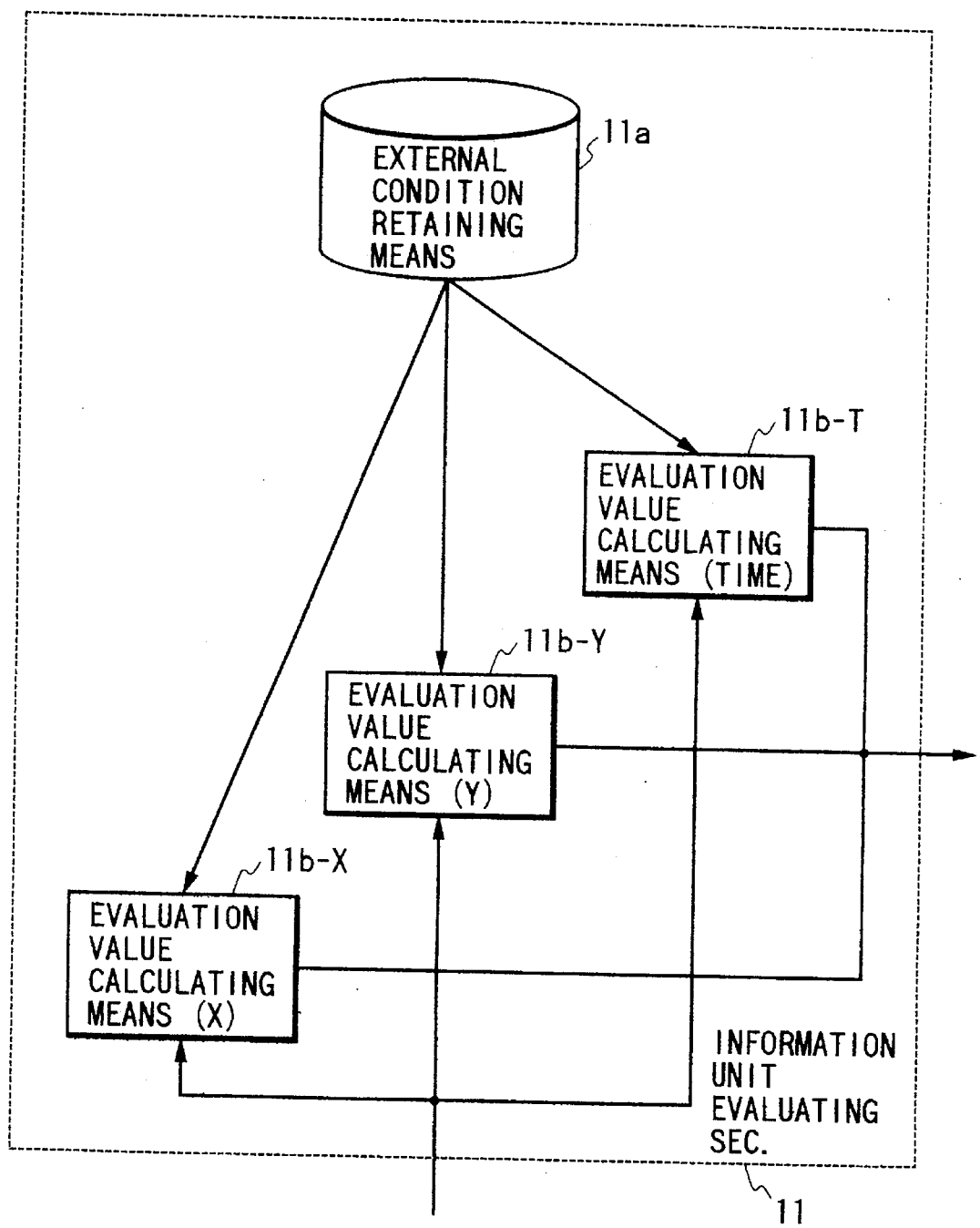
FIG. 23 is a block diagram showing a configuration of an information unit evaluating means for forming a two-dimensional image with introduction of a time factor.
Figure 24:
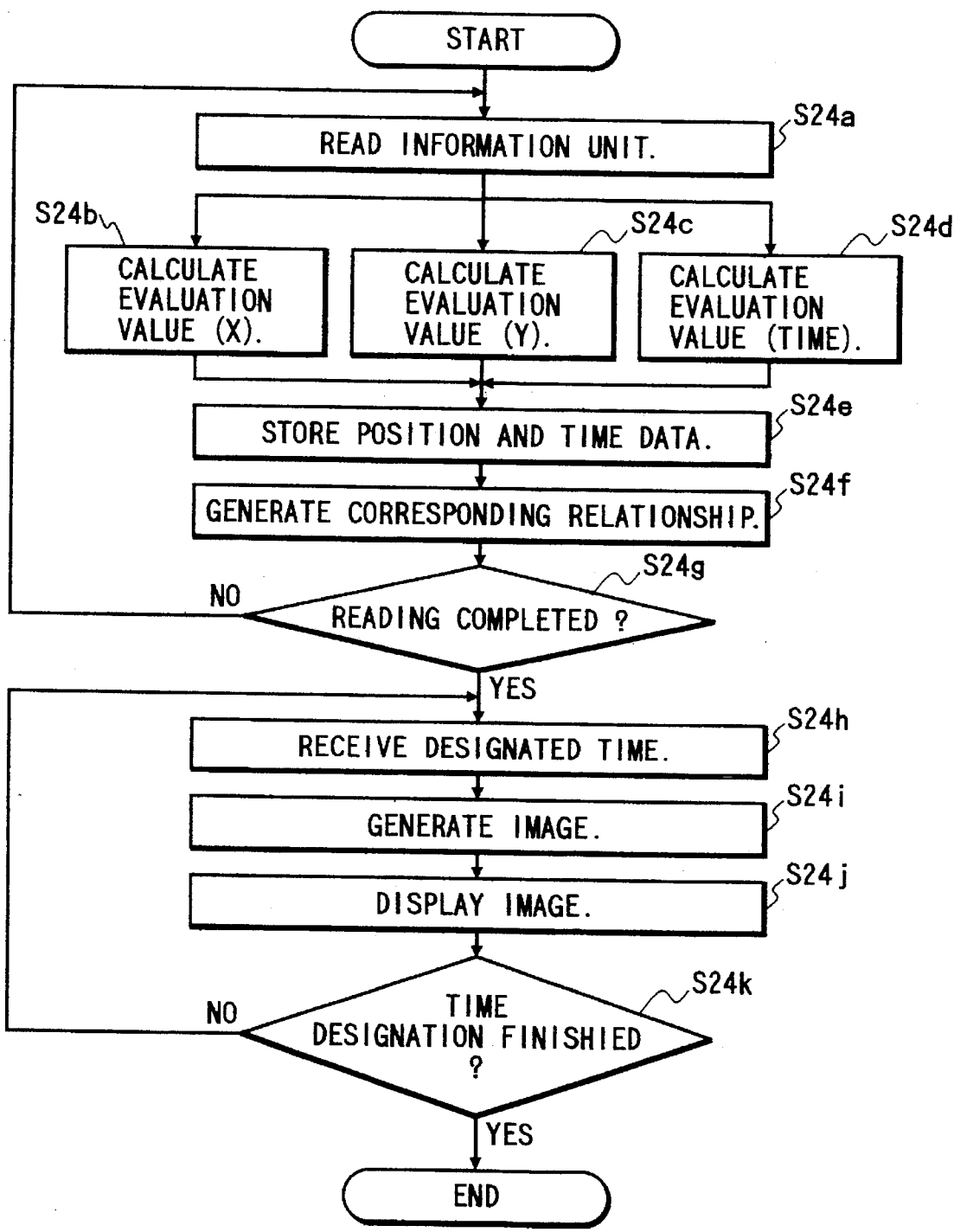
FIG. 24 is a flowchart showing a process of forming a two-dimensional, time-designated image.

A description will be made of a process of reading information units, expressing those as a two-dimensional image and time data, and presenting the two-dimensional image in accordance with a user's time designation. To enable two-dimensional, time-designated display, the information unit evaluating section 11 has, as shown in FIG. 23, an evaluation value calculating means (X) 11b-X for calculating an evaluation value on the X-axis, an evaluation value calculating means (Y) 11b-Y for calculating an evaluation value on the Y-axis, an evaluation value calculating means (time) 11b-T for calculating an evaluation value relating to time, and an external condition retaining means 11a for storing external conditions to be used in calculating evaluation values. FIG. 24 is a flowchart showing this process.

Figure 26:
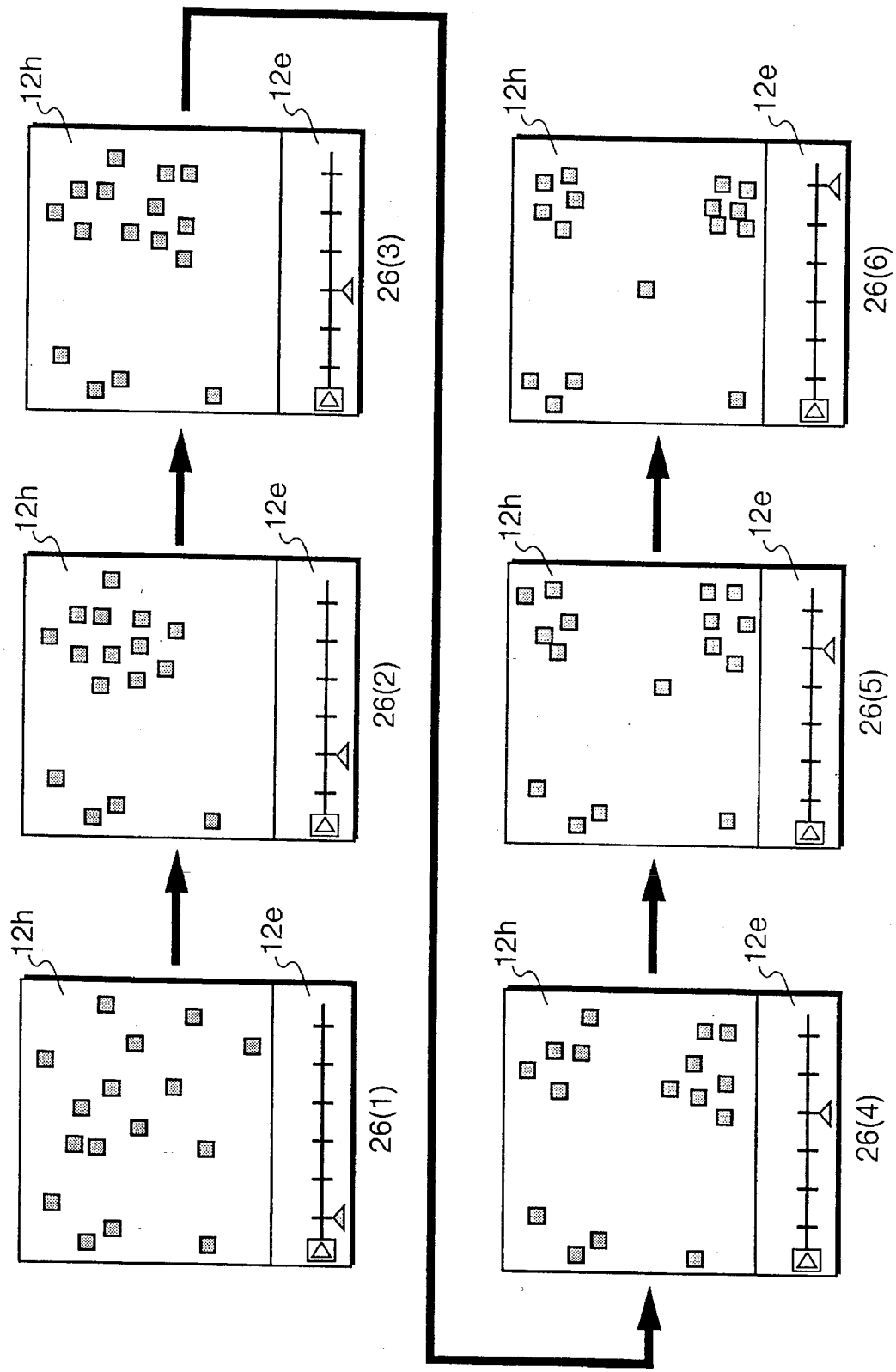
FIG. 26 shows an example of a display of a two-dimensional image with introduction of a time factor.

First, an information unit is read from the information unit retaining means 13a (step S24a). The evaluation value calculating means 11b-X, 11b-Y and 11b-T calculate evaluation values of the information unit thus read (steps S24b, S24c and S24d). Based on the calculated values and the maximum and minimum values on each axis of the display region, a position on a display surface and time data are calculated, and stored in the position retaining means 12i in the manner as shown in FIG. 25 (step S24e). For convenience, the apparatus of this example is constructed such that the time data is also stored in the position retaining means 12i. Apparently, a time information retaining means may be provided separately. Then, a relationship between the position/time and the ID of the information unit is stored into the corresponding relationship retaining means 13b (step S24f). The above operation is repeated until all the necessary information units are read (step S24g). Then, an image is generated (step S24i) based on time designation by a user through the time data designation means 12e (step S24h). A final image is displayed on the display means 12h (step S24j). The above operation is repeated until the user's time designation is finished (step S24k). FIG. 26 shows images that change with the lapse of time. In accordance with the user's designation through the time data designation means 12e, a corresponding information unit is presented on the display means 12h. As the designated time is varied, the user can see images 26(1)–26(6) and recognize a variation of images with time.

Two-dimensional display with automatic time increment

Figure 27:
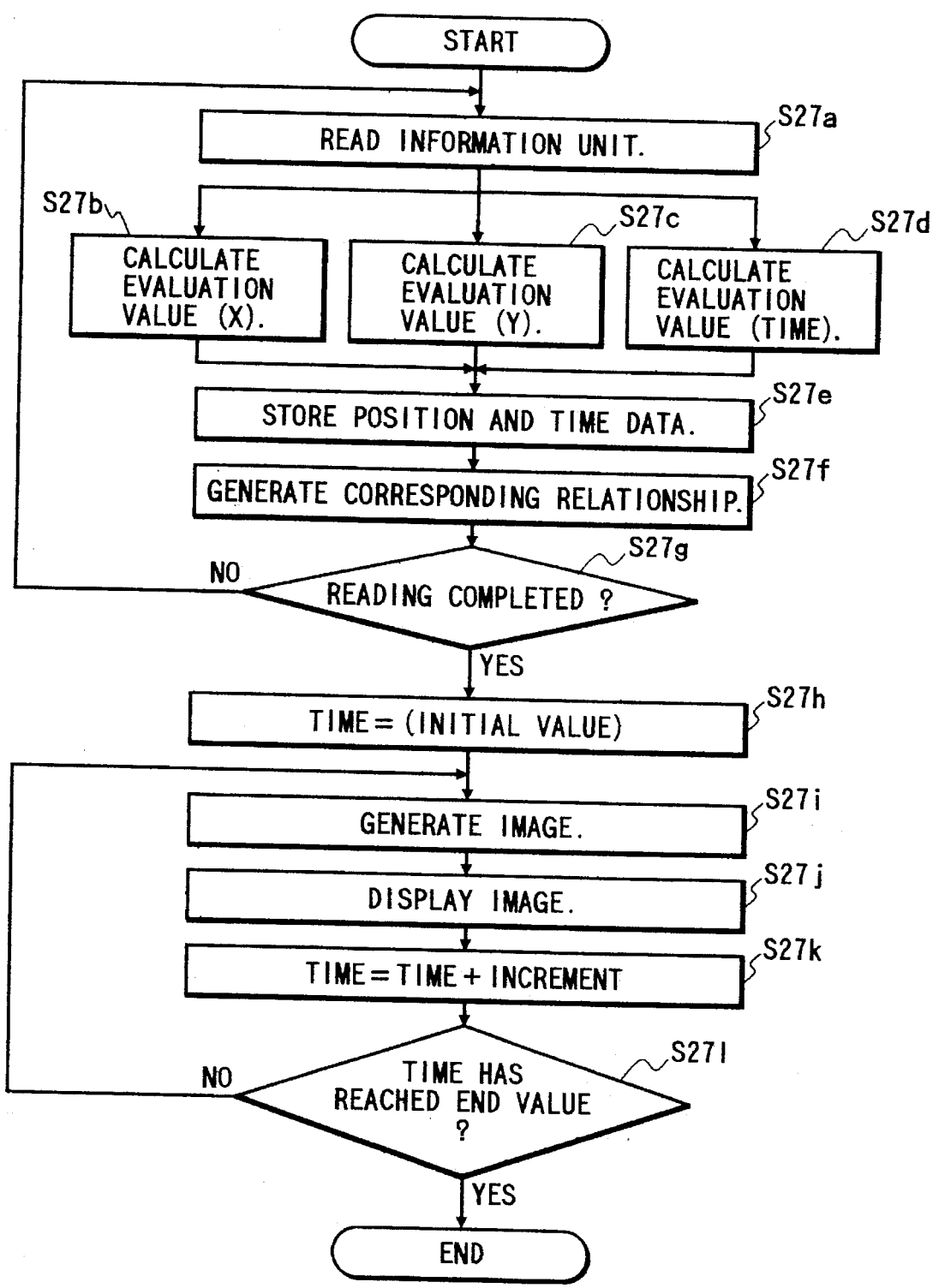
FIG. 27 is a flowchart showing a process of forming a two-dimensional image with automatic time increment.

A description will be made of a process of reading information units, expressing those as a two-dimensional image and time data, and automatically presenting the two-dimensional image so that it varies in accordance with the time data. To enable two-dimensional display with a time factor, the information unit evaluating section 11 has, as shown in FIG. 23, an evaluation value calculating means (X) 11b-X for calculating an evaluation value on the X-axis, an evaluation value calculating means (Y) 11b-Y for calculating an evaluation value on the Y-axis, an evaluation value calculating means (time) 11b-T for calculating an evaluation value relating to time, and an external condition retaining means 11a for storing external conditions to be used in calculating evaluation values. FIG. 27 is a flowchart showing this process.

The part of the process to step S27g is completely the same as that of the process shown in FIG. 24. After all the information units have been read, the time data generating means 12d generates an initial value of time (step S27h). Then, an image of image constituting elements that represent an information unit corresponding to the generated time is produced (step S27i), and is presented to a user (step S27j). Then, the time is increased by a predetermined increment (step S27k). The above operation is repeated with a certain holding time for each cycle until the time reaches an end value (step S27l). Images vary with the time as shown in FIG. 26. Each automatic shift between the images 26(1)–26(6) occurs with a certain holding time.

While in this embodiment the time data is an evaluation value, a modification may be made in the following manner. That is, an order of storing information into the information unit retaining means 13a is used as a time-sequential relationship, and time points at which data are sequentially read are employed in place of the time data generating means 12d. Thus, images are displayed while varying with time.

One-dimensional display

A description will be made of a process of reading information units and expressing those as a one-dimensional image.

Figure 28:
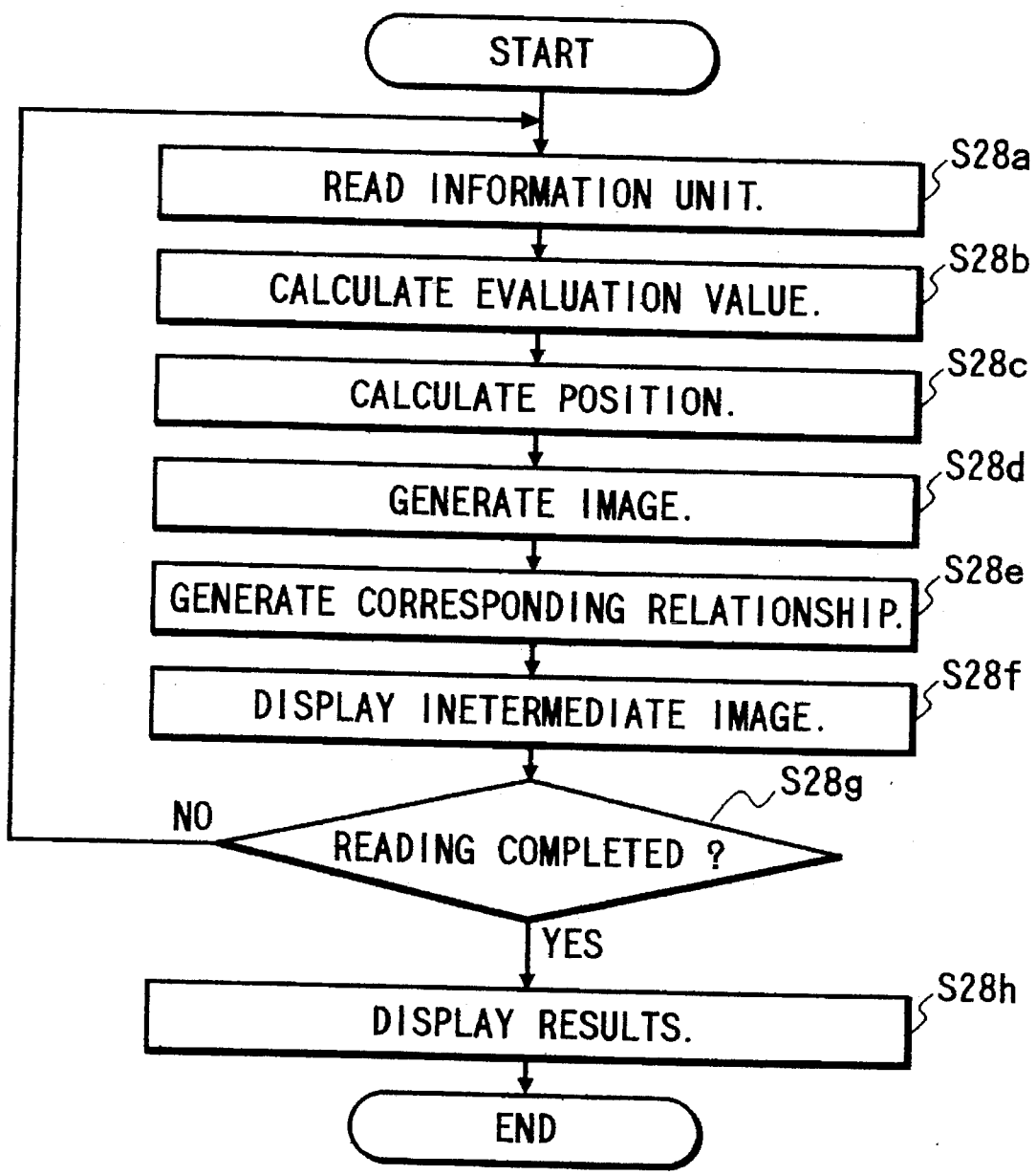
FIG. 28 is a flowchart showing a process of forming a one-dimensional image.

FIG. 28 is a flowchart showing this process.

Figure 29:
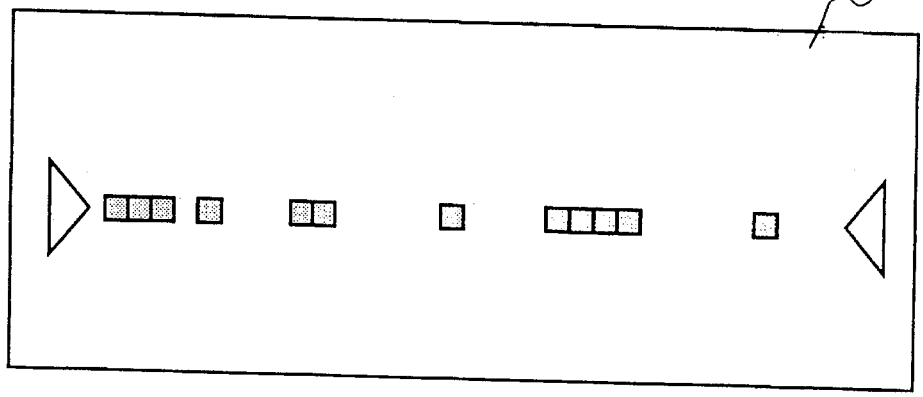
FIG. 29 shows an example of a one-dimensional image.

The process of FIG. 28 is the same as that of FIG. 5 except that there is only one evaluation value calculating step (S28b) because of the one-dimensional nature. Accordingly, data stored in the evaluation value retaining means 12a and the corresponding relationship retaining means 13b are also one-dimensional. FIG. 29 shows an example of a display produced by the process under consideration.

Three-dimensional display

A description will be made of a process of reading information units and expressing those as a three-dimensional image.

Figure 30:
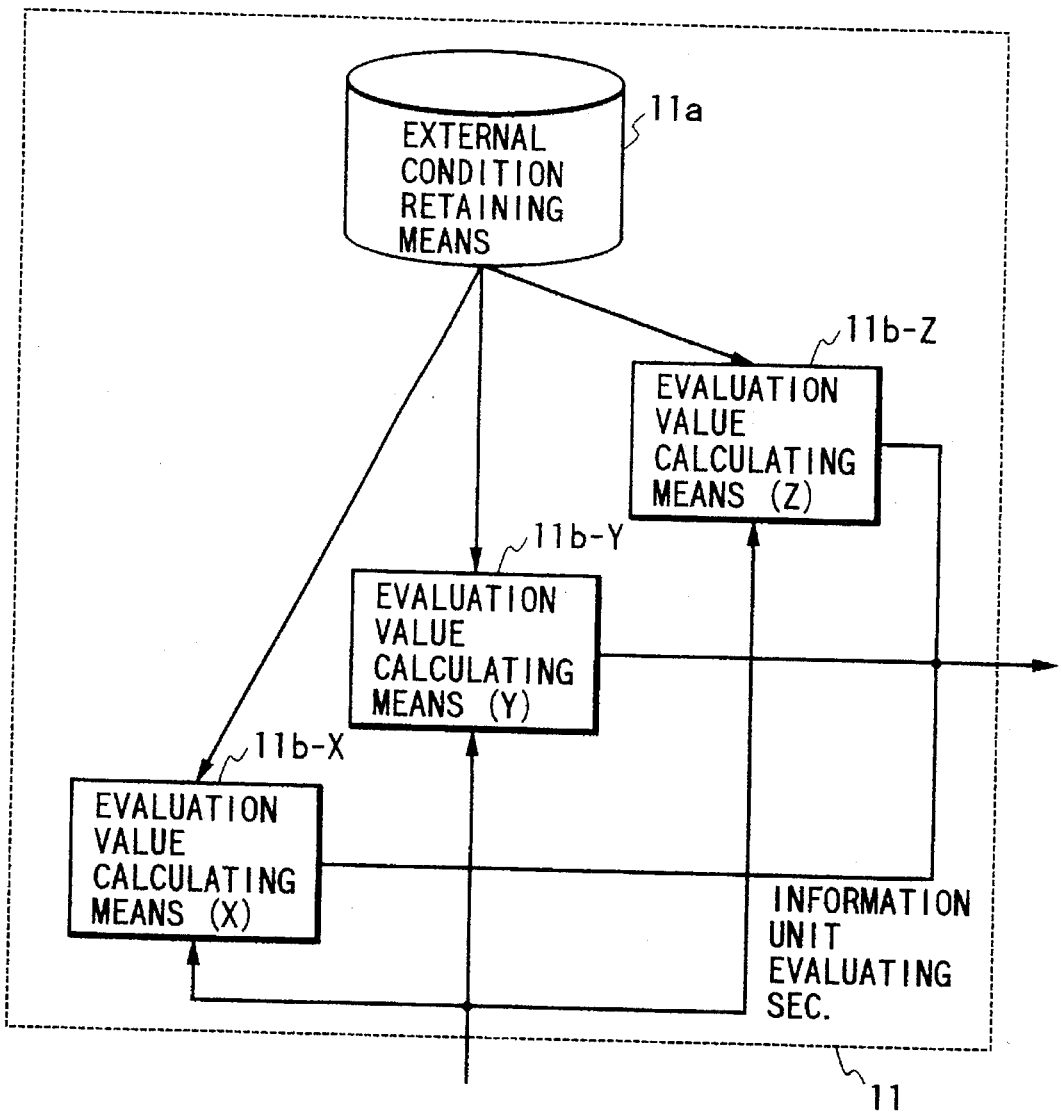
FIG. 30 is a block diagram showing a configuration of an information unit evaluating section for generating a three-dimensional image.
Figure 31:
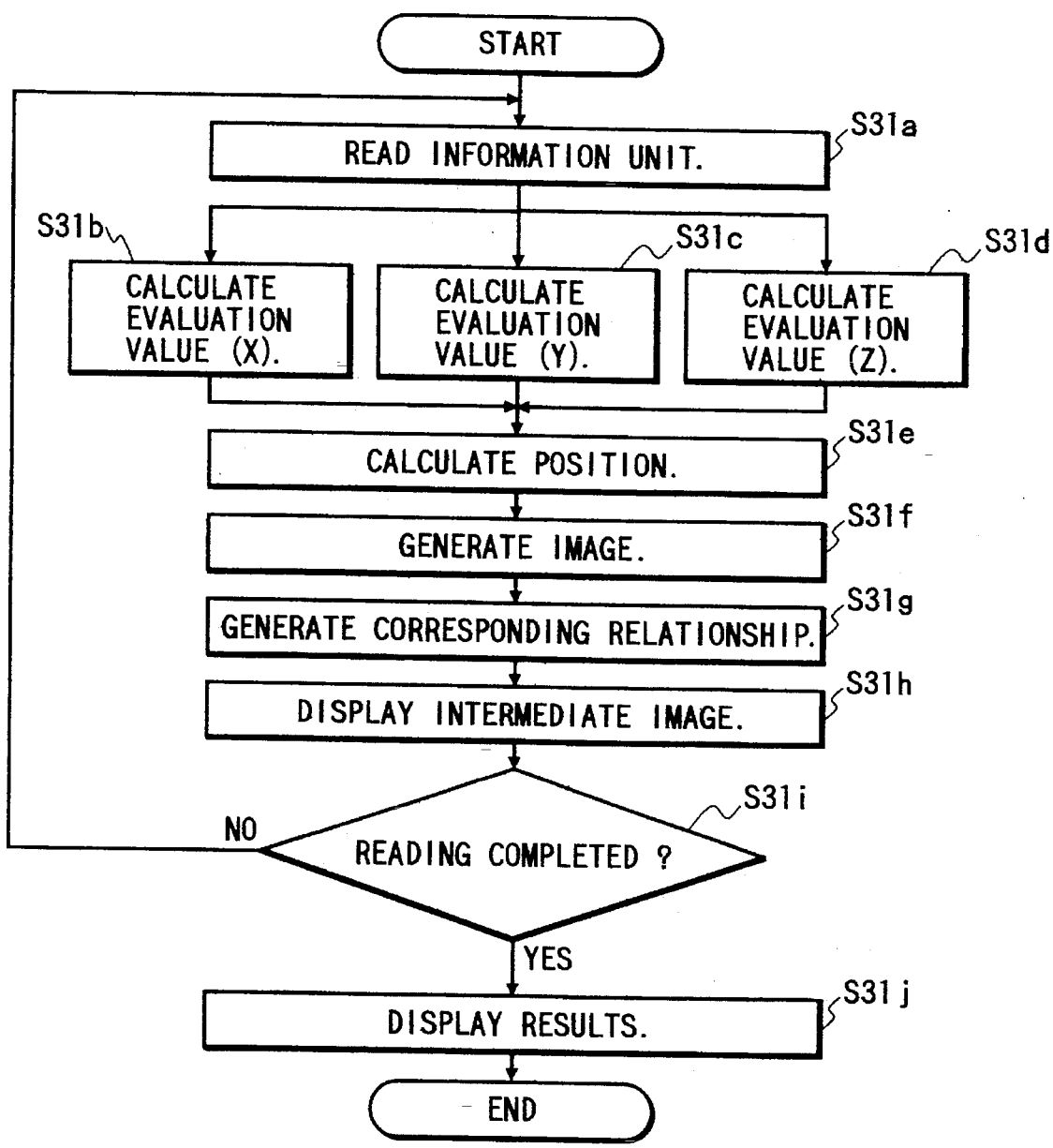
FIG. 31 is a flowchart showing a process of forming a three-dimensional image.

To provide a three-dimensional expression, the information unit evaluating section 11 has, as shown in FIG. 30, an evaluation value calculating means (X) 11b-X for calculating an evaluation value on the X-axis, an evaluation value calculating means (Y) 11b-Y for calculating an evaluation value on the Y-axis, an evaluation value calculating means (Z) 11b-Z for calculating an evaluation value on the Z-axis, and an external condition retaining means 11a for storing external conditions to be used in calculating evaluation values. FIG. 31 is a flowchart showing this process.

Figures 32, 35:
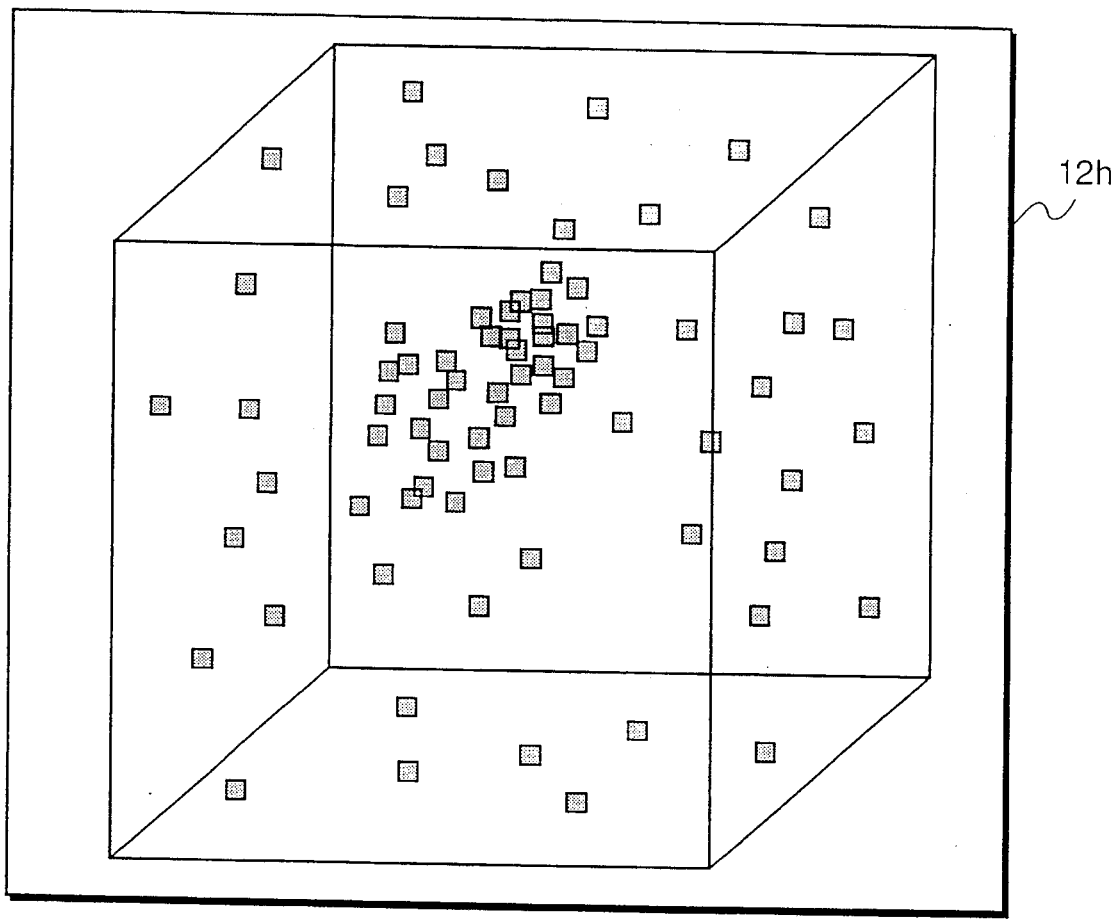
FIG. 32 is an example of a three-dimensional image.
FIG. 35 shows an example of information stored in a form retaining means.

The process of FIG. 31 is the same as that of FIG. 5 except that there are three evaluation value calculating steps (S31b, S31c and S31d) because of the three-dimensional nature. Accordingly, data stored in the evaluation value retaining means 12a and the corresponding relationship retaining means 13b are also three-dimensional. FIG. 32 shows an example of a display produced by the process under consideration.

In the information presenting apparatus according to the first embodiment, stored information units are read, evaluation values are calculated for the respective information units, and an image is formed in which image constituting elements that represent the respective information units are arranged. Further, by directly indicating one of the information constituting elements being arranged, the corresponding information unit can be accessed.

As a result, a user can recognize or analyze information units that would not be arranged as they are, with a feeling of directly arranging the information units themselves. Further, by changing the information units arranging method or external conditions in various manners, it has become possible to consider what meaning the information units have as a whole, or even discover a new aspect which has not been recognized previously or conceive a new idea. These are very effective in analyzing a vast amount of information, planning how to collect information in the future, or conceiving a new idea.

By storing calculated position information, an image can be displayed after reading all the information units. By automatically calculating a display region based on evaluation values of information units, an image can be displayed in a proper display region in accordance with the data read without designating a display range or the like in advance. Further, by displaying an image so that it varies with time, a user is allowed to recognize a temporal variation etc. of information units.

Further, since the designated element altering means alters an image constituting element designated by a user, the designated element becomes more recognizable to the user.

Second Embodiment

Whole configuration

Figure 33:
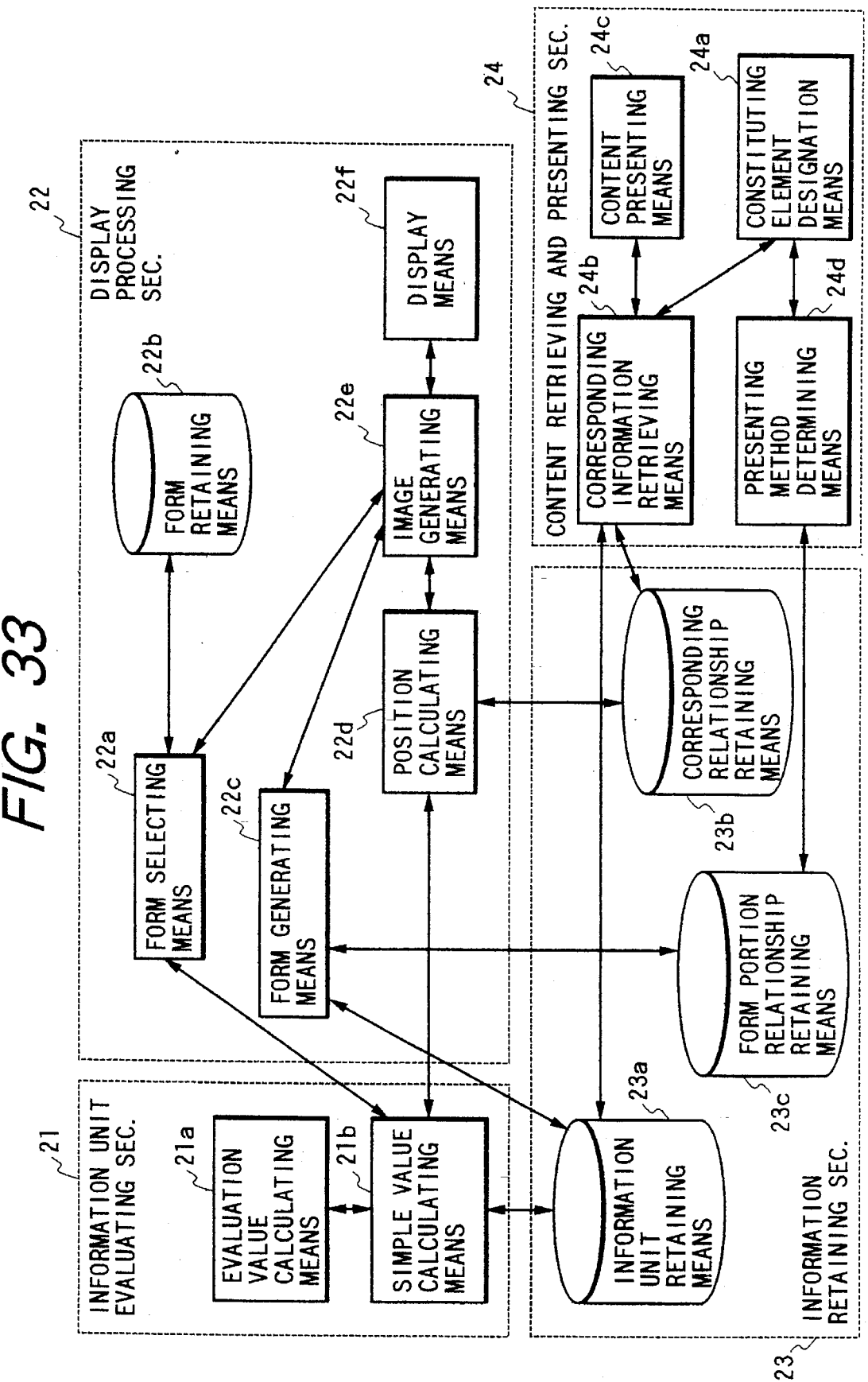
FIG. 33 is a block diagram showing a configuration of an information presenting apparatus according to a second embodiment of the invention.

FIG. 33 is a block diagram showing the entire configuration of an information presenting apparatus according to a second embodiment of the invention. This apparatus consists of an information unit evaluating section 21, a display processing section 22, an information retaining section 23 and a content retrieving and presenting section 24.

In the information unit evaluating section 21, an evaluation value calculating means 21a reads information units from the information retaining means 23a, and calculates an evaluation value of characteristics of each information unit. A simple value calculating means 21b reads the information units and extracts values thereof.

In the display processing section 22, a form retaining means 22b retains forms of image constituting elements and conditions for selection of those forms. A form selecting means 22a selects a form of an image constituting element based on the evaluation value calculated by the information unit evaluating section 21 and the conditions retained by the form retaining means 22b. A form generating means 22c generates a form of an image constituting element based on the characteristics etc. of the information unit. A position calculating means 22d determines a position of an image constituting element based on the evaluation value. An image generating means 22e generates an image in which the image constituting elements are arranged at the positions determined by the position calculating means 22d. The image is displayed on a display means 22f.

In the information retaining section 23, an information unit retaining means 23a retains a plurality of information units. A corresponding relationship retaining means 23b retains a corresponding relationship between the information units and the corresponding image constituting elements. A form portion relationship retaining means 23c retains a corresponding relationship between positions of portions of each image constituting element and contents to be presented of the information unit.

In the content retrieving and presenting section 24, a constituting element designation means 24a receives designation of a constituting element of an image displayed on the display means 22f. A corresponding information retrieving means 24b retrieves an information unit corresponding to the designated image constituting element. A content presenting means 24c presents a content of the retrieved information unit. A presenting method determining means 24d determines a method of presenting the information unit based on a content of the designation.

Image display by form selection

Figure 34:
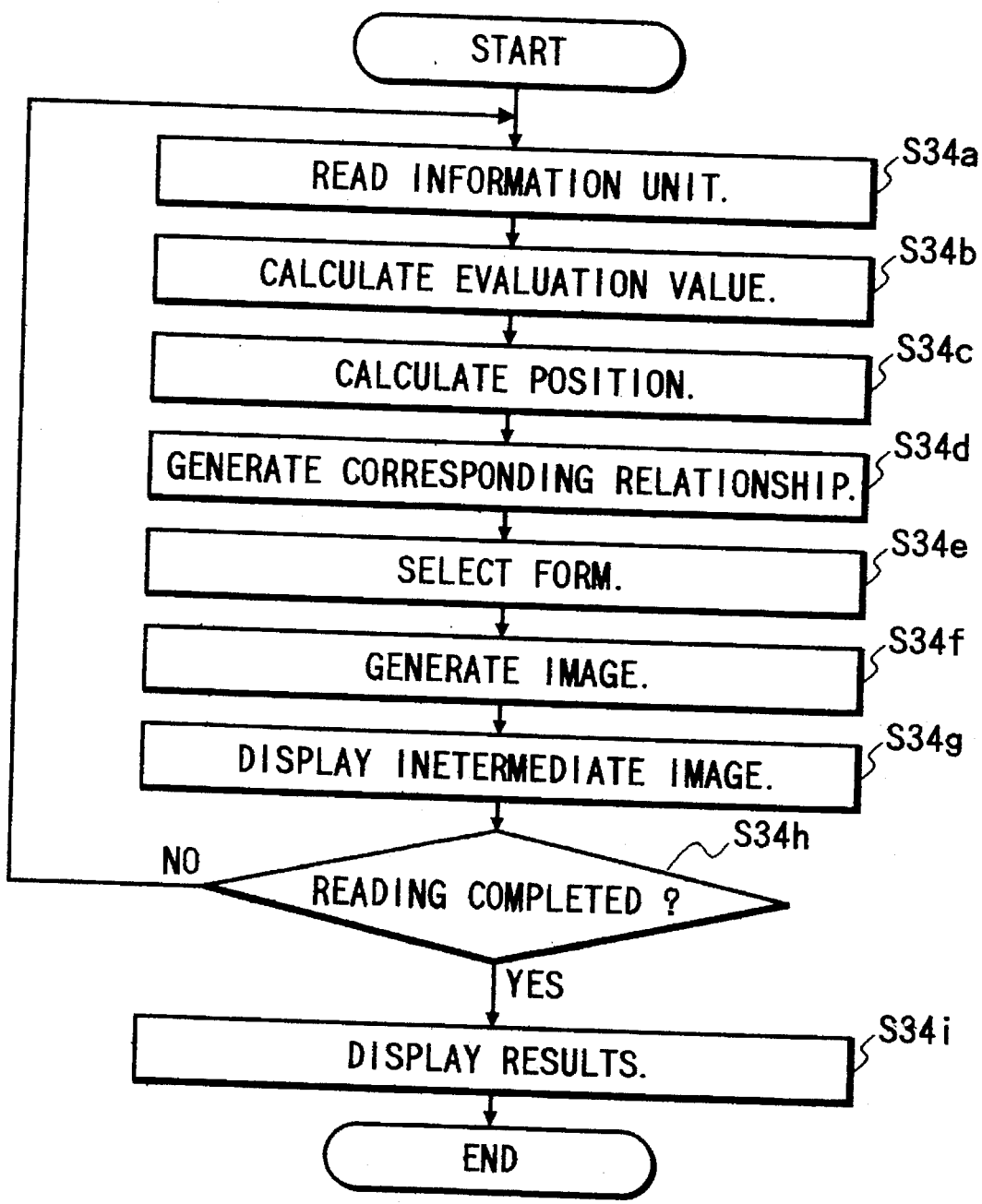
FIG. 34 is a flowchart showing a process of displaying an image by form selection.

A description will be made of a process of sequentially reading information units, arranging image constituting elements having forms that have been selected in accordance with characteristics etc. of the information units, and displaying an image. It is assumed that a plurality of information units are stored in the information unit retaining means 23a in the manner as shown in FIG. 4. In this example, each information unit consists of three parts of a "title," a "text body" and "keywords." FIG. 34 is a flowchart showing this process.

Figure 36:
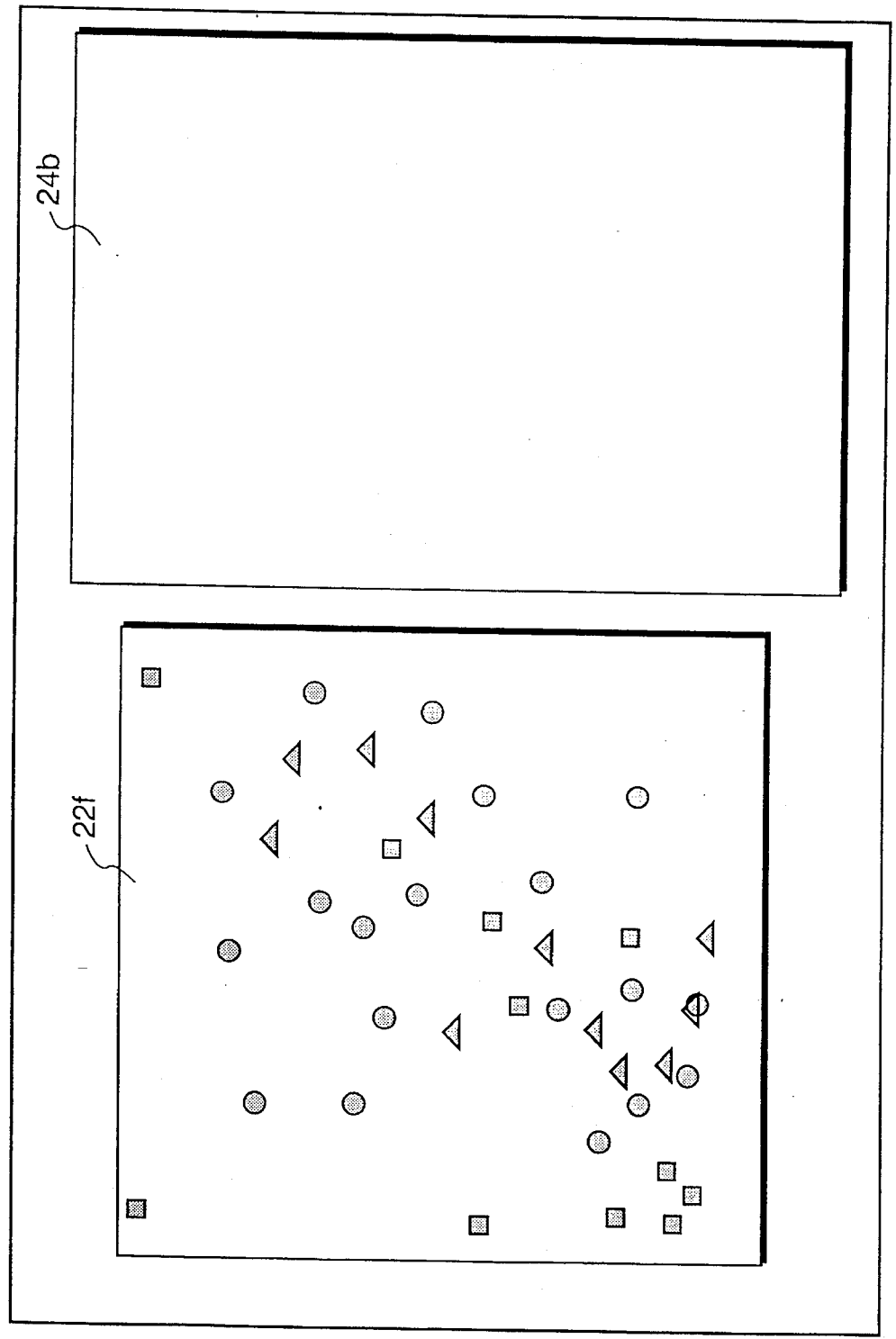
FIG. 36 shows an example of a displayed image in which shapes of image constituting elements are changed.
Figure 37:
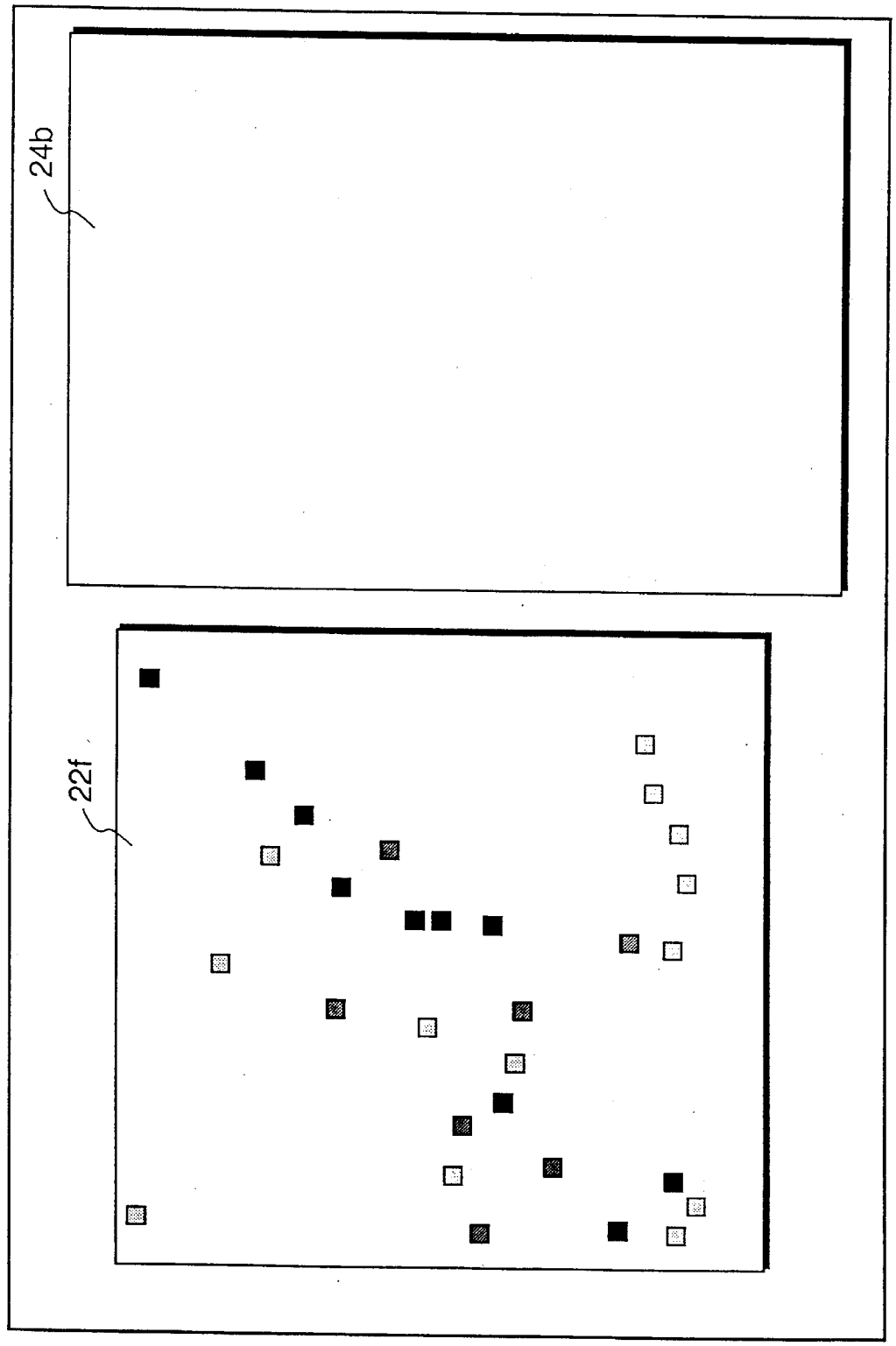
FIG. 37 shows an example of a displayed image in which colors (densities) of image constituting elements are changed.

First, the simple value calculating means 21b reads an information unit from the information unit retaining means 23a (step S34a). If the simple value calculating means 21b cannot determine in a simple manner whether the information unit satisfies a condition, the information unit is forwarded to the evaluation value calculating means 21a, which calculates an evaluation value (step S34b). When a position can be determined in a simple manner, for instance, when the information unit is a numerical value, it is not necessary to calculate an evaluation value. Then, the position calculating means 22d calculates a display position based on the calculated value (step S34c), and a corresponding relationship between the position and the information unit is stored into the corresponding relationship retaining means 23b in the manner as shown in FIG. 7 (step S34d). Then, based on another value calculated by the simple value calculating means 21b or evaluation value calculating means 21a and the form information stored in the form retaining means 22b in the manner as shown in FIG. 35, the form selecting means 22a determines a display form of the image constituting element (step S34e). The image generating means 22e generates an image expressing existence of the information units based on the position information and the form information (step S34f), and displays an intermediate image of the display means 22f (step S34g). The above operation is repeated until all the necessary information units are read (step S34h). A final image is displayed on the display means 22f in the manner as shown in FIG. 36 or 37, and the process is finished (step S34i). Characteristics or the like of the information units are expressed by changing shapes of the image constituting elements in FIG. 36, and by changing their colors or densities in FIG. 37.

Image display by form generation

Figure 38:
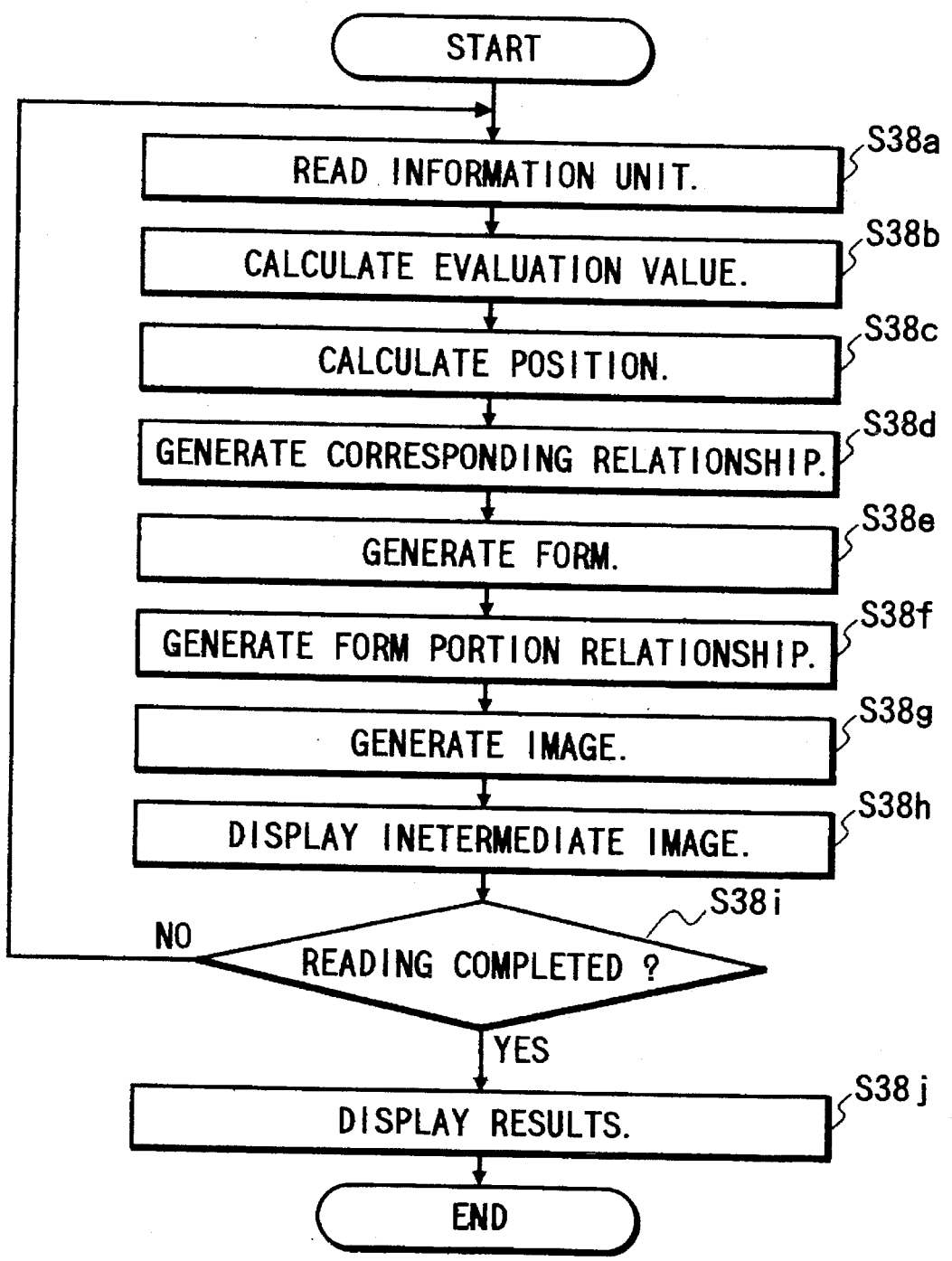
FIG. 38 is a flowchart showing a process of displaying an image by form generation.

A description will be made of a process of sequentially reading information units, arranging image constituting elements whose forms are altered in accordance with characteristics etc. of the information units, and displaying an image of the information units. FIG. 38 is a flowchart showing this process.

Figure 39:
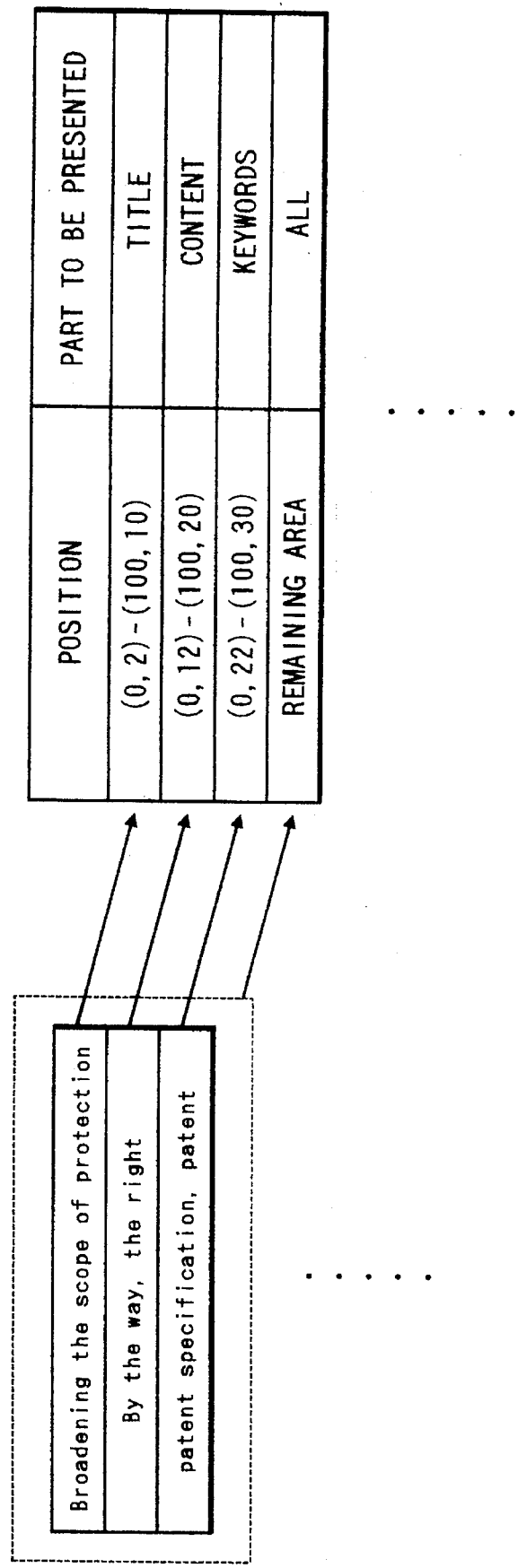
FIG. 39 shows an example of information stored in a form portion relationship retaining means.
Figure 40:
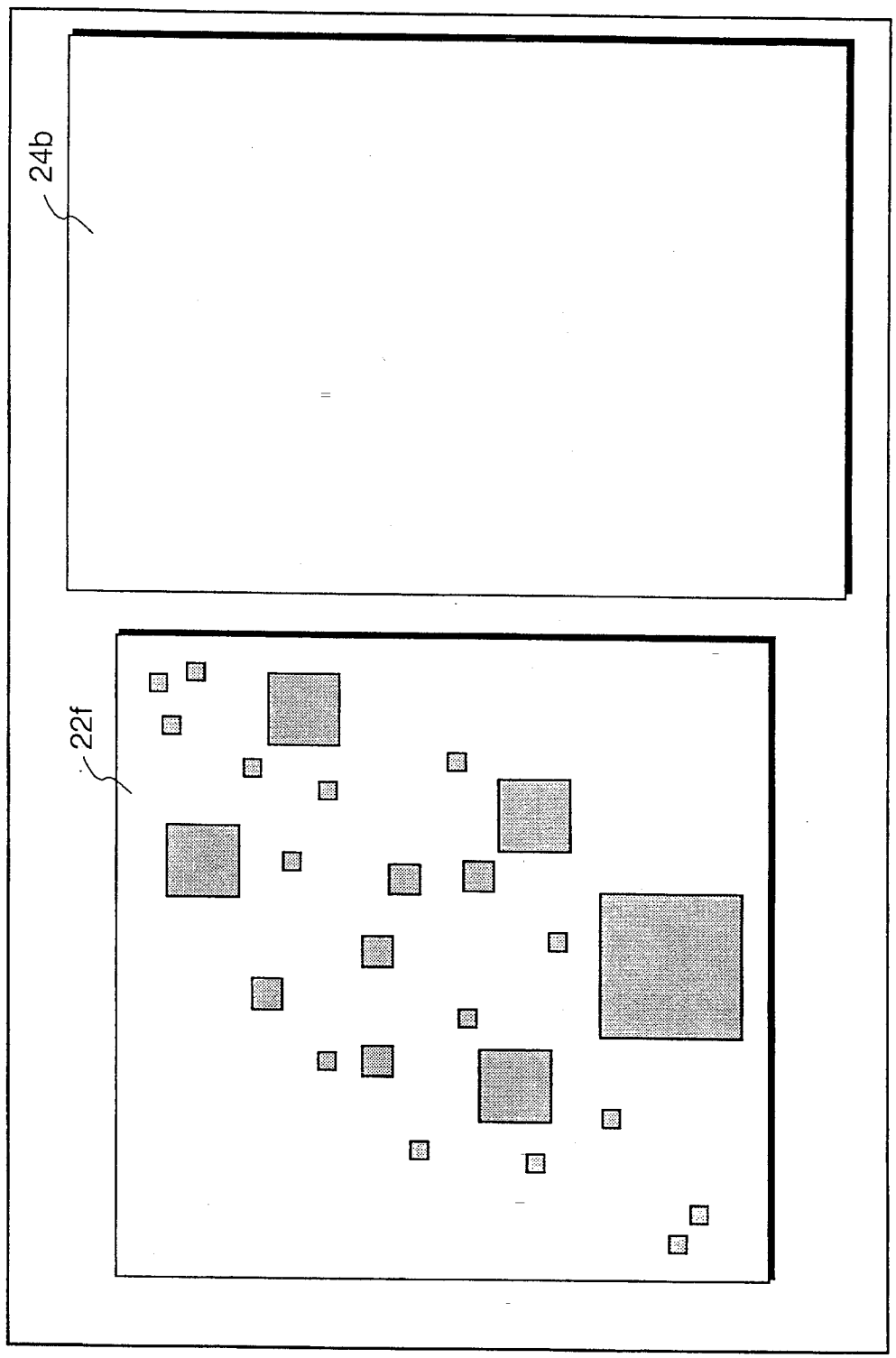
FIG. 40 shows an example of a displayed image that is formed based on evaluation values.
Figure 41:
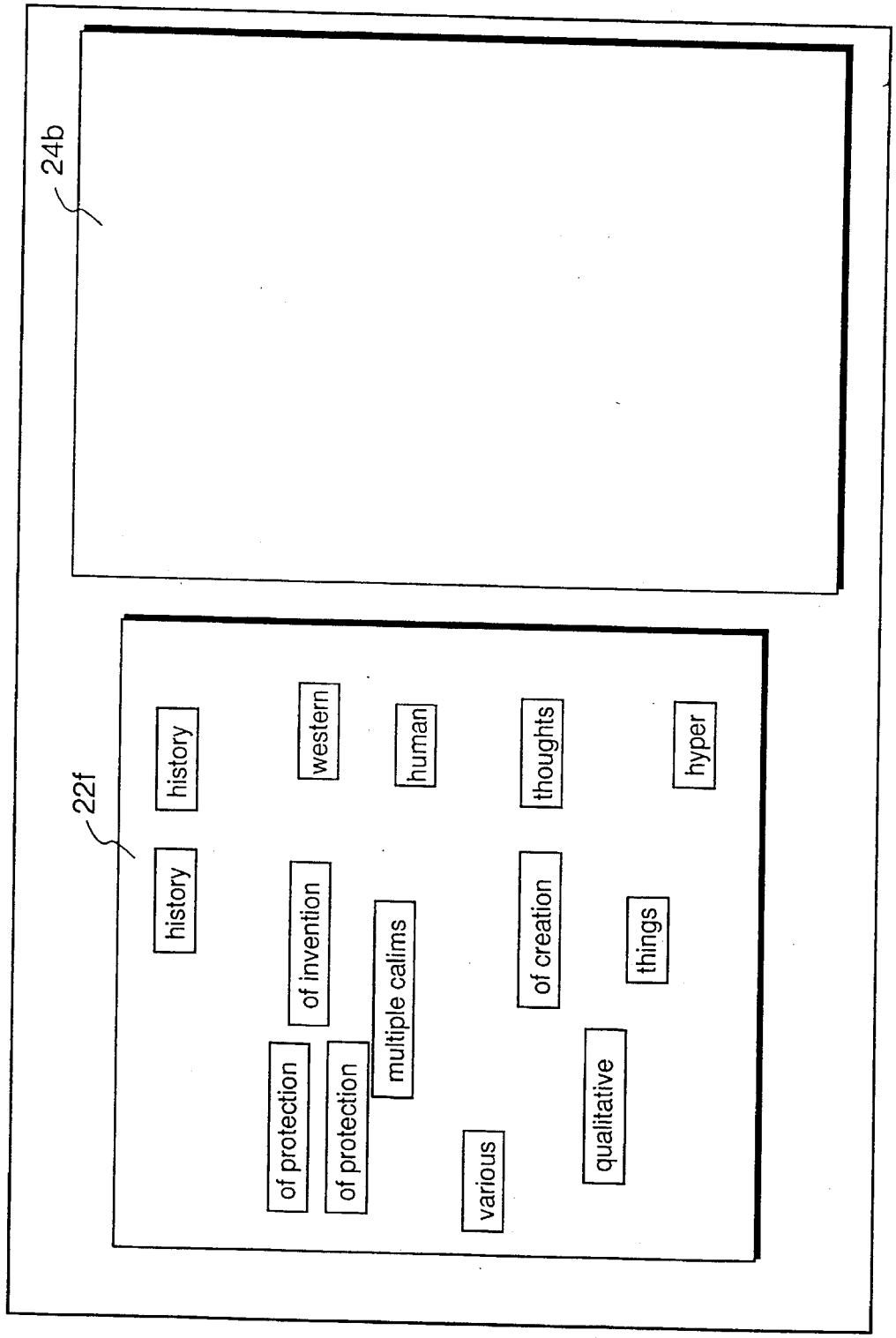
FIG. 41 shows an example of a displayed image that is formed using head portions of respective titles.
Figure 42:
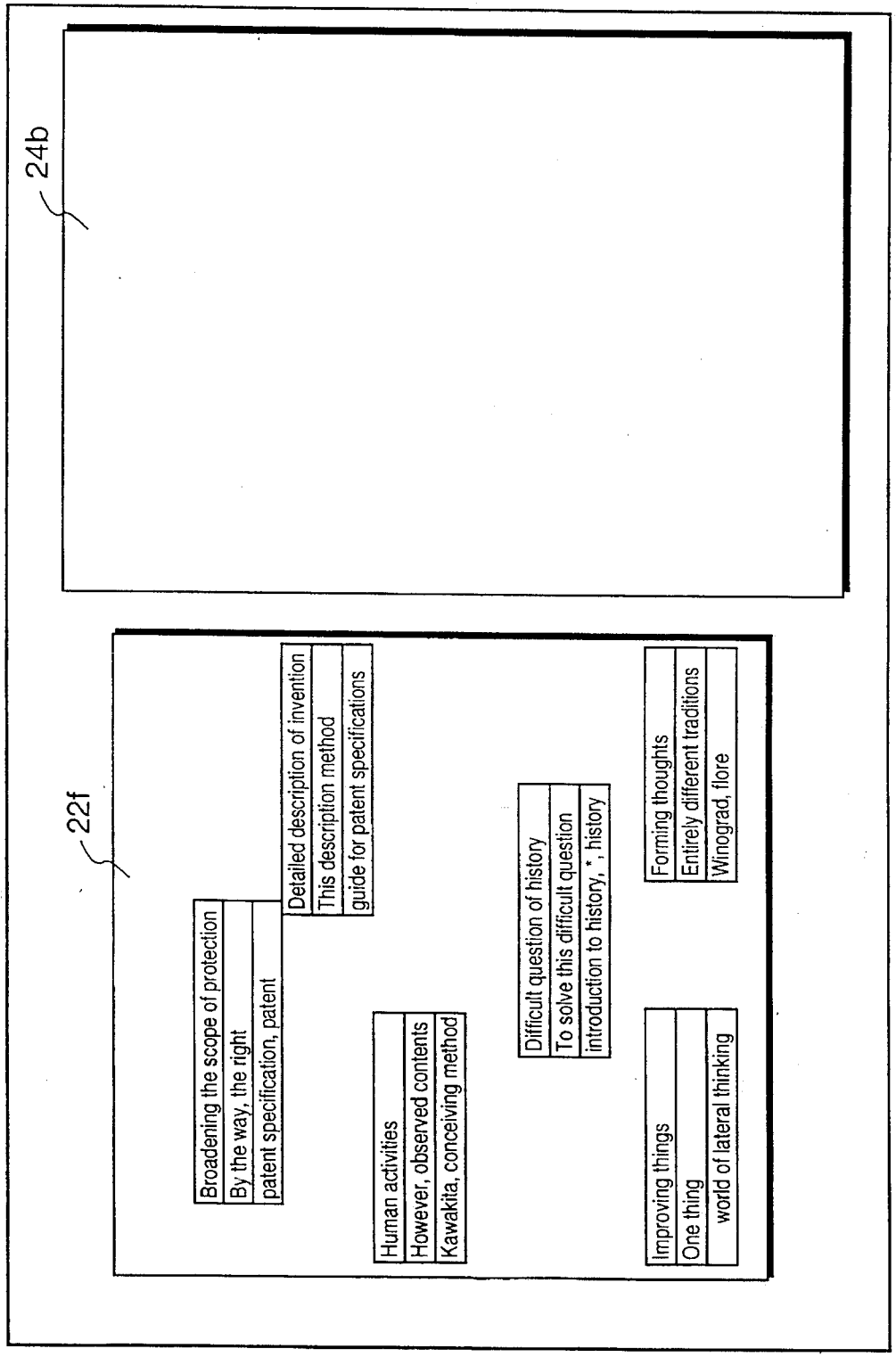
FIG. 42 shows an example of a displayed image in which each image constituting element is formed of head portions of respective parts of the information unit.

First, the simple value calculating means 21b reads an information unit from the information unit retaining means 23a (step S38a). If the simple value calculating means 21b cannot determine in a simple manner whether the information unit satisfies a condition, the information unit is forwarded to the evaluation value calculating means 21a, which calculates an evaluation value (step S38b). When a position can be determined in a simple manner, for instance, when the information unit is a numerical value, it is not necessary to calculate an evaluation value. Then, the position calculating means 22d calculates a display position based on the calculated value (step S34c), and a corresponding relationship between the position and the information unit is stored into the corresponding relationship retaining means 23b in the manner as shown in FIG. 7 (step S38d). Then, the form generating means 22c generates a display form of an image constituting element based on the evaluation value of the information unit (step S38e). The display form can be generated by using proper one of various methods: changing the size by calculating an evaluation value of the information unit; extracting part of the title of the information unit; displaying head portions of respective parts; and generating a text layout. Then, a relationship between information of portions of the form of the image constituting element and parts of the information unit that are presented when respective portions of the image constituting element are designated is stored into the form portion relationship retaining means 37c in the manner as shown in FIG. 39. The image generating means 22e generates an image expressing the existence of the information units based on the position information and the form information (step S38f), and displays an intermediate image on the display means 22f (step S38g). The above operation is repeated until all the necessary information units are read (step S38h). A final image is displayed on the display means 22f in the manner as shown in FIGS. 40–43 (step S38i), and the process is finished. FIG. 40 shows an example in which the image constituting elements have different sizes in accordance with magnitudes of the evaluation values of the information units. In FIG. 41, each image constituting element is generated from a head portion of the title of the information unit. In FIG. 42, image constituting elements are generated from respective head portions of the "title," "text body" and "keywords." In FIG. 43, each image constituting element is generated from a text layout.

Presentation of content

Figure 44:
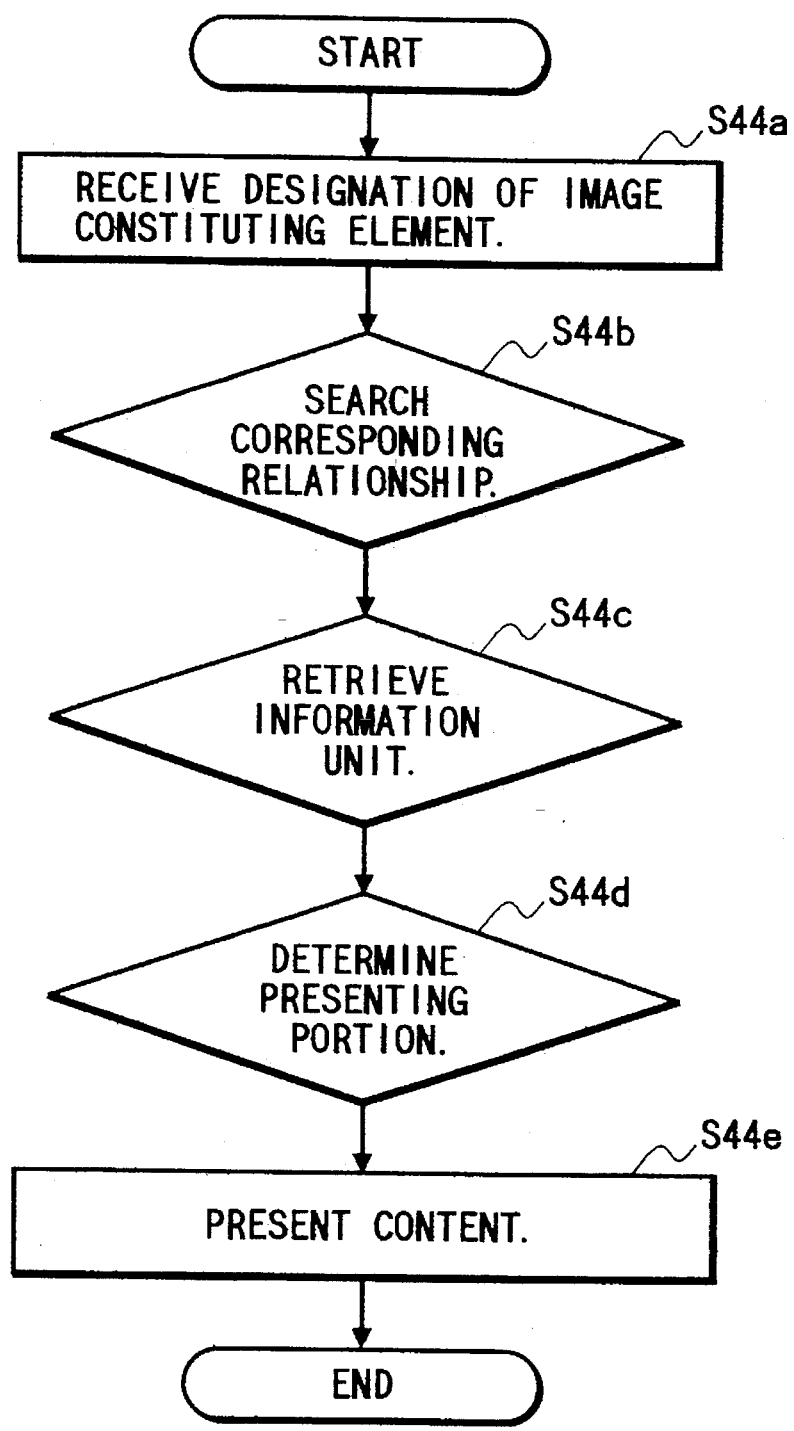
FIG. 44 is a flowchart showing a process of presenting a content.

A description will be made of a process of presenting a content of an information unit in response to designation of the corresponding image constituting element. In particular, the following description is directed to the case in which the presented content is changed in accordance with the position of an image constituting element designated by a user. FIG. 44 is a flowchart showing this process.

Figure 45:
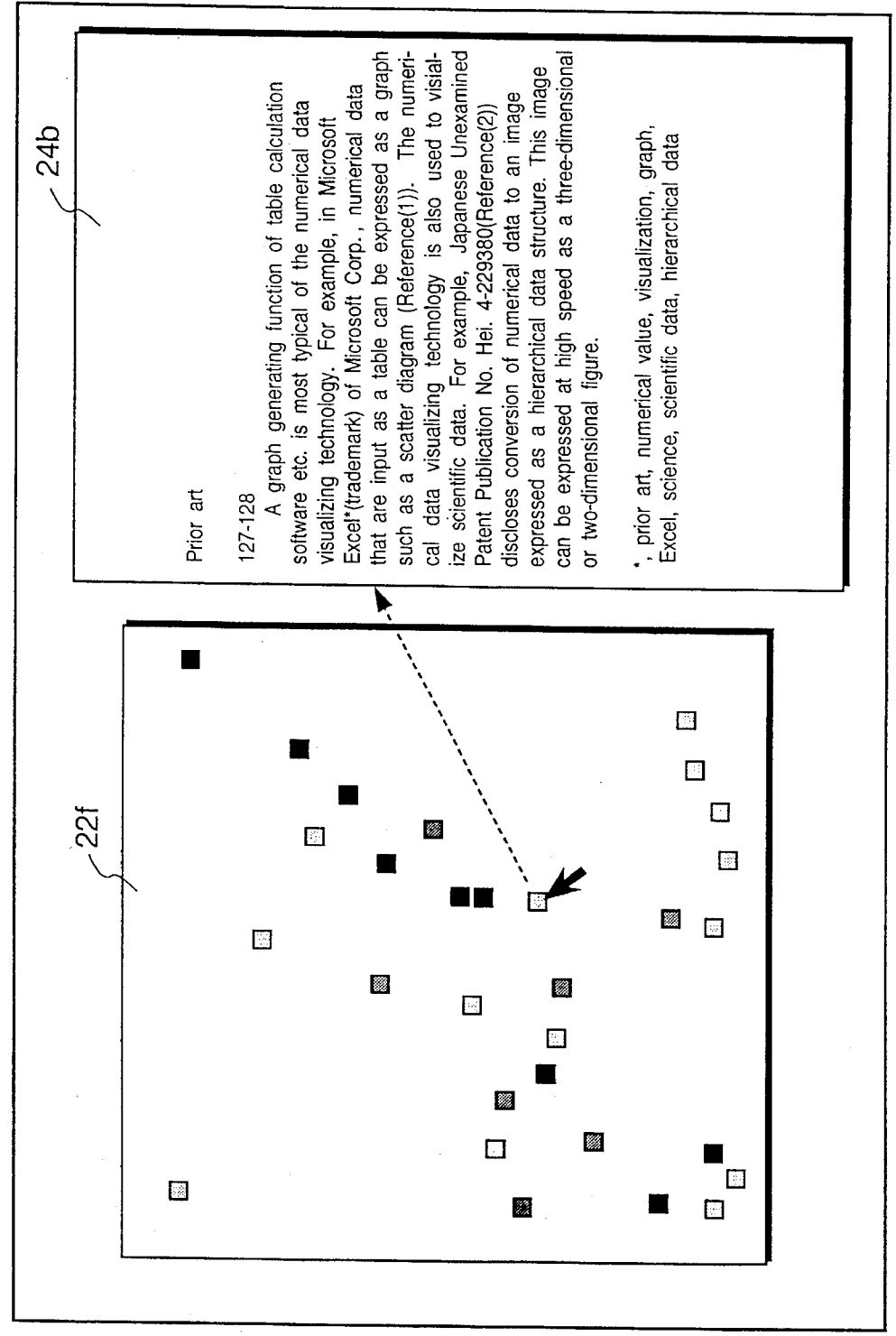
FIG. 45 shows an example of a standard method of presenting a content.
Figure 46:
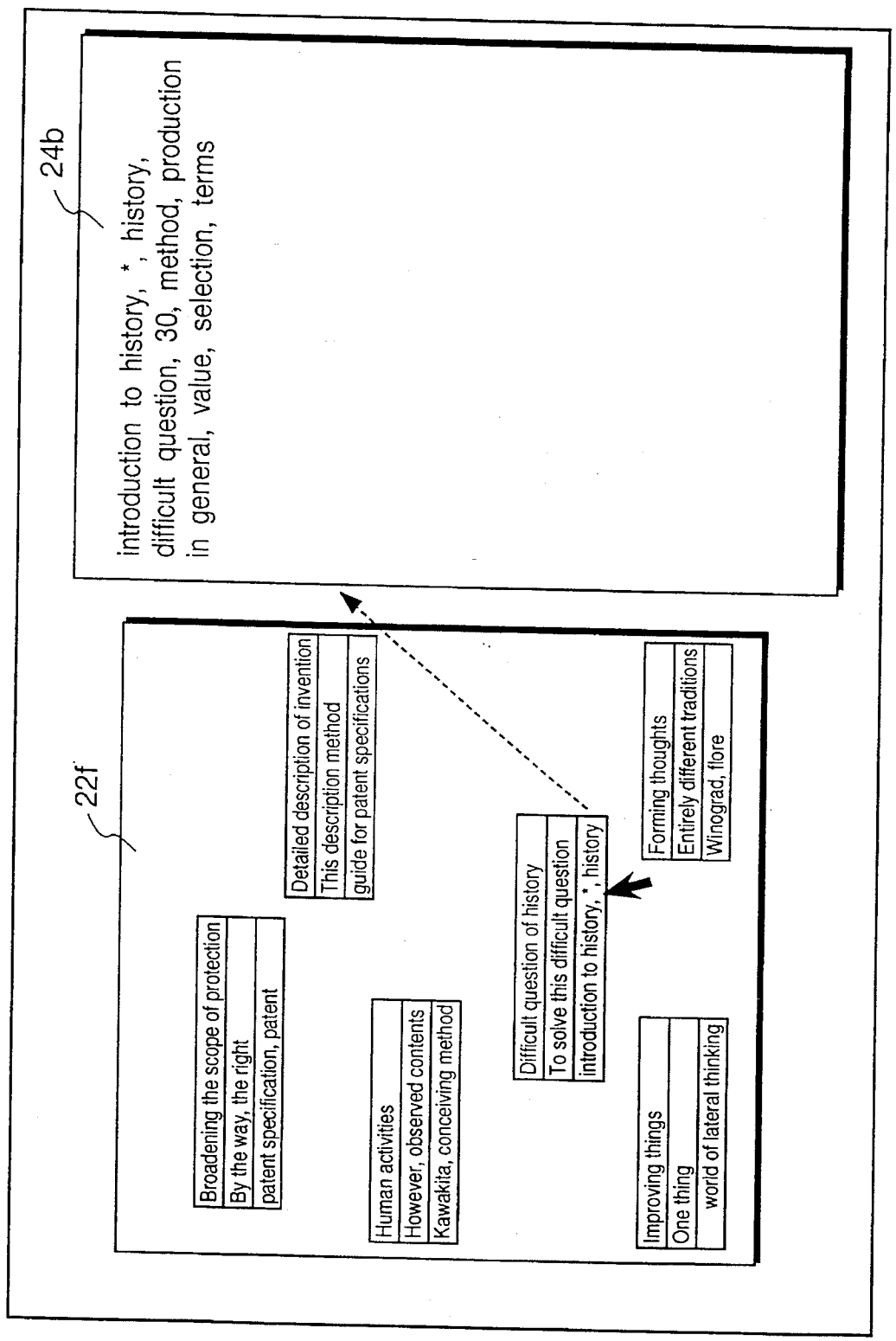
FIG. 46 shows an example of a content displayed by partial designation.

The constituting element designation means 24a receives a user's designation of an image constituting element, and sends it to the corresponding information retrieving means 24b (step S44a). Based on the user's designation, the corresponding relationship retrieving means 24b searches the information stored in the corresponding relationship retaining means 23b in the manner as shown in FIG. 7, judges what information unit the user has designated, and obtains its ID (step S44b). Based on the ID, the corresponding relationship retrieving means 24b searches the information unit retaining means 23a, and fetches the corresponding information unit (step S44c). At the same time, the presenting method determining means 24d searches the relationship between the respective portions of the image constituting element and the parts to be presented which relationship is stored in the form portion relationship retaining means 23c in the manner as shown in FIG. 39, and determines the part to be presented actually (step S44d). The part of the content of the information unit thus determined is displayed on the content presenting means 24c (step S44e), and the process is finished. FIG. 45 shows an example of a display in which the information unit corresponding to the image constituting element designated by the user is simply displayed on the content presenting means 24c. FIG. 45 shows an example of a display in which the content of presentation is changed in accordance with the designated portion. In this example, only the keyword part of an information unit is displayed by designating the keyword portion of its image constituting element.

Figure 43:
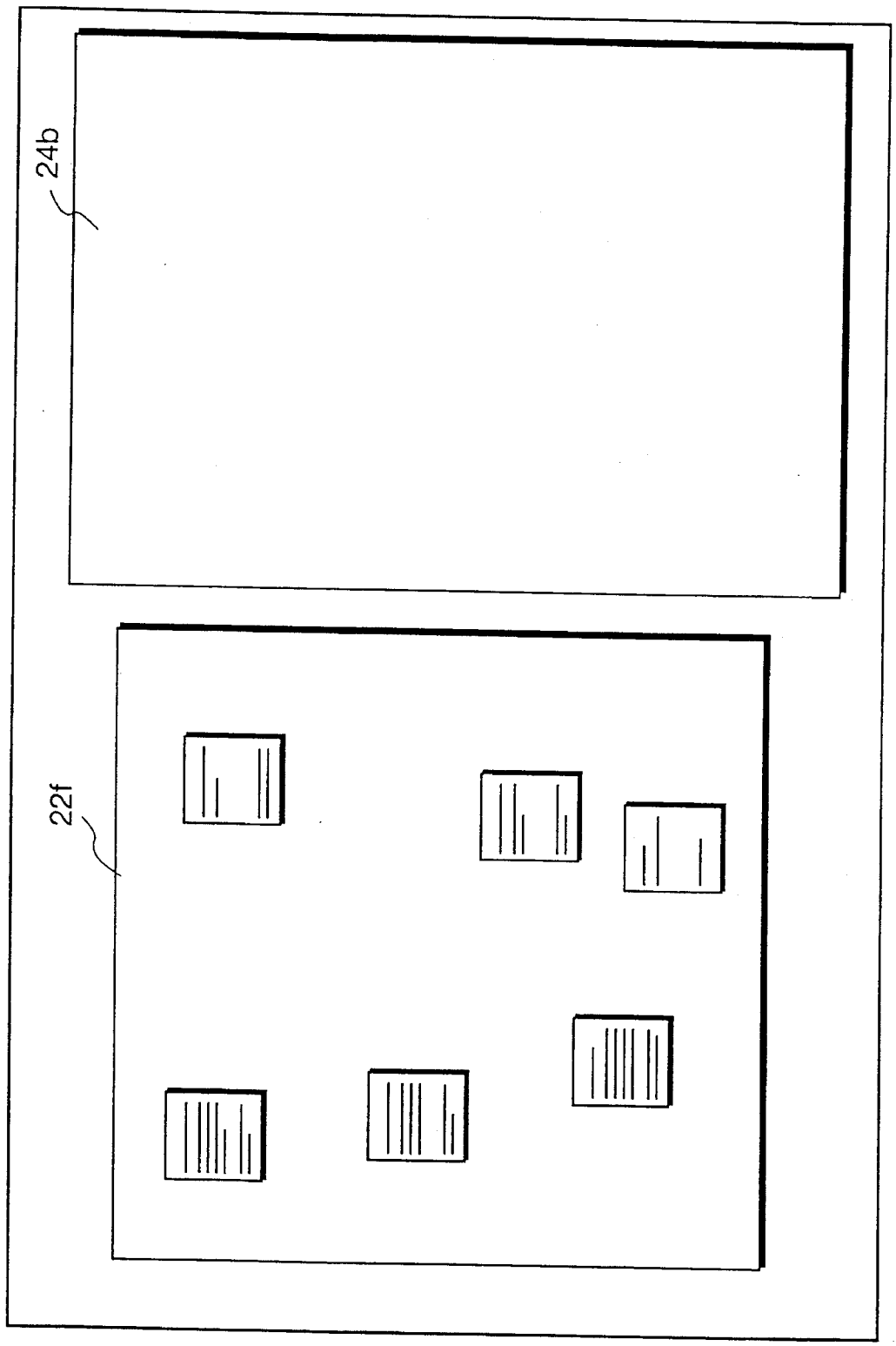
FIG. 43 shows an example of a displayed image that is formed using text layouts.

While in the above process a portion to be presented is determined by searching the information of the form portion relationship retaining means 23c, it may be determined by calculating a value based on a designated position. For example, where image constituting elements that represent text layouts are displayed as shown in FIG. 43, a portion starting from a certain line may be presented by designating a displayed portion that represents that line.

While in the above process a portion to be presented is determined from a position designated by a user, other various presenting methods may be employed. For example, the quality of presentation of a picture or sound may be determined from the kind of mouse clicking, or a filter of format conversion, for instance, may be presented in accordance with a user's selection.

While in the above process each information unit includes character information, it may include sound, a picture, a moving picture, etc.

In the information presenting apparatus according to the second embodiment, stored information units are read, and image constituting elements are arranged so as to have different forms in accordance with characteristics etc. of the respective information units. Further, by directly indicating one of the information constituting elements being arranged, the corresponding information unit can be accessed. As a result, a user can arrange image constituting elements under various conditions, with a feeling of directly arranging the information units themselves in an image. Further, respective image constituting elements are displayed so as to represent characteristics etc. of information units. This is very effective in analyzing a vast amount of information, planning how to collect information in the future, or conceiving a new idea. Further, since the presenting method determining means determines in accordance with a user's instruction how to present an information unit, it becomes possible to access a particular portion of the information unit more easily and to present it in a manner desired by the user.

Third embodiment

Whole configuration

Figure 47:
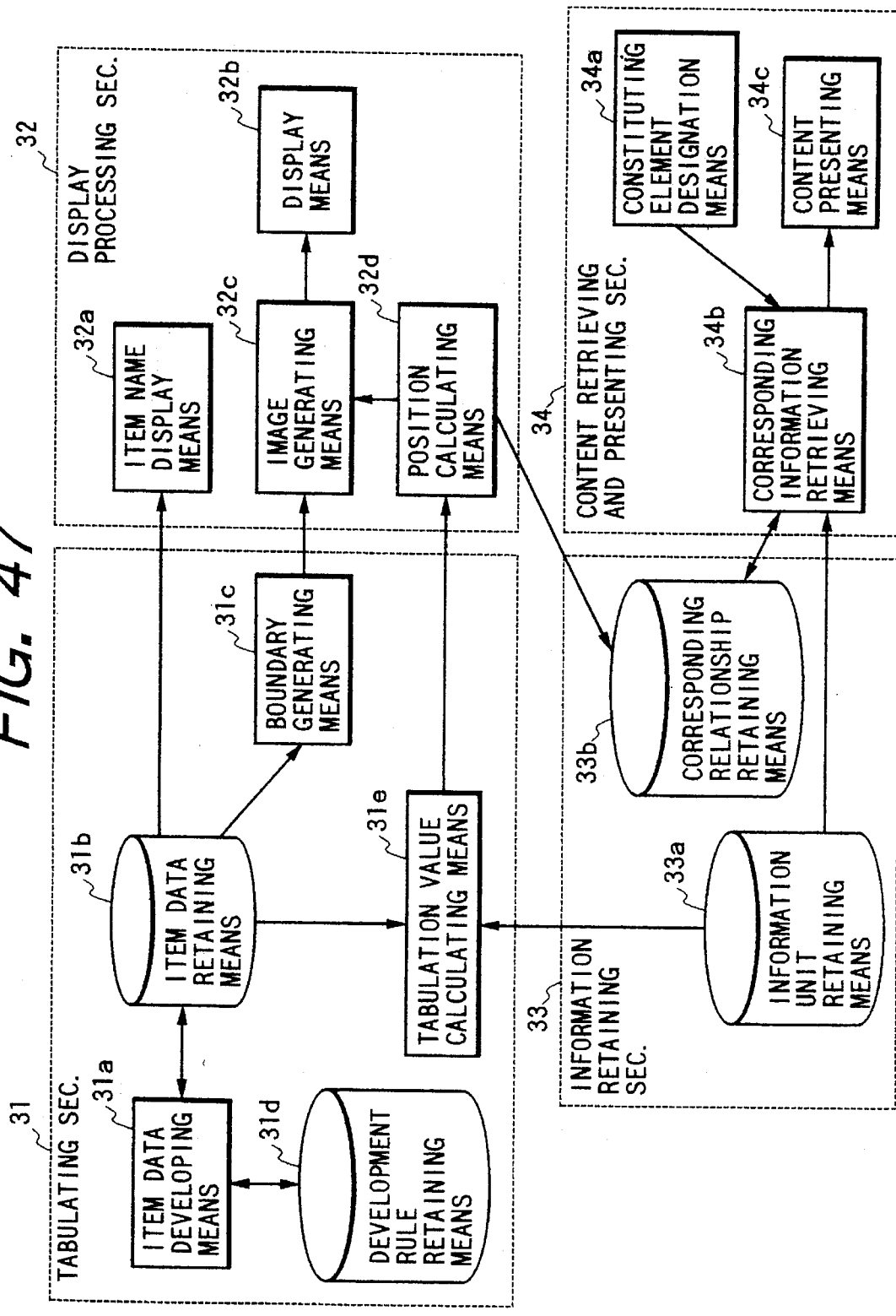
FIG. 47 is a block diagram showing an information presenting apparatus according to a third embodiment of the invention.

FIG. 47 is a block diagram showing the entire configuration of an information presenting apparatus according to a third embodiment of the invention. This apparatus has, as the basic configuration, a tabulating section 31, a display processing section 32, an information retaining section 33, and a content retrieving section 34.

In the tabulating section 31, an item data retaining means 31b stores information relating to items that constitute rows, columns, etc. of a table. A tabulation value calculating means 31e reads information units stored in an information unit retaining means 33a, and calculates, based on the information stored in the item data retaining means 31b, values to be used for arranging as a table image constituting elements that represent respective information units. A boundary generating means 31c reads the information stored in the item data retaining means 31b, and generates an image that expresses boundaries. A development rule retaining means 31d retains rules according to which the information stored in the item data retaining means 31b is to be developed. An item data developing means 31a develops the information stored in the item data retaining means 31b according to the rules stored in the development rule retaining means 31d.

In the display processing section 32, a position calculating means 32d determines an arrangement of image constituting elements based on evaluation values. An image generating means 32c generates an image in which the image constituting elements are arranged at the determined positions, and a display means 32b displays the generated image. An item name display means 32a displays names of respective items of a table.

In the information retaining section 33, an information unit retaining means 33a retains a plurality of information units. A corresponding relationship retaining means 33b retains a corresponding relationship between the information units and image constituting elements of a displayed image.

In the content retrieving and presenting section 34, a constituting element designation means 34a receives designation of a constituting element of an image being displayed on the display means 32b. A corresponding information retrieving means 34b retrieves the information unit corresponding to the designated image constituting element. A content presenting means 34c presents a content of the retrieved information unit.

Image display

Figure 48:
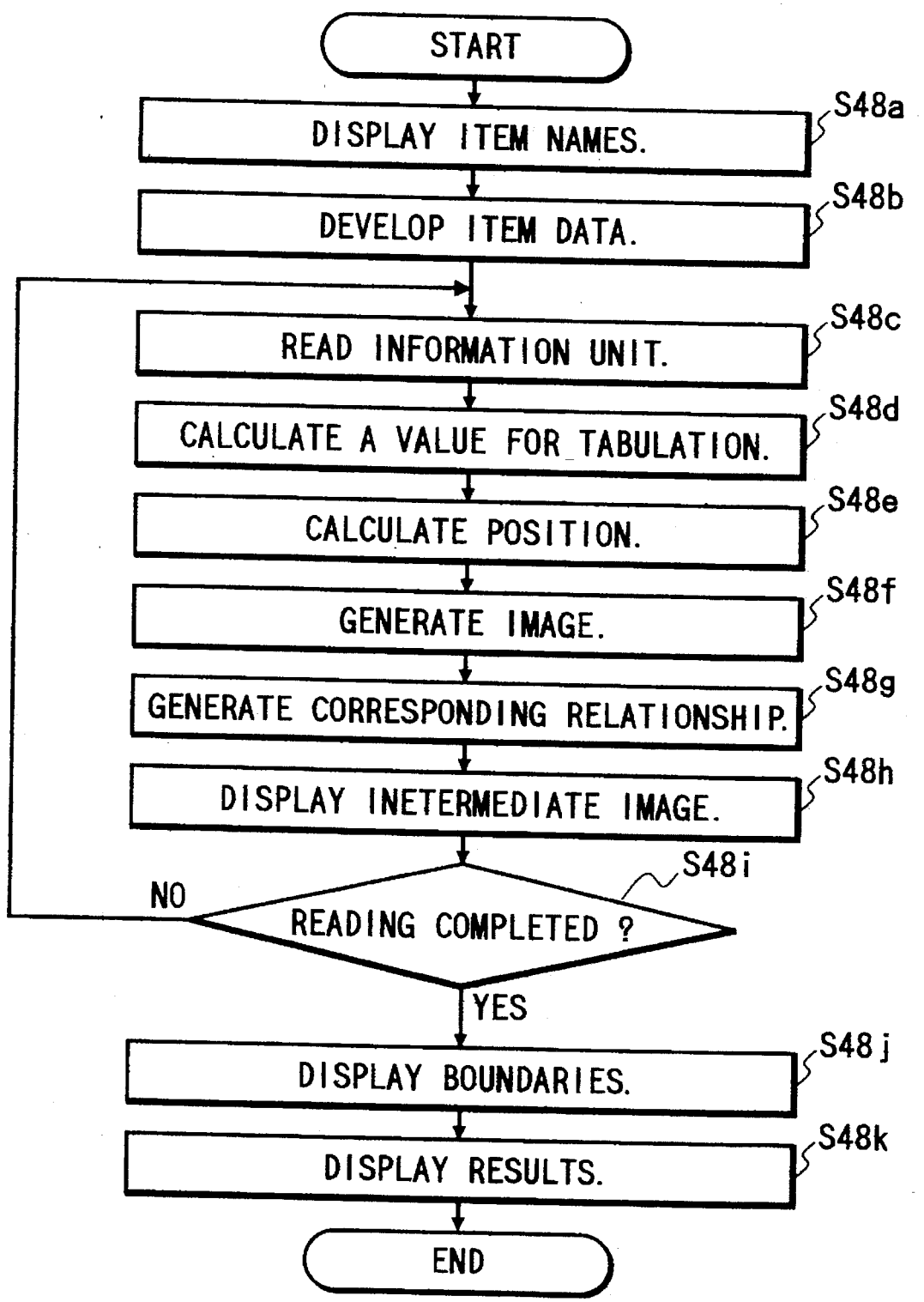
FIG. 48 is a flowchart showing a process of displaying an image that is expressed as a table.

A description will be made of a process of sequentially reading information units and displaying an image in the form of a table. It is assumed that a plurality of information units are stored in the information unit retaining means 33a, for instance, in the manner as shown in FIG. 4, as in the case of the first embodiment. FIG. 48 is a flowchart showing this process.

Figure 49:
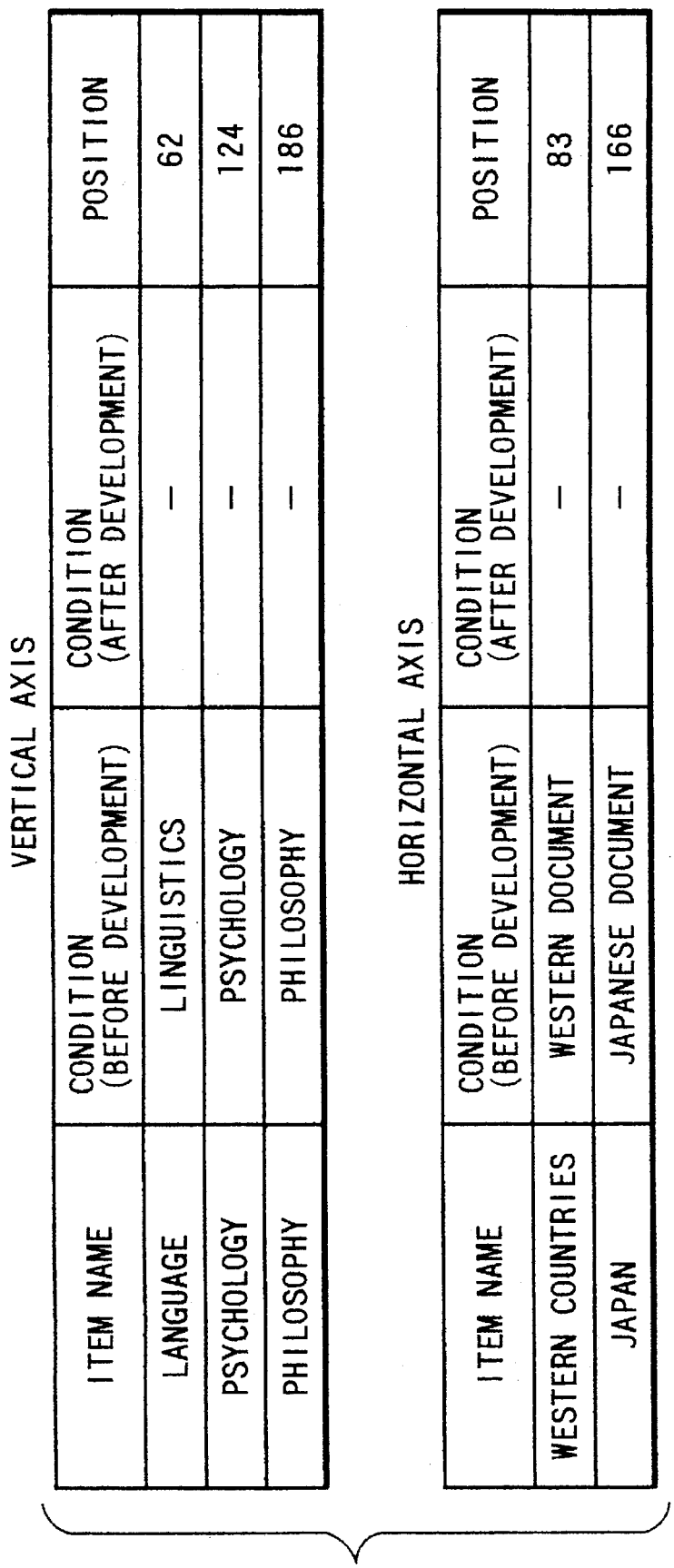
FIG. 49 shows an example of information stored in an item data retaining means (before development of conditions)

First, the item name display means 32a reads item names and position information from the information stored in the item data retaining means 31b in the manner as shown in FIG. 49, and displays the item names at appropriate positions as shown in FIG. 50 (step S48a). The item data developing means 31a reads item data under the "condition (before development)" of the information stored in the item data retaining means 31b in the manner as shown in FIG. 49, develops the thus-read item data according to rules that are stored in the development rule retaining means 31d in the manner as shown in FIG. 51, i.e., converts it to information shown in FIG. 52, and stores the resulting item data into the item data retaining means 31b (step S48b). After the above operation, the tabulation value calculating means 31e reads an information unit from the information unit retaining means 33a (step S48c). The information unit thus read is compared with each item data of the item data retaining means 31b, and a value for tabulation is calculated (step S48d). Receiving the calculated value, the position calculating means 32d calculates a position for a display (step S48e). Then, the image generating means 32c generates an image in which the image constituting element representing the information unit is placed at the calculated position (step S48f). At the same time, a corresponding relationship between the information unit and the position of the image constituting element is stored into the corresponding relationship retaining means 33b in the manner as shown in FIG. 7, as in the case of the first embodiment (step S48g). Then, an intermediate image in which the new constituting element is added to the previous image is displayed on the display means 32b in the manner as shown in FIG. 53 (step S48h). The above operation is repeated until all the necessary information units are read (step S48i).

Figure 54:
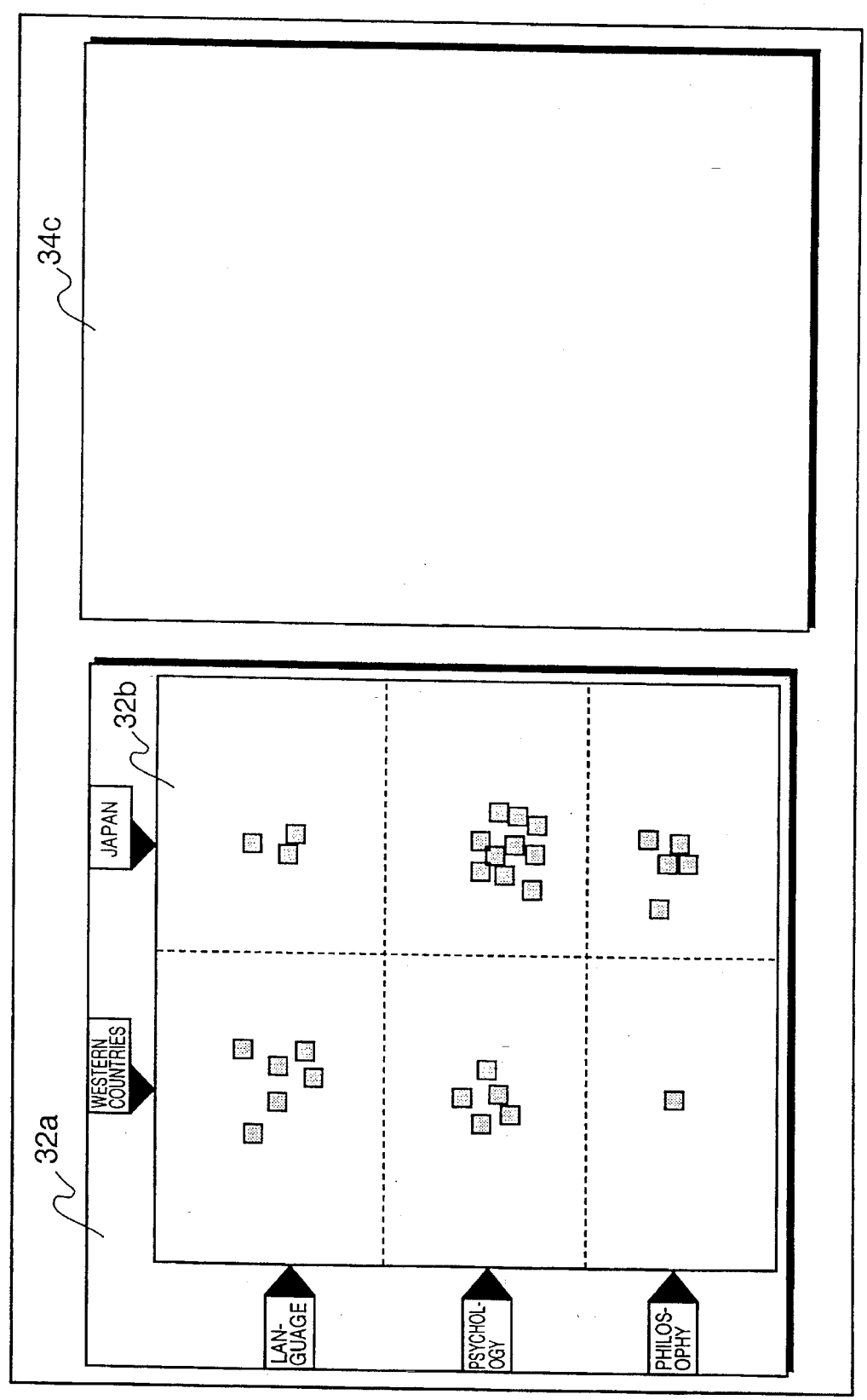
FIG. 54 is an example of a displayed image including boundaries.
Figure 55:
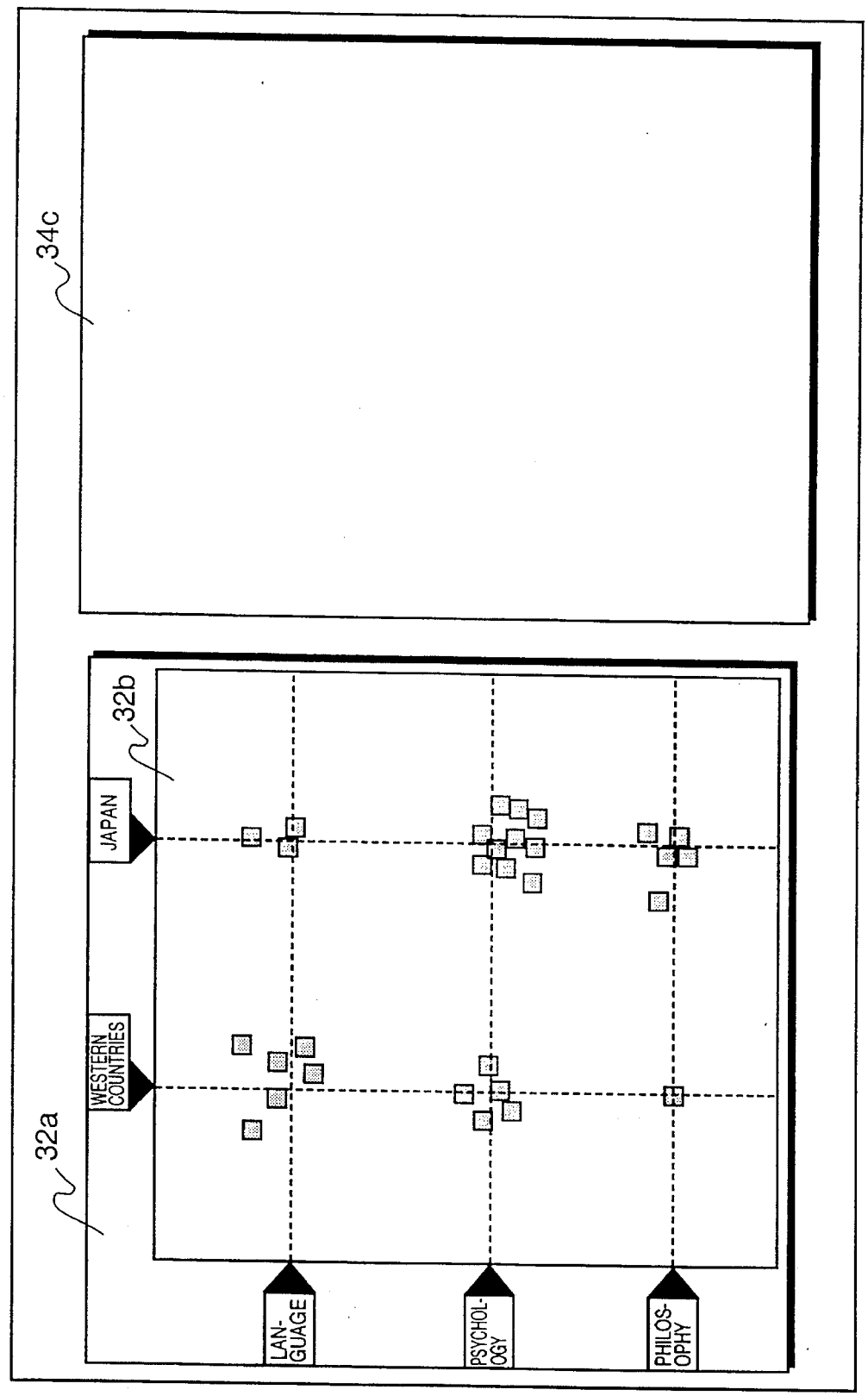
FIG. 55 is an example of a displayed image in which a corresponding relationship is indicated.

After the completion of the reading, the boundary generating means 31c generates boundaries based on the positions of the item information stored in the item data retaining means 31b, and requests the image generating means 32c to combine the boundaries (step S48j). The simplest way of generating boundaries is to draw a straight line at the center of the positions of each adjacent items, as shown in FIG. 54. Apparently, any type of boundary may be used as long as it allows recognition of respective items and image constituting elements located at intersections of items. Rather than boundaries, there may be displayed an image that indicates a correspondence between image constituting elements and item names by, for instance, using straight lines connecting item names and corresponding image constituting elements as shown in FIG. 55. Then, a final image including the item names, image constituting elements and boundaries is displayed on the display means 32b (step S48k), and the process is finished. Although in this embodiment the above process is performed in the order of item name display, image constituting element display and boundary display, these displays may be performed in any order.

Content presentation

Figure 56:
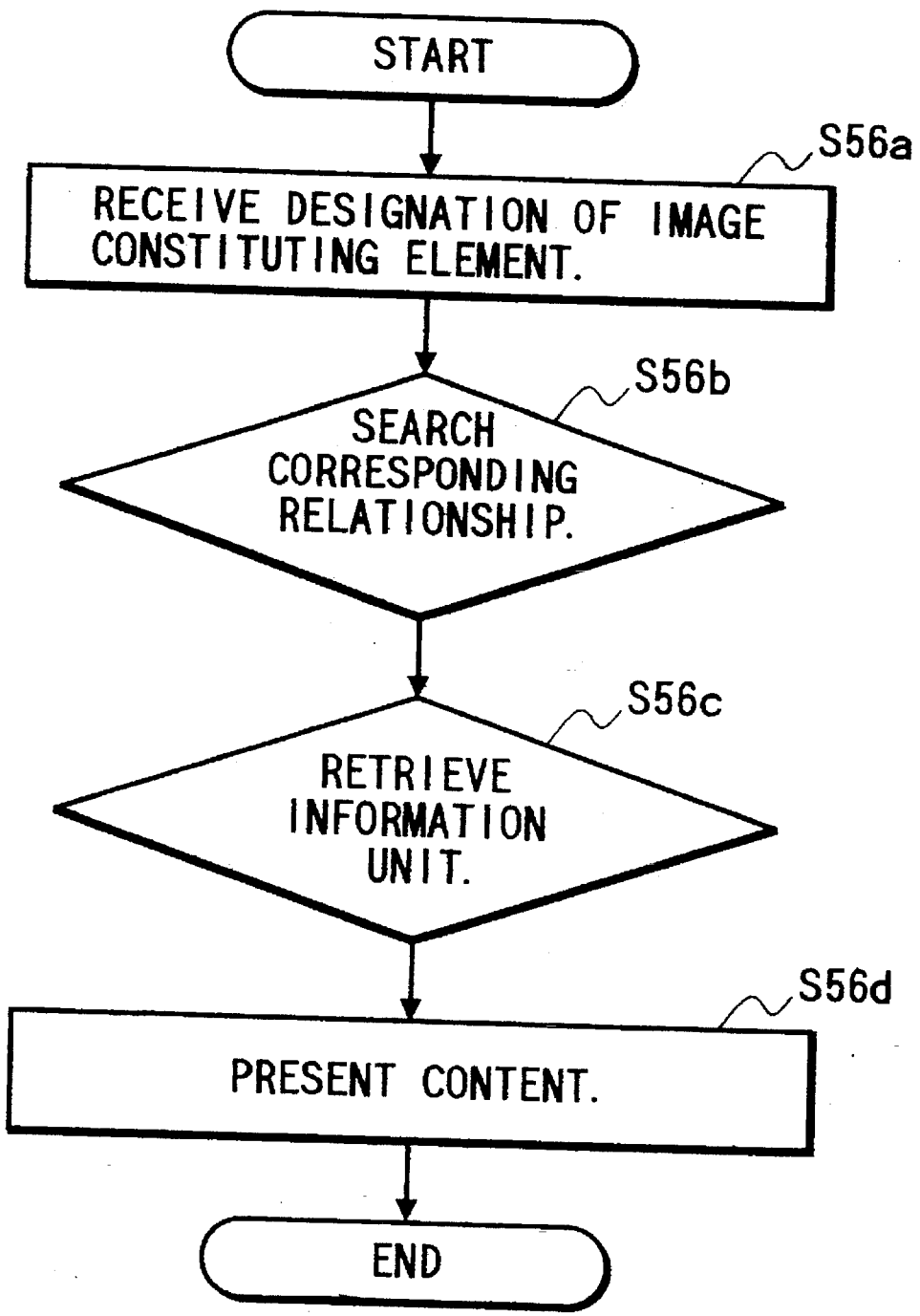
FIG. 56 is a flowchart showing a process of presenting a content of an information unit.
Figure 57:
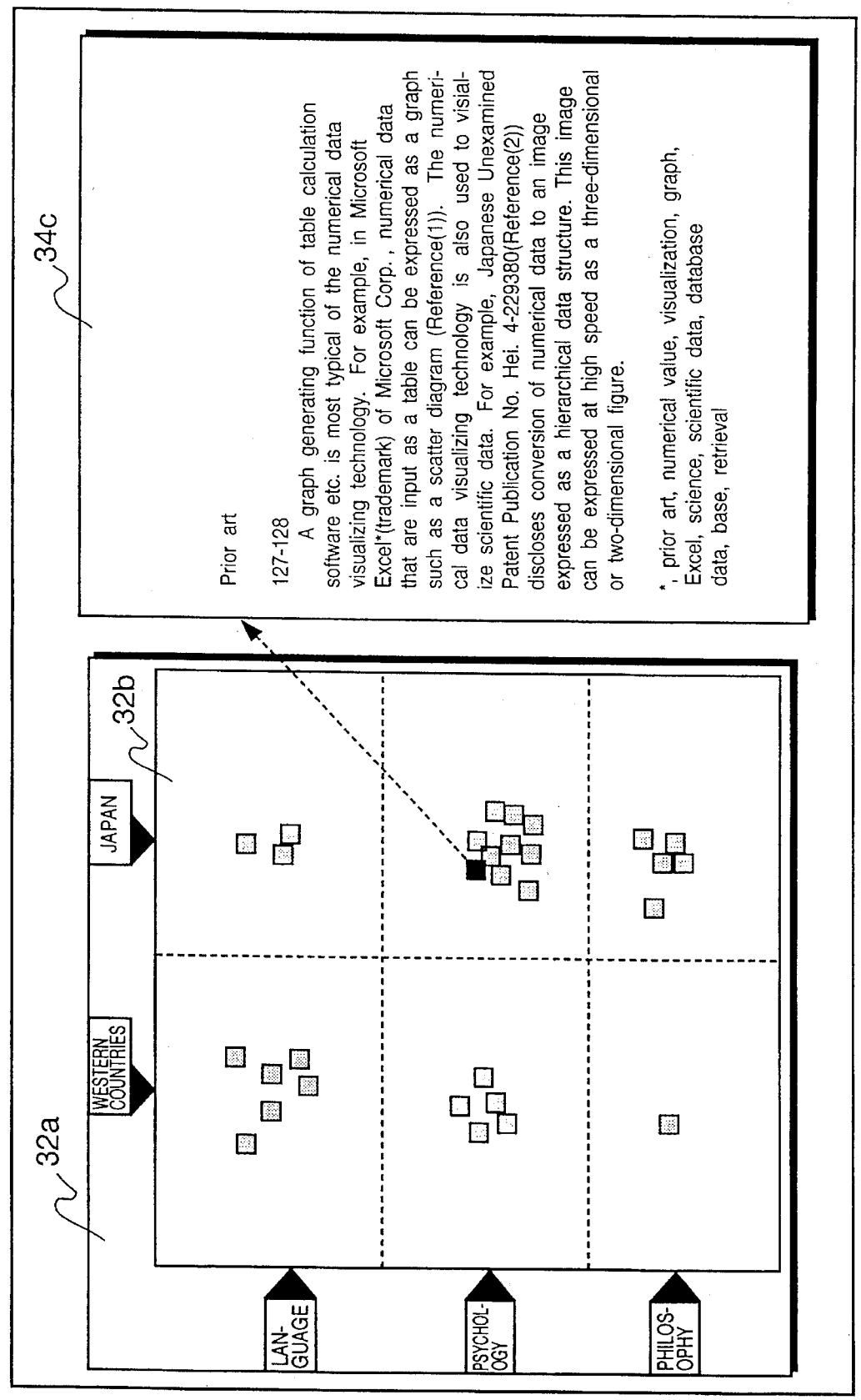
FIG. 57 is an example of a displayed image in which a content of an information unit is presented.

Next, a description will be made of a process of presenting a content of an information unit by designation of the corresponding image constituting element. FIG. 56 is a flowchart showing this process. The constituting element designation means 34a receives a user's designation of an image constituting element, and sends it to the corresponding information retrieving means 34b (step S56a). The corresponding information retrieving means 34b searches the information stored in the corresponding relationship retaining means 33b in the manner as shown in FIG. 7 based on the user's designation, judges what information unit the user has designated, and obtains its ID (step S56b). Based on the ID, the corresponding information retrieving means 34b searches the information unit retaining means 33a, and fetches the corresponding information unit (step S56c). A content of the information unit is displayed on the content presenting means 34c (step S56d). FIG. 57 shows an example in which the information unit corresponding to the user-designated image constituting element is presented on the content presenting means 34c.

In the information presenting apparatus according to the third embodiment, stored information units are read, evaluation values are calculated for the respective information units, and an image is formed in which image constituting elements that represent the respective information units are arranged as a table. Further, by directly indicating one of the information constituting elements being arranged, the corresponding information unit can be accessed. As a result, a user can recognize as a table or analyze information units that would not be arranged as they are, with a feeling of directly arranging the information units themselves in an image. Further, by changing the information units arranging method or external conditions in various manners, it has become possible to consider what meaning the information units have as a whole, or even discover a new aspect which has not been recognized previously or conceive a new idea. These are very effective in analyzing a vast amount of information, planning how to collect information in the future, or conceiving a new idea.

Fourth embodiment

Whole configuration

Figure 58:
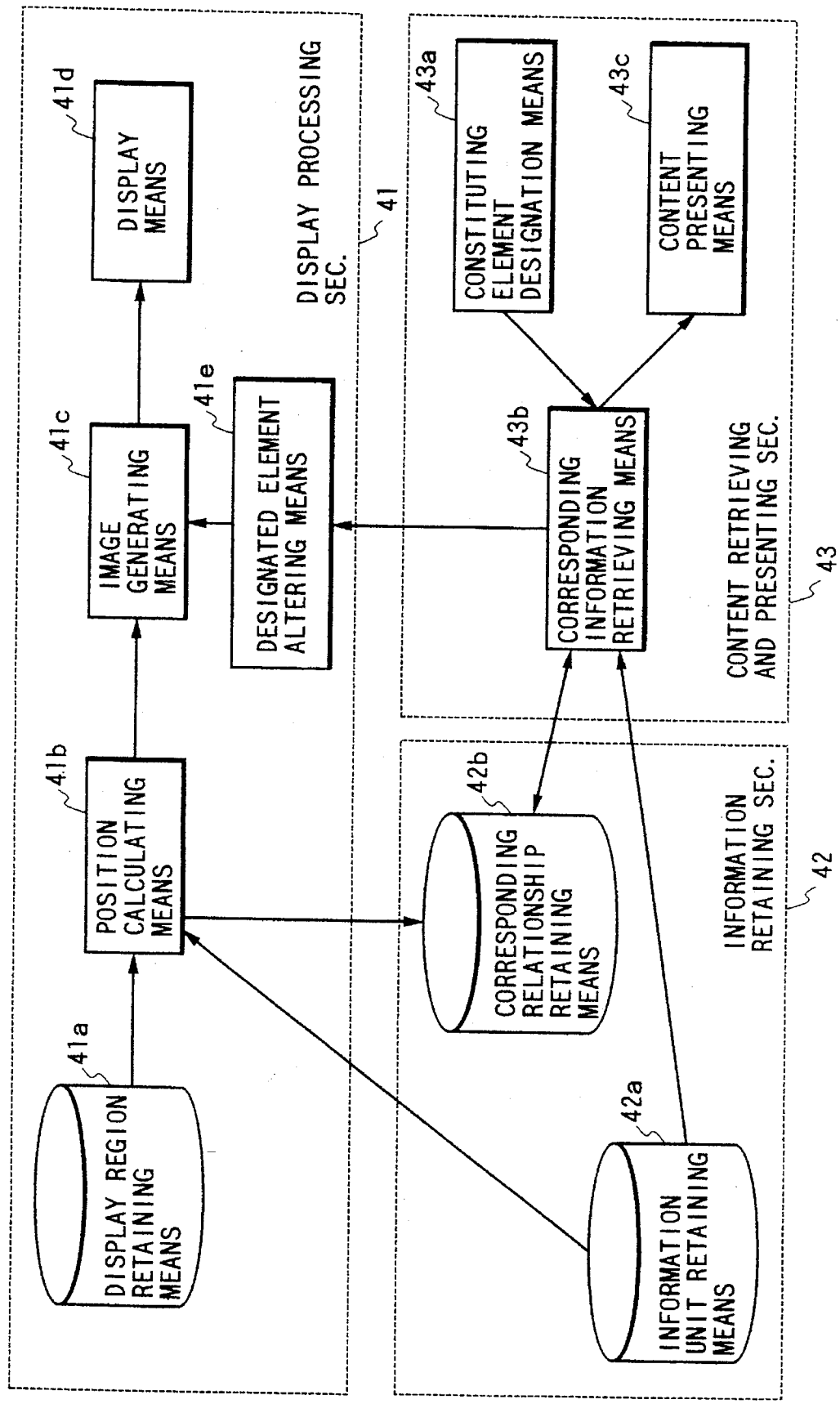
FIG. 58 is a block diagram showing an information presenting apparatus according to a fourth embodiment of the invention.

FIG. 58 is a block diagram showing the entire configuration of an image presenting apparatus according to a fourth embodiment of the invention. This apparatus consists of a display processing section 41, an information retaining section 42 and a content retrieving and presenting section 43.

In the information retaining section 42, an information unit retaining means 42a retains a plurality of information units, and a corresponding relationship retaining means 42b retains a corresponding relationship between the information units and positions of image constituting elements corresponding to the respective information units.

In the display processing section 41, a display region retaining means 41a stores a display region. A position calculating means 41b determines a layout of the image constituting elements based on the information units themselves stored in the information unit retaining means 42a and the display region stored in the display region retaining means 41a. An image generating means 41c generates an image in which the image constituting elements are arranged at the determined positions, and a display means 41d displays the generated image. A designated element altering means 41e alters a designated image constituting element.

In the content retrieving and presenting section 43, a constituting element designation means 43a receives designation of a constituting element of an image being displayed on the display means 41d. A corresponding information retrieving means 43b retrieves the information unit corresponding to the designated image constituting element. A content presenting means 43c presents a content of the retrieved information unit.

The operation of the fourth embodiment having the above configuration will be described below.

Image display

Figure 59:
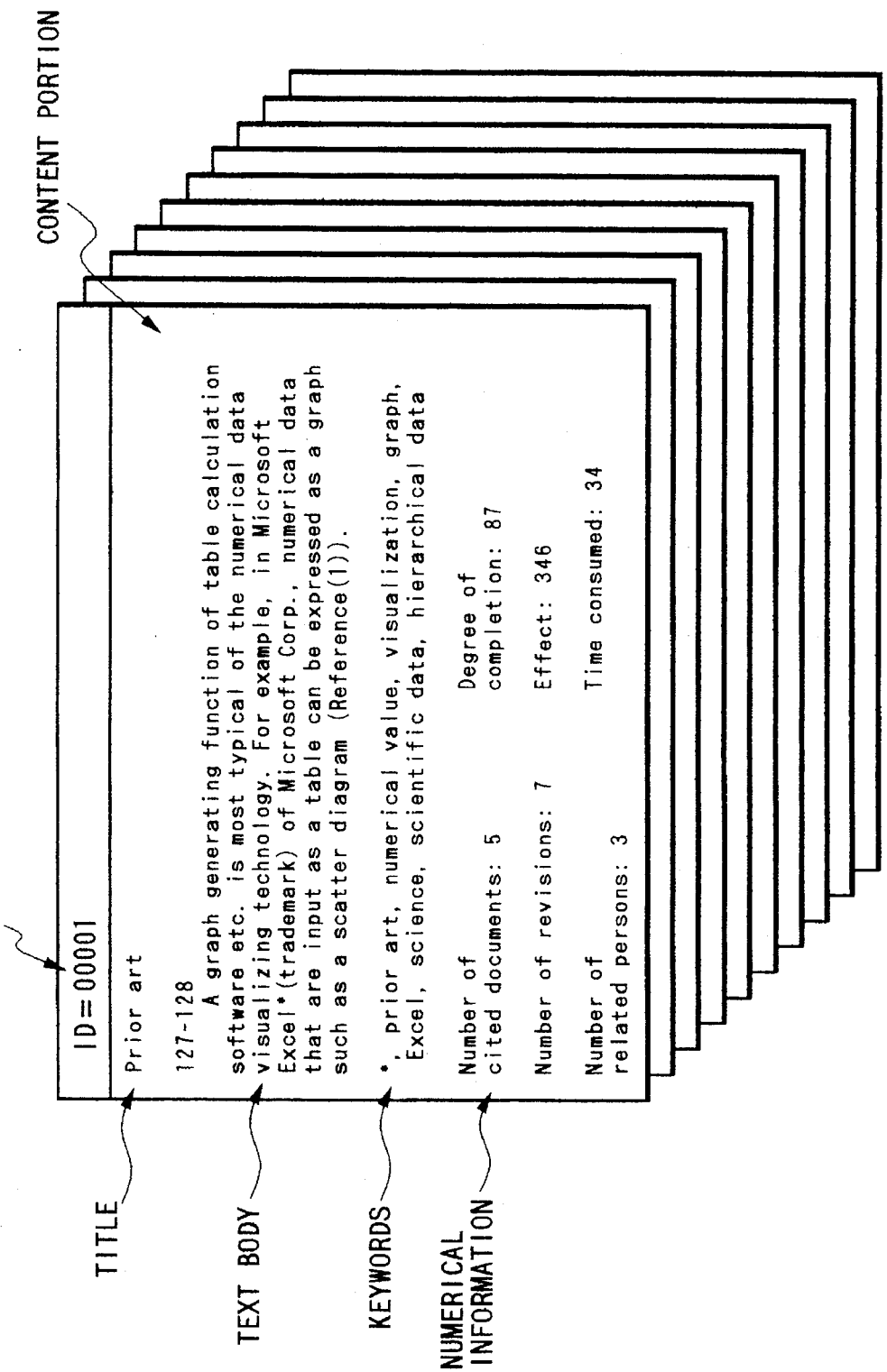
FIG. 59 shows an example of information stored in an information unit retaining means.
Figure 60:
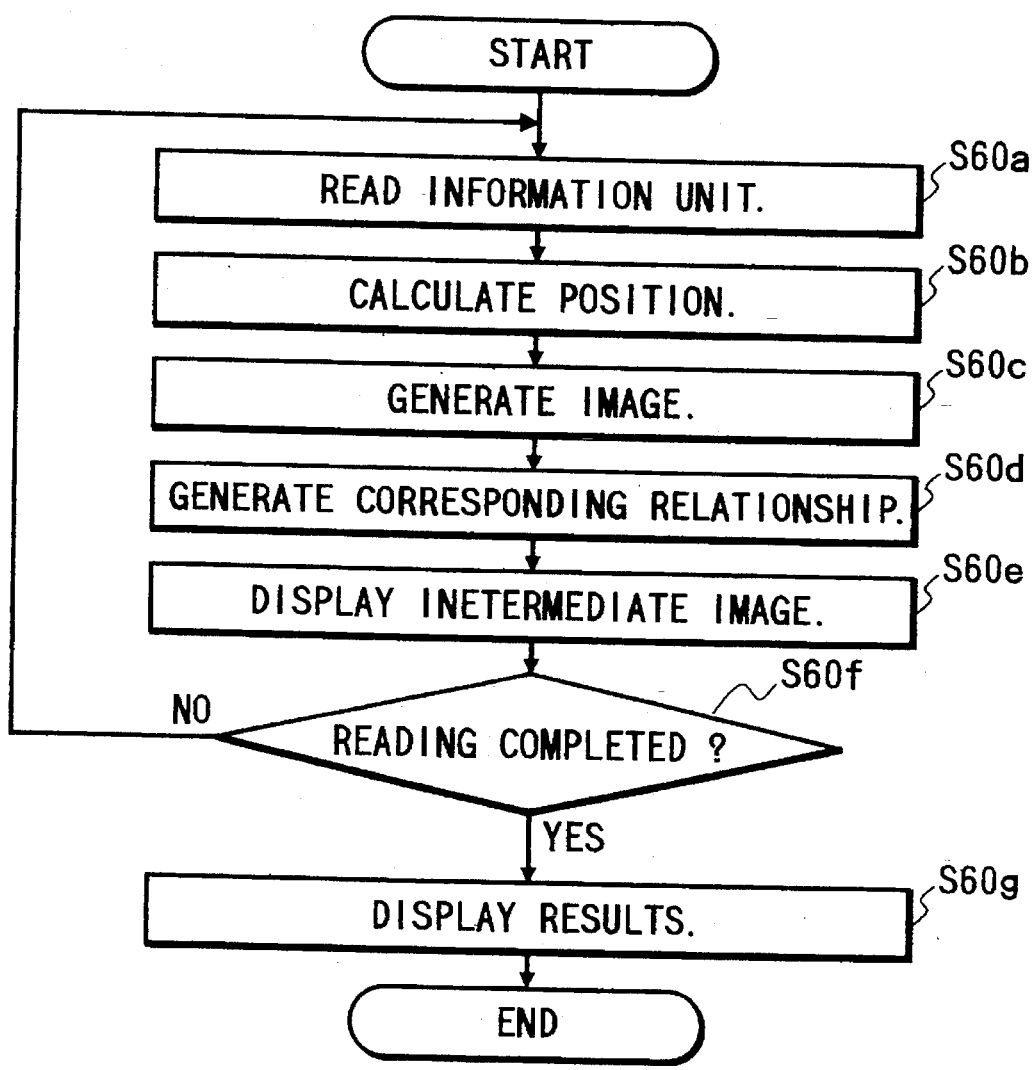
FIG. 60 is a flowchart showing a process of displaying an image.

A description will be made of an example, i.e., a process of sequentially reading information units, and displaying an image based on numerical data included in the information units. It is assumed that a plurality of information units are stored in the information units retaining means 42a in the manner as shown in FIG. 59. It is also assumed that the information units are arranged on a two-dimensional surface based on two kinds of values, i.e., the number of documents cited in each information unit and an effect. FIG. 60 is a flowchart showing this process.

First, the position calculating means 41b reads an information unit from the information unit retaining means 42a (step S60a). Then, the position calculating means 41b evaluates value information included in the information unit based on the display region stored in the display region retaining means 41a in the manner as shown in FIG. 61, and determines the position of an image constituting element that represents the existence of the information unit (step S60b). Then, the image generating means 41c generates an image in which the image constituting element is placed at the calculated position (step S60c). At the same time, a corresponding relationship between the information unit and the position of the image constituting element is stored into the corresponding relationship retaining means 42b in the manner as shown in FIG. 7, as in the case of the first embodiment (step S60d). Then, an intermediate image in which the new image constituting element is added to the previous image is displayed on the display means 41d. (step S60e). The above operation is repeated until all the necessary information units have been read (step S60f). A final image is displayed on the display means 41d in the manner as shown in FIG. 62 (step S60g).

Although the intermediate image is displayed in the above process, only a final image may be displayed with the position information stored until all the information units are read. While in the above process the image constituting elements are arranged using the numerical information included in the information units, any method may be employed as long as it can determine positions.

Since a process of presenting a content of an information unit in accordance with designation of the corresponding image constituting element is the same as that of the first embodiment (see FIG. 18), a description therefor is omitted here.

In the information presenting apparatus according to the fourth embodiment, stored information units are read, and an image is formed in which image constituting elements that represent the respective information units are arranged. By directly indicating one of the information constituting elements being arranged, the corresponding information unit can be accessed. As a result, a user can recognize as or analyze information units, with a feeling of directly arranging the information units themselves in an image. Further, by changing the information units arranging method or external conditions in various manners, it has become possible to consider what meaning the information units have as a whole, or even discover a new aspect which has not been recognized previously or conceive a new idea. These are very effective in analyzing a vast amount of information, planning how to collect information in the future, or conceiving a new idea.

To enable another form of graphical display, a frequency retaining means may be provided which increments, every time an information unit satisfies a condition of one of display items such as language, psychology and philosophy, the frequency of that display item. Receiving the frequencies and values for graphical representation from the frequency retaining means, the position calculating means determines positions in a display. To start accumulating positions of image constituting elements from the lowest level of a graph, accumulation is performed after the accumulating positions are set at 0. For each occurrence of an element to be accumulated, the corresponding accumulating position is incremented by one. This operation is repeated until all the elements are arranged. The accumulated image constituting elements constitute bars of a bar chart.

When duplication occurs in positions of image constituting elements, the registered number of duplication is incremented by one and an image altering means alters duplicated image constituting elements. Specifically, the density/color or the shape/size of image constituting elements may be changed.

In displaying generated image constituting elements, they may be combined with a fusion image stored in or displayed on the display means.

What is claimed is:

1. An information presenting apparatus comprising:

information unit retaining means for retaining a plurality of information units and accompanying keywords;

item data retaining means for retaining items that constitute rows or columns of a table, and conditions, each of which includes a combination of the keywords retained by said information unit retaining means and a value, corresponding to the items;

tabulation value calculating means for reading the information units from the information unit retaining means, and for calculating values to be used for arranging image elements representing the respective information units to form a table based on the conditions retained by said item data retaining means and the keywords read from said information unit retaining means;

position calculating means for determining positions of the respective image elements based on the values calculated by the tabulation value calculating means;

image generating means for generating a table image in which the image elements are arranged at the determined positions; and display means for displaying the generated table image.

2. The information presenting apparatus of claim 1, further comprising:

time data generating means for generating a series of time points; and wherein the information units retained by said information unit retaining means are accompanied by time data for one of the keywords; and said image generating means generates a set of images sequentially based on the series of time points generated by said time data generating means, each of which includes only the image elements representing the respective information units accompanying time data corresponding to one of the series of time points generated by said time data generating means.

3. The information presenting apparatus of claim 1, further comprising:

corresponding relationship retaining means for retaining a corresponding relationship between the image elements to be displayed on the display means and the information units retained by the information unit retaining means;

element designation means for receiving designation of one of the image elements being displayed on the display means;

corresponding information retrieving means for retrieving an information unit corresponding to the designated image element; and content presenting means for presenting a content of the retrieved information unit.

4. The information presenting apparatus of claim 1, further comprising:

frequency retaining means for counting and retaining the respective numbers of the information units which respectively satisfy the conditions retained by said item data retaining means; and wherein said position calculating means further calculates the positions of the image elements representing the information units based on the number of the information units counted by said frequency retaining means so as to position the image elements satisfying a certain condition adjacently to form a bar of a bar chart.

5. The information presenting apparatus of claim 1, further comprising:

duplication counting means for counting respective numbers of the image elements whose positions calculated by said position calculating means are duplicated; and image altering means for altering the image elements based on the respective counts of the duplication counting means.

6. The information presenting apparatus of claim 1, further comprising:

fusion image storing means for storing a fusion image; and said display means displaying the image elements combined with the fusion image stored by said fusion image storing means.

* * * * *